United States Patent
Blumenberg

(10) Patent No.: US 10,613,741 B2
(45) Date of Patent: Apr. 7, 2020

(54) APPLICATION PROGRAMMING INTERFACE FOR GESTURE OPERATIONS

(71) Applicant: Apple Inc., Cupertino, CA (US)

(72) Inventor: Christopher Blumenberg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/240,662

(22) Filed: Jan. 4, 2019

(65) Prior Publication Data

US 2019/0138181 A1 May 9, 2019

Related U.S. Application Data

(63) Continuation of application No. 15/139,260, filed on Apr. 26, 2016, now Pat. No. 10,175,876, which is a (Continued)

(51) Int. Cl.
*G06F 3/0488* (2013.01)
*G06F 3/0484* (2013.01)
(Continued)

(52) U.S. Cl.
CPC .......... *G06F 3/0488* (2013.01); *G06F 3/0414* (2013.01); *G06F 3/0481* (2013.01);
(Continued)

(58) Field of Classification Search
CPC .... G06F 2203/014; G06F 3/041; G06F 9/451; G06F 2203/04104; G06F 3/0488
See application file for complete search history.

(56) References Cited

U.S. PATENT DOCUMENTS 4,455,452 A 6/1984 Schuyler
4,674,066 A 6/1987 Kucera
(Continued)

FOREIGN PATENT DOCUMENTS

AU 2007283771 4/2007
CA 2755443 A1 9/2010
(Continued)

OTHER PUBLICATIONS

Allen, "Override the GNU C Library—Painlessly," http://www.ibm.com/developerworks/linux/library/l-glibc/index.html, Apr. 1, 2002, 4 pages.
(Continued)

*Primary Examiner* — Tuan C Dao
(74) *Attorney, Agent, or Firm* — Morgan, Lewis & Bockius LLP

(57) ABSTRACT

At least certain embodiments of the present disclosure include an environment with user interface software interacting with a software application to provide gesture operations for a display of a device. A method for operating through an application programming interface (API) in this environment includes transferring, from platform code configured to provide a common framework for handling gesture events, to a program, a rotation transform function call in response to an input that corresponds to a gesture based on two or more concurrent touches. The method includes transferring, via the API, a gesture change function call from the platform code to the program in response to detecting a change in the gesture that corresponds to a change in one or more touches. The method includes, in response to transferring the rotation transform function call and the gesture change function call, performing a rotation transform to rotate a view of the program.

21 Claims, 37 Drawing Sheets

Related U.S. Application Data continuation of application No. 11/620,727, filed on Jan. 7, 2007, now abandoned.

(51) Int. Cl.
  *G06F 9/451* (2018.01)
  *G06F 3/041* (2006.01)
  *G06F 3/0481* (2013.01)
  *G06F 3/0485* (2013.01)
  *G06T 13/80* (2011.01)

(52) U.S. Cl.
  CPC ........ *G06F 3/0485* (2013.01); *G06F 3/04845* (2013.01); *G06F 3/04883* (2013.01); *G06F 9/451* (2018.02); *G06T 13/80* (2013.01); *G06F 2203/04104* (2013.01); *G06F 2203/04105* (2013.01); *G06F 2203/04806* (2013.01)

(56) References Cited

U.S. PATENT DOCUMENTS

| | | |
|---|---|---|
| 5,046,434 A | 9/1991 | Breezer et al. |
| 5,233,547 A | 8/1993 | Kapp et al. |
| 5,252,951 A | 10/1993 | Tannenbaum et al. |
| 5,454,960 A | 10/1995 | Newsom |
| 5,463,725 A | 10/1995 | Henckel et al. |
| 5,488,204 A | 1/1996 | Mead et al. |
| 5,495,566 A | 2/1996 | Kwatinetz |
| 5,513,309 A | 4/1996 | Meier et al. |
| 5,530,861 A | 6/1996 | Diamant et al. |
| 5,534,893 A | 7/1996 | Hansen, Jr. et al. |
| 5,564,112 A | 10/1996 | Hayes et al. |
| 5,566,337 A | 10/1996 | Szymanski et al. |
| 5,570,113 A | 10/1996 | Zetts |
| 5,583,543 A | 12/1996 | Takahashi et al. |
| 5,589,856 A | 12/1996 | Stein et al. |
| 5,612,719 A | 3/1997 | Beernink et al. |
| 5,627,567 A | 5/1997 | Davidson |
| 5,627,959 A | 5/1997 | Brown et al. |
| 5,676,064 A | 10/1997 | Shuert |
| 5,686,940 A | 11/1997 | Kuga |
| 5,698,822 A | 12/1997 | Haneda et al. |
| 5,708,460 A | 1/1998 | Young et al. |
| 5,745,116 A | 4/1998 | Pisutha-Arnond |
| 5,777,605 A | 7/1998 | Yoshinobu et al. |
| 5,798,752 A | 8/1998 | Buxton et al. |
| 5,818,455 A | 10/1998 | Stone et al. |
| 5,844,547 A | 12/1998 | Minakuchi et al. |
| 5,854,853 A | 12/1998 | Wang |
| 5,864,636 A | 1/1999 | Chisaka |
| 5,867,158 A | 2/1999 | Murasaki et al. |
| 5,880,411 A | 3/1999 | Gillespie et al. |
| 5,903,902 A | 5/1999 | Orr et al. |
| 5,917,477 A | 6/1999 | Lee |
| 5,959,629 A | 9/1999 | Masui |
| 5,999,176 A | 12/1999 | Kamper |
| 6,028,602 A | 2/2000 | Weidenfeller et al. |
| 6,034,688 A | 3/2000 | Greenwood et al. |
| 6,035,343 A | 3/2000 | Tsushima et al. |
| 6,049,326 A | 4/2000 | Beyda et al. |
| 6,061,063 A | 5/2000 | Wagner et al. |
| 6,089,371 A | 7/2000 | Lin |
| 6,141,018 A | 10/2000 | Beri et al. |
| 6,188,391 B1 | 2/2001 | Seely et al. |
| 6,259,436 B1 | 7/2001 | Moon et al. |
| 6,281,886 B1 | 8/2001 | Ranieri |
| 6,282,316 B1 | 8/2001 | Arai |
| 6,323,846 B1 | 11/2001 | Westerman et al. |
| 6,369,821 B2 | 4/2002 | Merrill et al. |
| 6,377,965 B1 | 4/2002 | Hachamovitch et al. |
| 6,446,083 B1 | 9/2002 | Leight et al. |
| 6,448,986 B1 | 9/2002 | Smith |
| 6,486,896 B1 | 11/2002 | Ubillos |
| 6,489,951 B1 | 12/2002 | Wong et al. |
| 6,498,590 B1 | 12/2002 | Dietz et al. |
| 6,559,869 B1 | 5/2003 | Lui et al. |
| 6,567,102 B2 | 5/2003 | Kung |
| 6,570,557 B1 | 5/2003 | Westerman et al. |
| 6,570,594 B1 | 5/2003 | Wagner |
| 6,590,595 B1 | 7/2003 | Wagner et al. |
| 6,628,835 B1 | 9/2003 | Brill et al. |
| 6,631,501 B1 | 10/2003 | Jurion et al. |
| 6,636,242 B2 | 10/2003 | Bowman-Amuah |
| 6,639,584 B1 | 10/2003 | Li |
| 6,661,409 B2 | 12/2003 | DeMartines et al. |
| 6,664,989 B1 | 12/2003 | Snyder et al. |
| 6,664,991 B1 | 12/2003 | Chew et al. |
| 6,677,932 B1 | 1/2004 | Westerman |
| 6,677,965 B1 | 1/2004 | Ullmann et al. |
| 6,690,387 B2 | 2/2004 | Zimmerman et al. |
| 6,707,449 B2 | 3/2004 | Hinckley et al. |
| 6,714,221 B1 | 3/2004 | Christie et al. |
| 6,714,936 B1 | 3/2004 | Nevin, III |
| 6,735,583 B1 | 5/2004 | Bjarnestam et al. |
| 6,741,996 B1 | 5/2004 | Brechner et al. |
| 6,757,673 B2 | 6/2004 | Makus et al. |
| 6,765,557 B1 | 7/2004 | Segal et al. |
| 6,778,992 B1 | 8/2004 | Searle et al. |
| 6,809,724 B1 | 10/2004 | Shiraishi et al. |
| 6,819,315 B2 | 11/2004 | Toepke et al. |
| 6,820,237 B1 | 11/2004 | Abu-Hakima et al. |
| 6,831,631 B2 | 12/2004 | Chuang |
| 6,839,721 B2 | 1/2005 | Schwols |
| 6,856,326 B1 | 2/2005 | Zhai |
| 6,868,383 B1 | 3/2005 | Bangalore et al. |
| 6,903,927 B2 | 6/2005 | Anlauff |
| 6,907,575 B2 | 6/2005 | Duarte |
| 6,912,462 B2 | 6/2005 | Ogaki |
| 6,957,392 B2 | 10/2005 | Simister et al. |
| 6,958,749 B1 | 10/2005 | Matsushita |
| 6,963,937 B1 | 11/2005 | Kamper et al. |
| 6,972,776 B2 | 12/2005 | Davis et al. |
| 6,975,306 B2 | 12/2005 | Hinckley et al. |
| 6,985,137 B2 | 1/2006 | Kaikuranta |
| 6,985,178 B1 | 1/2006 | Morita et al. |
| 7,009,599 B2 | 3/2006 | Pihlaja |
| 7,009,626 B2 | 3/2006 | Anwar |
| 7,013,435 B2 | 3/2006 | Gallo et al. |
| 7,023,427 B2 | 4/2006 | Kraus et al. |
| 7,030,861 B1 | 4/2006 | Westerman et al. |
| 7,030,863 B2 | 4/2006 | Longe et al. |
| 7,036,094 B1 | 4/2006 | Cohen et al. |
| 7,046,230 B2 | 5/2006 | Zadesky et al. |
| 7,062,090 B2 | 6/2006 | Simmons et al. |
| 7,075,512 B1 | 7/2006 | Fabre et al. |
| 7,084,859 B1 | 8/2006 | Pryor |
| 7,088,374 B2 | 8/2006 | David et al. |
| 7,102,626 B2 | 9/2006 | Denny, III |
| 7,117,453 B2 | 10/2006 | Drucker et al. |
| 7,152,210 B1 | 12/2006 | Van Den Hoven et al. |
| 7,154,534 B2 | 12/2006 | Seki et al. |
| 7,155,048 B2 | 12/2006 | Ohara |
| 7,171,353 B2 | 1/2007 | Trower, II et al. |
| 7,173,623 B2 | 2/2007 | Calkins et al. |
| 7,181,373 B2 | 2/2007 | Le Cocq et al. |
| 7,184,796 B2 | 2/2007 | Karidis et al. |
| 7,237,199 B1 | 6/2007 | Menhardt et al. |
| 7,240,291 B2 | 7/2007 | Card et al. |
| 7,337,412 B2 | 2/2008 | Guido et al. |
| 7,346,850 B2 | 3/2008 | Swartz et al. |
| 7,358,965 B2 | 4/2008 | Barabe et al. |
| 7,385,592 B2 | 6/2008 | Collins |
| 7,406,696 B2 | 7/2008 | Burger et al. |
| 7,420,543 B2 | 9/2008 | Jayachandra |
| 7,469,381 B2 | 12/2008 | Ording |
| 7,487,447 B1 | 2/2009 | Jerger |
| 7,499,027 B2 | 3/2009 | Brigham, II et al. |
| 7,561,159 B2 | 7/2009 | Abel et al. |
| 7,564,448 B2 | 7/2009 | Yi |
| 7,576,732 B2 | 8/2009 | Lii |
| 7,603,143 B2 | 10/2009 | Kang et al. |
| 7,614,008 B2 | 11/2009 | Ording |
| 7,653,883 B2 | 1/2010 | Hotelling et al. |
| 7,663,607 B2 | 2/2010 | Hotelling et al. |

(56) References Cited

U.S. PATENT DOCUMENTS

| | | |
|---|---|---|
| 7,673,255 B2 | 3/2010 | Schechter et al. |
| 7,694,231 B2 | 4/2010 | Kocienda et al. |
| 7,724,242 B2 | 5/2010 | Hillis et al. |
| 7,739,604 B1 | 6/2010 | Lyons et al. |
| 7,750,893 B2 | 7/2010 | Hashimoto et al. |
| 7,761,541 B1 | 7/2010 | Morley et al. |
| 7,778,818 B2 | 8/2010 | Longe et al. |
| 7,782,307 B2 | 8/2010 | Westerman et al. |
| 7,786,975 B2 | 8/2010 | Ording et al. |
| 7,812,826 B2 | 10/2010 | Ording et al. |
| 7,843,427 B2 | 11/2010 | Ording et al. |
| 7,844,915 B2 | 11/2010 | Platzer et al. |
| 7,864,037 B2 | 1/2011 | Miller |
| 7,872,652 B2 | 1/2011 | Platzer et al. |
| 7,900,156 B2 | 3/2011 | Andre et al. |
| 7,903,115 B2 | 3/2011 | Platzer et al. |
| 7,907,125 B2 | 3/2011 | Weiss et al. |
| 7,917,584 B2 | 3/2011 | Arthursson |
| 7,925,996 B2 | 4/2011 | Hofmeister et al. |
| 7,941,760 B2 | 5/2011 | Kocienda et al. |
| 7,962,862 B2 | 6/2011 | Kulp et al. |
| 7,966,578 B2 | 6/2011 | Tolmasky et al. |
| 8,051,406 B2 | 11/2011 | Knight et al. |
| 8,091,045 B2 | 1/2012 | Christie et al. |
| 8,112,299 B2 | 2/2012 | Kim et al. |
| 8,115,744 B2 | 2/2012 | Kong et al. |
| 8,135,171 B2 | 3/2012 | Ho et al. |
| 8,140,570 B2 | 3/2012 | Ingrassia et al. |
| 8,171,432 B2 | 5/2012 | Matas et al. |
| 8,174,502 B2 | 5/2012 | Bolsinga et al. |
| 8,214,768 B2 | 7/2012 | Boule et al. |
| 8,239,784 B2 | 8/2012 | Hotelling et al. |
| 8,253,695 B2 | 8/2012 | Ganatra et al. |
| 8,285,499 B2 | 10/2012 | Moore et al. |
| 8,289,289 B2 | 10/2012 | Rimon et al. |
| 8,291,344 B2 | 10/2012 | Chaudhri |
| 8,296,332 B2 | 10/2012 | Boley et al. |
| 8,310,459 B2 | 11/2012 | Nurmi |
| 8,314,775 B2 | 11/2012 | Westerman et al. |
| 8,400,416 B2 | 3/2013 | Ho et al. |
| 8,411,060 B1 | 4/2013 | Scholler et al. |
| 8,416,196 B2 | 4/2013 | Williamson et al. |
| 8,428,893 B2 | 4/2013 | Moore et al. |
| 8,434,003 B2 | 4/2013 | Zalewski et al. |
| 8,436,815 B2 | 5/2013 | Mazeev et al. |
| 8,436,821 B1 | 5/2013 | Plichta et al. |
| 8,489,783 B2 | 7/2013 | Wilson |
| 8,560,975 B2 | 10/2013 | Beaver et al. |
| 8,566,044 B2 | 10/2013 | Shaffer et al. |
| 8,566,045 B2 | 10/2013 | Shaffer et al. |
| 8,570,277 B2 | 10/2013 | Rekimoto |
| 8,645,827 B2 | 2/2014 | Beaver et al. |
| 8,656,311 B1 | 2/2014 | Harper et al. |
| 8,676,824 B2 | 3/2014 | Tavor |
| 8,682,602 B2 | 3/2014 | Moore et al. |
| 8,775,820 B1 | 7/2014 | Freeburne |
| 9,285,908 B2 | 3/2016 | Moore et al. |
| 9,720,594 B2 | 8/2017 | Beaver et al. |
| 2001/0009033 A1 | 7/2001 | Morisaki et al. |
| 2001/0011998 A1 | 8/2001 | Agata et al. |
| 2001/0012001 A1 | 8/2001 | Rekimoto et al. |
| 2001/0028369 A1 | 10/2001 | Gallo et al. |
| 2001/0045949 A1 | 11/2001 | Chithambaram et al. |
| 2002/0015024 A1 | 2/2002 | Westerman et al. |
| 2002/0015064 A1 | 2/2002 | Robotham et al. |
| 2002/0025024 A1 | 2/2002 | Tybinkowski et al. |
| 2002/0036618 A1 | 3/2002 | Wakai et al. |
| 2002/0101418 A1 | 8/2002 | Vernier et al. |
| 2002/0171675 A1 | 11/2002 | Fox et al. |
| 2002/0191029 A1 | 12/2002 | Gillespie et al. |
| 2002/0194589 A1 | 12/2002 | Cristofalo et al. |
| 2003/0063073 A1 | 4/2003 | Geaghan et al. |
| 2003/0071850 A1 | 4/2003 | Geidl |
| 2003/0071858 A1 | 4/2003 | Morohoshi |
| 2003/0080946 A1 | 5/2003 | Chuang |
| 2003/0095096 A1 | 5/2003 | Robbin et al. |
| 2003/0095135 A1 | 5/2003 | Kaasila et al. |
| 2003/0095697 A1 | 5/2003 | Wood et al. |
| 2003/0122787 A1 | 7/2003 | Zimmerman et al. |
| 2003/0132959 A1 | 7/2003 | Simister et al. |
| 2003/0146941 A1 | 8/2003 | Bailey et al. |
| 2003/0160832 A1 | 8/2003 | Ridgley et al. |
| 2003/0174149 A1 | 9/2003 | Fujisaki et al. |
| 2003/0184525 A1 | 10/2003 | Tsai |
| 2003/0197689 A1 | 10/2003 | May |
| 2003/0197744 A1 | 10/2003 | Irvine |
| 2003/0210258 A1 | 11/2003 | Williams |
| 2003/0214531 A1 | 11/2003 | Chambers et al. |
| 2003/0214553 A1* | 11/2003 | Dodge ............... G06F 3/04883 347/41 |
| 2003/0217336 A1* | 11/2003 | Gounares ............ G06F 3/0481 715/268 |
| 2003/0222917 A1 | 12/2003 | Trantow |
| 2004/0001627 A1 | 1/2004 | Simmons et al. |
| 2004/0021676 A1 | 2/2004 | Chen et al. |
| 2004/0021698 A1 | 2/2004 | Baldwin et al. |
| 2004/0025115 A1 | 2/2004 | Sienel et al. |
| 2004/0027398 A1 | 2/2004 | Jaeger |
| 2004/0030914 A1 | 2/2004 | Kelley et al. |
| 2004/0039474 A1 | 2/2004 | Kontani |
| 2004/0070573 A1 | 4/2004 | Graham |
| 2004/0080541 A1 | 4/2004 | Saiga et al. |
| 2004/0095387 A1 | 5/2004 | Demsey et al. |
| 2004/0100479 A1 | 5/2004 | Nakano et al. |
| 2004/0111672 A1 | 6/2004 | Bowman et al. |
| 2004/0125136 A1 | 7/2004 | Wallenius |
| 2004/0135817 A1 | 7/2004 | Daughtery et al. |
| 2004/0155888 A1 | 8/2004 | Padgitt et al. |
| 2004/0160419 A1 | 8/2004 | Padgitt |
| 2004/0189721 A1 | 9/2004 | Pettiross et al. |
| 2004/0207542 A1 | 10/2004 | Chang et al. |
| 2004/0210847 A1 | 10/2004 | Berson et al. |
| 2004/0215643 A1 | 10/2004 | Brechner et al. |
| 2004/0221168 A1 | 11/2004 | Girard |
| 2004/0222992 A1 | 11/2004 | Calkins et al. |
| 2004/0224638 A1 | 11/2004 | Fadell et al. |
| 2004/0225965 A1 | 11/2004 | Garside et al. |
| 2004/0263486 A1 | 12/2004 | Seni |
| 2005/0005241 A1 | 1/2005 | Hunleth et al. |
| 2005/0008343 A1 | 1/2005 | Frohlich et al. |
| 2005/0012723 A1 | 1/2005 | Pallakoff |
| 2005/0017957 A1 | 1/2005 | Yi |
| 2005/0024341 A1 | 2/2005 | Gillespie et al. |
| 2005/0027666 A1 | 2/2005 | Beck, Jr. et al. |
| 2005/0057524 A1 | 3/2005 | Hill et al. |
| 2005/0078088 A1* | 4/2005 | Davis .................. G06F 3/002 345/163 |
| 2005/0088443 A1 | 4/2005 | Blanco et al. |
| 2005/0122806 A1 | 6/2005 | Arakawa et al. |
| 2005/0145807 A1 | 7/2005 | Lapstun et al. |
| 2005/0162402 A1 | 7/2005 | Watanachote |
| 2005/0168488 A1 | 8/2005 | Montague |
| 2005/0179648 A1 | 8/2005 | Barabe et al. |
| 2005/0183035 A1 | 8/2005 | Ringel et al. |
| 2005/0193015 A1 | 9/2005 | Logston et al. |
| 2005/0195154 A1 | 9/2005 | Robbins et al. |
| 2005/0198588 A1 | 9/2005 | Lin et al. |
| 2005/0210419 A1 | 9/2005 | Kela et al. |
| 2005/0212767 A1 | 9/2005 | Marvit et al. |
| 2005/0237308 A1 | 10/2005 | Autio et al. |
| 2005/0268247 A1 | 12/2005 | Baneth |
| 2005/0270269 A1 | 12/2005 | Tokkonen |
| 2005/0275618 A1 | 12/2005 | Juh et al. |
| 2005/0275636 A1 | 12/2005 | Dehlin et al. |
| 2006/0010400 A1 | 1/2006 | Dehlin et al. |
| 2006/0022956 A1 | 2/2006 | Lengeling et al. |
| 2006/0025218 A1 | 2/2006 | Hotta |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0026676 A1 | 2/2006 | O'Donoghue |
| 2006/0028455 A1 | 2/2006 | Hinckley et al. |
| 2006/0031786 A1 | 2/2006 | Hillis et al. |
| 2006/0036955 A1 | 2/2006 | Baudisch et al. |

(56) References Cited

U.S. PATENT DOCUMENTS

| | | |
|---|---|---|
| 2006/0038796 A1 | 2/2006 | Hinckley et al. |
| 2006/0048073 A1 | 3/2006 | Jarrett et al. |
| 2006/0055662 A1 | 3/2006 | Rimas-Ribikauskas et al. |
| 2006/0055669 A1 | 3/2006 | Das |
| 2006/0055789 A1 | 3/2006 | Jin et al. |
| 2006/0059462 A1 | 3/2006 | Yamamoto |
| 2006/0061551 A1 | 3/2006 | Fateh |
| 2006/0066588 A1 | 3/2006 | Lyon et al. |
| 2006/0077183 A1 | 4/2006 | Studt |
| 2006/0077544 A1 | 4/2006 | Stark |
| 2006/0082549 A1 | 4/2006 | Hoshino et al. |
| 2006/0094502 A1 | 5/2006 | Katayama et al. |
| 2006/0097991 A1 | 5/2006 | Hotelling et al. |
| 2006/0112335 A1 | 5/2006 | Hofmeister et al. |
| 2006/0123353 A1 | 6/2006 | Matthews et al. |
| 2006/0125799 A1 | 6/2006 | Hillis et al. |
| 2006/0125803 A1 | 6/2006 | Westerman et al. |
| 2006/0136833 A1 | 6/2006 | Dettinger et al. |
| 2006/0156249 A1 | 7/2006 | Blythe et al. |
| 2006/0161871 A1 | 7/2006 | Hotelling et al. |
| 2006/0176403 A1 | 8/2006 | Gritton et al. |
| 2006/0181510 A1 | 8/2006 | Faith |
| 2006/0187215 A1 | 8/2006 | Rosenberg et al. |
| 2006/0190833 A1 | 8/2006 | SanGiovanni et al. |
| 2006/0197753 A1 | 9/2006 | Hotelling |
| 2006/0221061 A1 | 10/2006 | Fry |
| 2006/0236263 A1 | 10/2006 | Bathiche et al. |
| 2006/0238495 A1 | 10/2006 | Davis |
| 2006/0242602 A1 | 10/2006 | Schechter et al. |
| 2006/0242607 A1 | 10/2006 | Hudson |
| 2006/0247915 A1 | 11/2006 | Bradford et al. |
| 2006/0262104 A1 | 11/2006 | Sullivan et al. |
| 2006/0262136 A1 | 11/2006 | Vaisanen |
| 2006/0271520 A1 | 11/2006 | Ragan |
| 2006/0274042 A1 | 12/2006 | Krah et al. |
| 2006/0279548 A1 | 12/2006 | Geaghan |
| 2006/0284792 A1 | 12/2006 | Foxlin |
| 2006/0288313 A1 | 12/2006 | Hillis |
| 2007/0006078 A1* | 1/2007 | Jewsbury ............ G11B 27/105 715/716 |
| 2007/0008066 A1 | 1/2007 | Fukuda |
| 2007/0013697 A1 | 1/2007 | Gilboa |
| 2007/0024646 A1 | 2/2007 | Saarinen et al. |
| 2007/0036346 A1 | 2/2007 | Kwon |
| 2007/0046643 A1 | 3/2007 | Hillis et al. |
| 2007/0050469 A1 | 3/2007 | Gupta et al. |
| 2007/0055967 A1 | 3/2007 | Poff et al. |
| 2007/0061126 A1* | 3/2007 | Russo ................ G06F 3/03547 703/24 |
| 2007/0064004 A1 | 3/2007 | Bonner et al. |
| 2007/0067745 A1 | 3/2007 | Choi et al. |
| 2007/0075965 A1 | 4/2007 | Huppi et al. |
| 2007/0081726 A1 | 4/2007 | Westerman et al. |
| 2007/0089069 A1 | 4/2007 | Hsieh et al. |
| 2007/0094352 A1 | 4/2007 | Choi et al. |
| 2007/0109275 A1 | 5/2007 | Chuang |
| 2007/0120835 A1 | 5/2007 | Sato |
| 2007/0132789 A1 | 6/2007 | Ording et al. |
| 2007/0149252 A1 | 6/2007 | Jobs et al. |
| 2007/0150826 A1 | 6/2007 | Anzures et al. |
| 2007/0150842 A1 | 6/2007 | Chaudhri et al. |
| 2007/0152976 A1 | 7/2007 | Townsend et al. |
| 2007/0152978 A1 | 7/2007 | Kocienda et al. |
| 2007/0152979 A1 | 7/2007 | Jobs et al. |
| 2007/0152980 A1 | 7/2007 | Kocienda et al. |
| 2007/0152983 A1 | 7/2007 | McKillop et al. |
| 2007/0152984 A1 | 7/2007 | Ording et al. |
| 2007/0155434 A1 | 7/2007 | Jobs et al. |
| 2007/0156364 A1 | 7/2007 | Rothkopf |
| 2007/0157089 A1 | 7/2007 | van Os et al. |
| 2007/0174257 A1 | 7/2007 | Howard |
| 2007/0176903 A1 | 8/2007 | Dahlin et al. |
| 2007/0177803 A1 | 8/2007 | Elias et al. |
| 2007/0177804 A1 | 8/2007 | Elias et al. |
| 2007/0185876 A1 | 8/2007 | Mendis et al. |
| 2007/0198926 A1 | 8/2007 | Joguet et al. |
| 2007/0214436 A1 | 9/2007 | Myers |
| 2007/0214462 A1 | 9/2007 | Boillot |
| 2007/0226636 A1 | 9/2007 | Carpenter et al. |
| 2007/0236472 A1 | 10/2007 | Bentsen et al. |
| 2007/0242056 A1 | 10/2007 | Engelhardt et al. |
| 2007/0242607 A1 | 10/2007 | Sadler et al. |
| 2007/0247435 A1 | 10/2007 | Benko et al. |
| 2007/0247442 A1 | 10/2007 | Andre et al. |
| 2007/0252821 A1 | 11/2007 | Hollemans et al. |
| 2007/0262964 A1 | 11/2007 | Zotov et al. |
| 2007/0277124 A1 | 11/2007 | Shin et al. |
| 2007/0288856 A1 | 12/2007 | Butlin et al. |
| 2007/0291009 A1 | 12/2007 | Wright et al. |
| 2007/0296707 A1 | 12/2007 | Kang et al. |
| 2008/0001923 A1 | 1/2008 | Hall et al. |
| 2008/0005703 A1 | 1/2008 | Radivojevic et al. |
| 2008/0012835 A1 | 1/2008 | Rimon et al. |
| 2008/0016096 A1 | 1/2008 | Wilding et al. |
| 2008/0027642 A1 | 1/2008 | Winberry et al. |
| 2008/0028327 A1 | 1/2008 | Hirota et al. |
| 2008/0034029 A1 | 2/2008 | Fang et al. |
| 2008/0036743 A1 | 2/2008 | Westerman et al. |
| 2008/0041640 A1 | 2/2008 | Gillespie et al. |
| 2008/0043020 A1 | 2/2008 | Snow et al. |
| 2008/0048978 A1 | 2/2008 | Trent, Jr. et al. |
| 2008/0072143 A1 | 3/2008 | Assadollahi |
| 2008/0082934 A1 | 4/2008 | Kocienda et al. |
| 2008/0084400 A1 | 4/2008 | Rosenberg |
| 2008/0094356 A1 | 4/2008 | Ording et al. |
| 2008/0094368 A1 | 4/2008 | Ording et al. |
| 2008/0104544 A1 | 5/2008 | Collins et al. |
| 2008/0114614 A1 | 5/2008 | Mahesh et al. |
| 2008/0115086 A1 | 5/2008 | Rupp et al. |
| 2008/0120576 A1 | 5/2008 | Kariathungal et al. |
| 2008/0122806 A1 | 5/2008 | Ahn |
| 2008/0158170 A1 | 7/2008 | Herz et al. |
| 2008/0158191 A1 | 7/2008 | Yang et al. |
| 2008/0162751 A1 | 7/2008 | Wilson |
| 2008/0165022 A1 | 7/2008 | Herz et al. |
| 2008/0165132 A1 | 7/2008 | Weiss et al. |
| 2008/0165136 A1 | 7/2008 | Christie et al. |
| 2008/0165140 A1 | 7/2008 | Christie et al. |
| 2008/0165141 A1 | 7/2008 | Christie |
| 2008/0165160 A1 | 7/2008 | Kocienda et al. |
| 2008/0165161 A1 | 7/2008 | Platzer et al. |
| 2008/0166049 A1 | 7/2008 | Wang et al. |
| 2008/0168384 A1 | 7/2008 | Platzer et al. |
| 2008/0168388 A1 | 7/2008 | Decker |
| 2008/0168395 A1 | 7/2008 | Ording et al. |
| 2008/0168402 A1 | 7/2008 | Blumenberg |
| 2008/0168405 A1 | 7/2008 | Tolmasky et al. |
| 2008/0168478 A1 | 7/2008 | Platzer et al. |
| 2008/0172633 A1 | 7/2008 | Jeon et al. |
| 2008/0195388 A1 | 8/2008 | Bower et al. |
| 2008/0207130 A1 | 8/2008 | Kunii |
| 2008/0218489 A1 | 9/2008 | Park et al. |
| 2008/0225014 A1 | 9/2008 | Kim |
| 2008/0231610 A1 | 9/2008 | Hotelling et al. |
| 2008/0316178 A1 | 12/2008 | Caliksan et al. |
| 2008/0316183 A1 | 12/2008 | Westerman et al. |
| 2009/0037849 A1 | 2/2009 | Immonen et al. |
| 2009/0048000 A1 | 2/2009 | Ade-Hall |
| 2009/0049388 A1 | 2/2009 | Taib et al. |
| 2009/0051671 A1 | 2/2009 | Konstas |
| 2009/0058820 A1 | 3/2009 | Hinckley |
| 2009/0058830 A1 | 3/2009 | Herz et al. |
| 2009/0063135 A1 | 3/2009 | Fux et al. |
| 2009/0064047 A1 | 3/2009 | Shim et al. |
| 2009/0070098 A1 | 3/2009 | Patryshev |
| 2009/0207140 A1 | 8/2009 | Hansson |
| 2009/0211891 A1 | 8/2009 | Lai et al. |
| 2009/0225037 A1 | 9/2009 | Williamson et al. |
| 2009/0225038 A1 | 9/2009 | Bolsinga et al. |
| 2009/0225039 A1 | 9/2009 | Williamson et al. |
| 2009/0225041 A1 | 9/2009 | Kida et al. |
| 2009/0228828 A1 | 9/2009 | Beatty et al. |
| 2009/0228901 A1 | 9/2009 | Beaver et al. |
| 2009/0231281 A1 | 9/2009 | Whytock et al. |

(56) References Cited

U.S. PATENT DOCUMENTS

| | | |
|---|---|---|
| 2009/0244020 A1 | 10/2009 | Sjolin |
| 2009/0251434 A1 | 10/2009 | Rimon et al. |
| 2009/0259969 A1 | 10/2009 | Pallakoff |
| 2009/0262087 A1 | 10/2009 | Kim |
| 2009/0271704 A1 | 10/2009 | Cohen |
| 2009/0273571 A1 | 11/2009 | Bowens |
| 2009/0282332 A1 | 11/2009 | Porat |
| 2009/0284479 A1 | 11/2009 | Dennis et al. |
| 2009/0300530 A1 | 12/2009 | Falchuk |
| 2009/0303187 A1 | 12/2009 | Pallakoff |
| 2009/0304281 A1 | 12/2009 | Yipu |
| 2009/0309847 A1 | 12/2009 | Russell et al. |
| 2009/0322687 A1 | 12/2009 | Duncan et al. |
| 2009/0322699 A1 | 12/2009 | Hansson |
| 2009/0322700 A1 | 12/2009 | D'Souza et al. |
| 2010/0013676 A1 | 1/2010 | Do et al. |
| 2010/0020025 A1 | 1/2010 | Lemort et al. |
| 2010/0020221 A1 | 1/2010 | Tupman et al. |
| 2010/0030612 A1 | 2/2010 | Kim et al. |
| 2010/0046850 A1 | 2/2010 | Ho et al. |
| 2010/0060666 A1 | 3/2010 | Fong |
| 2010/0066676 A1* | 3/2010 | Kramer .......... G06F 3/017 345/158 |
| 2010/0085323 A1 | 4/2010 | Bogue |
| 2010/0107116 A1 | 4/2010 | Rieman et al. |
| 2010/0146458 A1 | 6/2010 | Wadekar |
| 2010/0149122 A1 | 6/2010 | Lin |
| 2010/0156804 A1 | 6/2010 | Young |
| 2010/0169841 A1 | 7/2010 | Singh |
| 2010/0177053 A2 | 7/2010 | Yasutake |
| 2010/0182246 A1 | 7/2010 | Petschnigg et al. |
| 2010/0182248 A1 | 7/2010 | Chun |
| 2010/0188328 A1 | 7/2010 | Dodge et al. |
| 2010/0235118 A1 | 9/2010 | Moore et al. |
| 2010/0235745 A1 | 9/2010 | Shintani |
| 2010/0245267 A1 | 9/2010 | Min et al. |
| 2010/0267449 A1 | 10/2010 | Gagner et al. |
| 2010/0281435 A1 | 11/2010 | Bangalore et al. |
| 2010/0283739 A1 | 11/2010 | Zhang et al. |
| 2010/0299594 A1 | 11/2010 | Zalewski et al. |
| 2010/0309147 A1 | 12/2010 | Fleizach et al. |
| 2010/0325575 A1 | 12/2010 | Platzer et al. |
| 2011/0037714 A1 | 2/2011 | Seo et al. |
| 2011/0047459 A1 | 2/2011 | Van Der Westhuizen |
| 2011/0069021 A1 | 3/2011 | Hill |
| 2011/0090257 A1 | 4/2011 | Ko et al. |
| 2011/0102336 A1 | 5/2011 | Seok et al. |
| 2011/0102464 A1 | 5/2011 | Godavari |
| 2011/0115745 A1 | 5/2011 | Cabrera Cordon et al. |
| 2011/0167391 A1 | 7/2011 | Momeyer et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0242032 A1 | 10/2011 | Seo et al. |
| 2011/0252306 A1 | 10/2011 | Williamson et al. |
| 2011/0252307 A1 | 10/2011 | Williamson et al. |
| 2011/0252368 A1 | 10/2011 | Anzures et al. |
| 2011/0258537 A1 | 10/2011 | Rives et al. |
| 2011/0291951 A1 | 12/2011 | Tong |
| 2011/0295596 A1 | 12/2011 | Hung et al. |
| 2011/0298724 A1 | 12/2011 | Ameling et al. |
| 2011/0304550 A1 | 12/2011 | Romera Jolliff et al. |
| 2011/0304560 A1 | 12/2011 | Dale et al. |
| 2011/0307833 A1 | 12/2011 | Dale et al. |
| 2011/0310046 A1 | 12/2011 | Beaver et al. |
| 2011/0310047 A1 | 12/2011 | Moore et al. |
| 2011/0314429 A1 | 12/2011 | Blumenberg |
| 2011/0314430 A1 | 12/2011 | Blumenberg |
| 2011/0321125 A1 | 12/2011 | Kyohgoku et al. |
| 2012/0023443 A1 | 1/2012 | Blumenberg |
| 2012/0023460 A1 | 1/2012 | Blumenberg |
| 2012/0023461 A1 | 1/2012 | Blumenberg |
| 2012/0023509 A1 | 1/2012 | Blumenberg |
| 2012/0026104 A1 | 2/2012 | Ho et al. |
| 2012/0098768 A1 | 4/2012 | Bendewald et al. |
| 2012/0133579 A1 | 5/2012 | Prieur et al. |
| 2012/0169593 A1 | 7/2012 | Mak et al. |
| 2012/0221929 A1 | 8/2012 | Bolsinga et al. |
| 2012/0242584 A1 | 9/2012 | Tuli |
| 2012/0256849 A1 | 10/2012 | Crumly |
| 2012/0278725 A1 | 11/2012 | Gordon et al. |
| 2012/0299852 A1 | 11/2012 | Hsu et al. |
| 2012/0304133 A1 | 11/2012 | Nan et al. |
| 2013/0009986 A1 | 1/2013 | Shah et al. |
| 2013/0016039 A1 | 1/2013 | Moore et al. |
| 2013/0069899 A1 | 3/2013 | Beaver et al. |
| 2013/0120280 A1 | 5/2013 | Kukulski |
| 2013/0135217 A1 | 5/2013 | Honji et al. |
| 2013/0239046 A1 | 9/2013 | Platzer et al. |
| 2013/0244574 A1 | 9/2013 | Okuno et al. |
| 2013/0246861 A1 | 9/2013 | Colley et al. |
| 2013/0275888 A1 | 10/2013 | Williamson et al. |
| 2014/0033131 A1 | 1/2014 | Shaffer et al. |
| 2014/0145995 A1 | 5/2014 | Beaver et al. |
| 2014/0160052 A1 | 6/2014 | Moore et al. |
| 2014/0173419 A1 | 6/2014 | Williamson et al. |
| 2014/0181731 A1 | 6/2014 | Platzer et al. |
| 2014/0189716 A1 | 7/2014 | George et al. |
| 2014/0361982 A1 | 12/2014 | Shaffer |
| 2016/0018981 A1 | 1/2016 | Amerige et al. |
| 2016/0110230 A1 | 1/2016 | Moore et al. |
| 2016/0091977 A1 | 3/2016 | Ortega et al. |
| 2016/0162180 A1 | 6/2016 | Moore et al. |
| 2016/0334990 A1 | 11/2016 | Beaver et al. |
| 2016/0342325 A1 | 11/2016 | Blumenberg |
| 2016/0370987 A1 | 12/2016 | Amerige et al. |
| 2017/0046063 A1 | 2/2017 | Shaffer et al. |
| 2017/0160925 A1 | 6/2017 | Beaver et al. |
| 2017/0286131 A1 | 10/2017 | Shaffer et al. |
| 2017/0308277 A1 | 10/2017 | Platzer et al. |
| 2018/0260113 A1 | 9/2018 | Beaver et al. |

FOREIGN PATENT DOCUMENTS

| | | |
|---|---|---|
| CN | 1326564 A | 12/2001 |
| CN | 1331815 A | 1/2002 |
| CN | 1422481 A | 6/2003 |
| CN | 1695105 A | 11/2005 |
| CN | 1704886 A | 12/2005 |
| CN | 1797308 A | 7/2006 |
| CN | 1841284 A | 10/2006 |
| CN | 1845046 A | 10/2006 |
| CN | 1860429 A | 11/2006 |
| CN | 1942853 A | 4/2007 |
| CN | 1967458 A | 5/2007 |
| CN | 1969254 A | 5/2007 |
| CN | 101040244 A | 9/2007 |
| CN | 101052939 A | 10/2007 |
| CN | 101089804 A | 12/2007 |
| CN | 101339453 A | 1/2009 |
| CN | 101356492 A | 1/2009 |
| CN | 101410781 A | 4/2009 |
| CN | 101526880 A | 9/2009 |
| CN | 101529368 A | 9/2009 |
| CN | 101578577 A | 11/2009 |
| CN | 101636711 A | 1/2010 |
| CN | 101727240 A | 6/2010 |
| CN | 101853105 A | 10/2010 |
| CN | 102768608 A | 11/2012 |
| CN | 103109249 A | 5/2013 |
| DE | 202007013923 U1 | 12/2007 |
| DE | 202005021427 U1 | 2/2008 |
| EP | 0 538 705 A1 | 4/1993 |
| EP | 0 626 635 A2 | 11/1994 |
| EP | 0 635 779 A1 | 1/1995 |
| EP | 0 701 220 A1 | 3/1996 |
| EP | 0 712 825 A1 | 5/1996 |
| EP | 0 880 091 A2 | 11/1998 |
| EP | 1 443 395 A2 | 8/2004 |
| EP | 1 517 228 A2 | 3/2005 |
| EP | 1 171 682 A2 | 11/2006 |
| EP | 1 860 539 A1 | 11/2007 |
| EP | 2 031 837 A2 | 3/2009 |

(56) References Cited

FOREIGN PATENT DOCUMENTS

| | | |
|---|---|---|
| EP | 2 141 576 A2 | 1/2010 |
| EP | 1 964 022 B1 | 3/2010 |
| EP | 2 184 673 A1 | 5/2010 |
| EP | 2 354 930 A1 | 8/2011 |
| EP | 2 390 766 A1 | 11/2011 |
| EP | 2 409 222 A2 | 1/2012 |
| EP | 2 472 384 A1 | 7/2012 |
| GB | 1517521 A | 7/1978 |
| GB | 2319591 A | 5/1998 |
| GB | 2351639 A | 1/2001 |
| GB | 2373778 A | 10/2002 |
| GB | 2404547 A | 7/2003 |
| JP | 02-140822 | 5/1990 |
| JP | 03-271976 | 12/1991 |
| JP | H05-019969 | 1/1993 |
| JP | H05-298002 | 11/1993 |
| JP | 06-149467 | 5/1994 |
| JP | H06-274329 | 9/1994 |
| JP | 08-16314 | 1/1996 |
| JP | H09-44285 | 2/1997 |
| JP | H09-114586 | 5/1997 |
| JP | H10-500509 | 1/1998 |
| JP | H11-085354 | 3/1999 |
| JP | 2000-163031 | 6/2000 |
| JP | 2000-163443 | 6/2000 |
| JP | 2000-222130 | 8/2000 |
| JP | 2000-322199 | 11/2000 |
| JP | 2001-027924 | 1/2001 |
| JP | 2001-051798 | 2/2001 |
| JP | 2001-167227 | 6/2001 |
| JP | 2001-290585 | 10/2001 |
| JP | 2002-041242 | 2/2002 |
| JP | 2002-244848 A | 8/2002 |
| JP | 2003-296024 | 10/2003 |
| JP | 2003-330605 | 11/2003 |
| JP | 2005-056286 | 3/2005 |
| JP | 2005-082086 | 3/2005 |
| JP | 2005-092476 | 4/2005 |
| JP | 2005-100391 | 4/2005 |
| JP | 2005-108211 | 4/2005 |
| JP | 2005-165532 | 6/2005 |
| JP | 2005-242669 | 9/2005 |
| JP | 2005-275652 | 10/2005 |
| JP | 2005-322088 | 11/2005 |
| JP | 2006-024039 | 1/2006 |
| JP | 2006-085356 | 3/2006 |
| JP | 2006-085703 | 3/2006 |
| JP | 2006-102275 | 4/2006 |
| JP | 2006-314167 | 11/2006 |
| JP | 2006-350490 | 12/2006 |
| JP | 2007-523394 | 8/2007 |
| JP | 2008-503125 | 1/2008 |
| JP | 2008-027082 | 2/2008 |
| JP | 2008-508600 | 3/2008 |
| JP | 2008-508601 | 3/2008 |
| JP | 2008-146165 | 6/2008 |
| JP | 2008-203973 | 9/2008 |
| JP | 2008-312153 | 12/2008 |
| JP | 2009-110286 | 5/2009 |
| JP | 2009-169825 | 7/2009 |
| JP | 2009-525538 | 7/2009 |
| JP | 10-503124 | 1/2010 |
| JP | 12-014299 | 1/2012 |
| JP | 2006-245128 | 9/2014 |
| KR | 2009-0057304 | 6/2009 |
| KR | 2009-0057421 | 6/2009 |
| WO | WO 00/38042 A1 | 6/2000 |
| WO | WO 01/29702 A2 | 4/2001 |
| WO | WO 01/77792 A2 | 10/2001 |
| WO | WO 02/01338 A1 | 1/2002 |
| WO | WO 02/08881 A | 1/2002 |
| WO | WO 02/13176 A2 | 2/2002 |
| WO | WO 02/21338 A2 | 3/2002 |
| WO | WO 03/060622 A2 | 7/2003 |
| WO | WO 03/081458 A1 | 10/2003 |
| WO | WO 04/001560 A1 | 12/2003 |
| WO | WO 2005/029460 A1 | 3/2005 |
| WO | WO 05/052773 A2 | 6/2005 |
| WO | WO 06/003590 A2 | 1/2006 |
| WO | WO 2006/003591 A2 | 1/2006 |
| WO | WO 06/020304 A2 | 2/2006 |
| WO | WO 06/020305 A2 | 2/2006 |
| WO | WO 2006/026183 A2 | 3/2006 |
| WO | WO 2006/045530 A2 | 5/2006 |
| WO | WO 2006/067711 A2 | 6/2006 |
| WO | WO 2006/094308 A2 | 9/2006 |
| WO | WO 2006/124248 A2 | 11/2006 |
| WO | WO 2006/128248 A1 | 12/2006 |
| WO | WO 2007/037806 A1 | 4/2007 |
| WO | WO 2007/067858 A1 | 6/2007 |
| WO | WO 2007/079425 A2 | 7/2007 |
| WO | WO 2007/089766 A2 | 8/2007 |
| WO | WO 2008/020446 A1 | 2/2008 |
| WO | WO 2008/030779 A2 | 3/2008 |
| WO | WO 2008/030879 A2 | 3/2008 |
| WO | WO 2008/030880 A1 | 3/2008 |
| WO | WO 2008/085846 A2 | 7/2008 |
| WO | WO 2008/085848 A1 | 7/2008 |
| WO | WO 2008/085855 A1 | 7/2008 |
| WO | WO 2008/085871 A1 | 7/2008 |
| WO | WO 2008/085877 A1 | 7/2008 |
| WO | WO 2008/148021 A2 | 12/2008 |
| WO | WO 2009/018314 A2 | 2/2009 |
| WO | WO 209/111458 A1 | 9/2009 |
| WO | WO 2009/111189 A1 | 9/2009 |
| WO | WO 2009/111460 A1 | 9/2009 |
| WO | WO 2009/111469 A1 | 9/2009 |
| WO | WO 2010/041155 A1 | 4/2010 |
| WO | WO 2010/107669 A2 | 9/2010 |
| WO | WO 2010/144201 A2 | 12/2010 |

OTHER PUBLICATIONS

Anonymous, "Firegestures Version History: Add-ons for Firefox," Internet Article, http://addons.mozilla.org/en-US/firefox/addons/version/6366, Oct. 28, 2009, 6 pages.

Anonymous, "Firegestures: Changelog," Internet Article, http://www.xuldev.org/firegestures/changelog.php, Oct. 27, 2009, 8 pages.

Anonymous, "Firegestures: Firefox Extension," Internet Article, http://www.xuldev.org/firegesture/, Oct. 27, 2009, 2 pages.

Apple Inc., "iPad User Guide for iOS 4.2 Software", http://support.apple.com/kb/index?page=answerlink&url=http%3A%2F%2Fmanuals.infor.apple.com%2Fen_US%2FiPad_iOS4_User_Guide.pdf&answerid=16777220&src=support_site.manuals.search, Nov. 8, 2010, 181 pages.

Apple, "Safari Web Content Guide for iPhone," Apple Inc., Feb. 5, 2008, 96 pages.

*Apple Inc. v. HTC Corporation*, Brief Details of Claim, in the High Court of Justice Chancery Division, Patents Court, Sep. 12, 2011, 2 pages.

*Apple Inc. v. HTC Corporation* Intervention of the Infringer according to Art. 105 EPC, Dec. 12, 2011, 24 pages.

*Apple vs. HTC*, Justice Floyd, Royal Courts of Justice, Jul. 4, 2012, 26 pages.

*Apple Inc. v. HTC Corporation*, Particulars of Claim, in the High Court of Justice, Chancery Division, Patents Court, Sep. 12, 2011, 4 pages.

*Apple Inc. v. HTC Corporation*, Particulars of Infringement, in the High Court of Justice, Chancery Division, Patents Court, Sep. 12, 2011, 5 pages.

*Apple vs HTC*, Reference to Complaint, Letter from Powell Gilbert, Apr. 5, 2012, 12 pages.

*Apple vs HTC*, Reference to Complaint, Letter from Powell Gilbert, Jul. 29, 2011, 22 pages.

*Apple Inc. vs. Samsung Electronics Co. Ltd. et al.*, Judgement, District Court of the Hague, Aug. 24, 2011, 65 pages.

*Apple Inc. vs. Samsung Electronics Co. Ltd. et al.*, Samsung's Motion to Supplement Invalidity, U.S. District Court, Jan. 27, 2012, 47 pages.

Ballard, "Microsoft Makes Research Technologies Available for Licensing," http://www.theserverside.com/news/thread.tss?thread_id=33761, May 5, 2005, 3 pages.

(56) References Cited

OTHER PUBLICATIONS

Bederson, "Photo Mesa 3.1.2, Screen Shots," May 24, 2006 5 pages.
Benko et al., "Precise Selection Techniques for Multi-Touch Screens," Department of Computer Science, Columbia University, NY, Jan. 16, 2006, 10 pages.
Brown, et al., "Distributed Active Objects," Fifth International World Wide Web Conference, Paris, France, May 6-10, 1996, 18 pages.
Buxton, "Multi-Touch Systems that I Have Known and Loved," Jan. 12, 2007, http://www.billbuxton.com/multitouchOverview.html, 25 pages.
Chartier, "Apple Releases iOS 4.3 Beta for Developers," Macworld. com, www.macworld.com/article/1157114/ios_4_3.html, Jan. 12, 2011, 7 pages.
Chen, "The Web is Everywhere," IEEE Communications Magazine, Feb. 5, 2008, 1 page.
Davis, "Flash to the Core," http://www.amazon.com/Flash-Core-Joshua-David/dp/0735712881:Amazon.com, Jul. 24, 2002, 5 pages.
Dewid, "Scroll Control Box," IBM Technical Disclosure Bulletin, vol. 38, Apr. 4, 1993, 6 pages.
Dietz et al., "DiamondTouch: A Multi-User Touch Technology," Mitsubishi Electric Research Laboratories, Cambridge, Massachusetts, Oct. 2003, 11 pages.
Dodge et al., "Microsoft Office Excel 2003 Office Manual," Microsoft Press, vol. 1, Jul. 12, 2004, 5 pages.
"Dreamweaver", www.inforpower.com.cn, Feb. 29, 2008, 18 pages.
Esenther et al., "Fluid DTMouse: Better Mouse Support for Touch-Based Interactions," Mitsubishi Electric Research Laboratories, Cambridge, Massachusetts, May 2006, 5 pages.
Feng et al., "Wireless Java Programming with Java 2 Micro Edition," ASCII Corporation, Kenichi Suzuki, , Japan, May 11, 2002, 90 pages.
Flanagan, JavaScript, 5th Ed., O'Reilly Japan, Jan. 31, 2008, 35 pages.
Forlines et al., "DTLens: Multi-user Tabletop Spatial Data Exploration," Mitsubishi Electric Research Laboratories, Cambridge, Massachusetts, Oct. 2005, 5 pages.
Forlines et al., "Glimpse: A Novel Input Model for Multi-Level Devices," Mitsubishi Electric Research Laboratory, Cambridge, Massachusetts, Dec. 2005, 5 pages.
Han, "TED Ideas Worth Spreading," http://www.ted.com/talks/jeff_han_demos_his_breakthrough_touchscreen.html, Feb. 25, 2006, 1 page.
Holzner, "Built-in JavaScript Objects," JavaScript Complete, McGraw/Hill, New York, Jun. 1998, 9 pages.
Hong et al., "SATIN: A Toolkit for Informal Ink-based Applications", University of California, Berkeley, CA, 2000, 10 pages.
IPhone Development Wiki, "UI GestureRecognizer", http://iphonedevwiki.net/index.php?title+UIGestureRecognizer&oldid=319, Oct. 31, 2009, 3 pages.
Ivanov, "API Hooking Revealed", Code Project, www.codeproject.com/Articles/2082/API-hooking-revealed, Dec. 2, 2002, 16 pages.
JazzMutant, "Lemur v1.3 Examples Package: CursorModes.xml," http://www.jazzmutant.com/support_download.php>, Jan. 31, 2006, 4 pages.
JazzMutant, The Lemur Owner's Manual, 2005 JazzMutant SAS and Cycling '74, //www.jazzmutant.com/support_download.php, Oct. 31, 2005, 108 pages.
JazzMutant, Lemur v1.3 Documentation Addendum, http://www.jazzmutant.com/support_download.php, Mar. 22, 2005, 3 pages.
JazzMutant, Lemur v1.3 Examples package: LightStepSeq.xml, http://www.jazzmutant.com/support_download.php, Jan. 31, 2006, 5 pages.
JazzMutant, Support, web.archive.org/web/20060421144624/http://www.jazzmutant.com/support_download.php, Apr. 21, 2006, 2 pages.
Karlson et al., AppLens and LaunchTile: Two Designs for One-handed Thumb Use on Small Devices, PowerPoint presentation, Computer Science Department, University of Maryland, College Park, MD, Apr. 2-7, 2005, 17 pages.
Karlson et al., "AppLens and LaunchTile: Two Designs for One-handed Thumb Use on Small Devices," paper, Computer Science Department, University of Maryland, College Park, MD, Apr. 2-7, 2005, 10 pages.
KennyTM, "UIGestureRecognizer," from iPhone Development Wiki, Oct. 31, 2009, http://iphonedevwiki.net/index.php?title=UIGestureRecognizer&oldid=319http://iphonedevwiki.net/index.php?title=UIGestureRecognizer&action=history, 3 pages.
Kim et al., "HCI (Human Computer Interaction) Using Multi-touch Tabletop Display," Department of Computer Engineering, Chonnam National University, Gwangju Korea, Aug. 24, 2007, 4 pages.
Landay, "Extending an Existing User Interface Toolkit to Support Gesture Recognition", School of Computer Science, Pittsburgh, PA, USA, 1993, 2 pages.
Lin et al., "Embedded GUI Bases on Linux OS and Design Improvement Thereof," May 13, 2004, 6 pages.
Maemo.org, "Coding Style and Programming Guidelines," http://maemo.org/development/documentation/manuals/3-x/maemo_coding_style_and_programming_guides, Nov. 28, 2007, 14 pages.
Malik, "An Exploration of Multi-Finger Interaction on Multi-Touch Surfaces", A thesis submitted in conformity with the requirements for the degree of Doctor of Philosophy Graduate Department of Computer Science—University of Toronto, Dec. 18, 2007, 184 pages.
Masui et al., "Elastic Graphical Interfaces for Precise Data Manipulation," Software Research Laboratories, SHARP Corporation, Nara, Japan, Apr. 1995, 2 pages.
Matsuda et al., "Phosphorylcholine-endcapped oligomer and block co-oligomer and surface biological reactivity," Biomaterials, Jun. 24, 2003, 11 pages.
Mertz et al., "The Influence of Design Techniques on User Interfaces: the DigiStrips Experiment for Air Traffic Control," HCI-aero 2000, Toulouse, France, Sep. 2000, 6 pages.
"Microsoft Word 2003 Screen Shots," Microsoft 2003, 2 pages.
Microsoft, "Microsoft Windows Software Development Kit Update for Windows Vista," www.microsoft.com/en-us/download/details.aspx?displaylang=en&id=23719, Mar. 22, 2007, 26 pages.
Microsoft, Window Styles-Microsoft Windows SDK-Screenshot, Mar. 22, 2007, 2 pages.
Miller, "Archive—Java Technology Products Download, PersonalJava Application Environment," http://java.sun.com/products/personaljava/touchable/, Apr. 13, 2006, 12 pages.
Millhollon, "Microsoft Office Word 2003 Inside Out," Microsoft Press, Redmond, Washington, Oct. 2, 2003, 7 pages.
"MySQL", www.pptph.com.cn, Jul. 31, 2001, 9 pages.
Nathan, "Silverlight 1.0 Unleashed," Sam's Publishing, XP055236068, ISBN: 978-0-672-33007-0, Oct. 16, 2007, 271 pages. (Part One & Part Two).
Nokia, "Hildon User Interface Style Guide Summary," Version 1.1, Apr. 12, 2006, 15 pages.
Olsen, "Building Interactive Systems: Principles for Human-Computer Interaction," Jan. 7, 2009, 6 pages.
Olsen, "Developing User Interfaces," Morgan Kaufmann Publishers, San Francisco, California, 1998, Chapter 4, 40 pages.
Petzold, "Programming Microsoft Windows with C#," Core Reference, Jan. 18, 2002, 5 pages.
Pixley, "Document Object Model (DOM) Level 2 Events Specification, Version 1," Netscape Communications Corp., W3C, Nov. 13, 2000, 47 pages.
Plaisant et al., "Touchscreen Toggle Design," Human-Computer Interaction Laboratory, University of Maryland, College Park, MD, May 3-7, 1992, 2 pages.
Pleading notes Mr. B.J. Berghuis van Woortman, Aug. 10-11, 2010, 16 pages.
Pleading notes Mr. Kleemans, Mr. Blomme and Mr Van Oorschot, Aug. 10, 2011, 35 pages.
Pogue, "Windows Vista for Starters: The Missing Manual," Safari Books Online, Jan. 25, 2007, 18 pages.
Quinn Emanuel, *Apple Inc*. vs. *Samsung Electronics Co. Ltd., et al.*, Samsung's Patent Local Rule 3-3 and 3-4 Disclosures, U.S. District Court, Oct. 7, 2011, 287 pages.
Quinn Emanuel, Translation Letter to the EPO, dated Apr. 11, 2012, received in European Patent Application No. 08713567.9, 53 pages.

(56) References Cited

OTHER PUBLICATIONS

Quinn Emanuel on behalf of Motorola, Statement letter re Notice of the Opposition Division, Dec. 3, 2013, 13 pages.
Quinn Emanuel on behalf of Motorola, Statement letter re briefs, Jan. 21, 2014, 9 pages.
Quinn Emanuel, response to Appeal Proceedings for European Patent Application No. 09154313.2 (EP 2 098 948 B1), which corresponds with U.S. Appl. No. 12/042,318, Dec. 8, 2014, 34 pages.
Räihä, "Delegation: Dynamic Specialization," Department of Computer Science, University of Tempere, Finland, Nov. 11, 1994, 8 pages.
Ramachandran et al., "An Architecture for Ink Annotations on Web Documents," Proceedings of the 7th International Conference on Document Analysis and Recognition, Aug. 3-6, 2003, 5 pages.
Rappin et al., "wxPython in Action," Manning Publications, http://up07.net/t2az7xty4dpz/sharebookpro.com_350770414.rar, Mar. 2006, 40 pages.
Rogers, "It's for You! An iPhone Development Primer for the Busy College Professor," Computer Science and Information Systems, Northwest Missouri State University, Maryville, MO, Oct. 1, 2009, 8 pages.
Rowan, "Breakthrough Internet Device, Eureka Man," available online at https://web.archive.org/web/20070709083626/http:/leurekaman.com/towards-multti-touch-in-the-browser, Jan. 31, 2007, 2 pages.
Rubine, "The Automatic Recognition of Gestures," submitted in partial fulfillment of the requirements for the degree of Doctor of Philosophy in Computer Science at Carnegie Mellon University, Dec. 1991, 285 pages.
Salmoni, "The Zooming User Interface," Advogato, Aug. 16, 2004, 14 pages.
Samsung, Statement of Defense also Counterclaim (Smartphones), Judge in Interlocutory Proceedings of the Court in The Hague, Jul. 20, 2011, 48 pages.
Samsung, Statement of Defense also Counterclaim (Tablets), Judge in Interlocutory Proceedings of the Court in The Hague, Jul. 20, 2011, 44 pages.
Sells, Windows Forms Programming in C#, Microsoft.net Development Series, Mar. 1, 2004, 9 pages.
Shen et al., "Informing the Design of Direct-Touch Tabletops,", Mitsubishi Electric Research Labs, Oct. 2006, 11 pages.
Thornlund, "Gesture Analyzing for Multi-Touch Screen Interfaces", http://epubl.ltu.se/1404-5494/2007/30/LTU-HIP-EX-0730-SE.pdf, Sep. 17, 2007, 22 pages.
Tidwell, "Magnetism, Designing Interfaces: Patterns for Effective Interaction Design," O'Reilly Media, Inc., Nov. 21, 2005, 2 pages.
Touch, "A Glance at Touch," Technology Handbook, http://www.carrolltouch.com, Jun. 7, 1998, 37 pages.
Venners, "Java's Security Architecture; Java's Security Model and Built-In Safety Features," JavaWorld, Jul. 1997, 7 pages.
W3C, "Document Object Model (DOM) Level 2 Events Specifications," Version 1.0, Nov. 13, 2000, 47 pages.
Wagner & Geyer, Remarks submitted for the Opposition Division, Aug. 10, 2012, 73 pages.
Webster's Dictionary, Definition of the word "Contemporaneous", Jan. 21, 2014, 2 pages.
Westerman, "Hand Tracking Finger Identification and Chordic Manipulation on a Multi-touch Surface," a dissertation submitted to the Faculty of the University of Delaware in partial fulfillment of the requirements for the degree of Doctor of Philosophy in Electrical Engineering, Mar. 20, 1999. 363 pages.
Wikibooks, "Java Programming/Applets/Event Listeners," en.wikibooks.org/w/index.php?title=Java_Programming/Applets/Event_Listeners&oldid=849558 May 1, 2007, 6 pages.
Withers & Rogers LLP, Apple vs. Samsung, Proprietor's Response to Communication under Rule 79(1) EPC, dated Mar. 8, 2012, 8 pages.
Withers & Rogers, Apple's Response to Notice of Intervention from Motorola, Jun. 21, 2012, 3 pages.
Withers & Rogers, Apple's Response to Addendum from Samsung, Jun. 21, 2012, 3 pages.
Withers & Rogers, Preliminary Response to Opponent O1's written submissions, Dec. 3, 2013, 11 pages.
Withers Rogers, Revised Second Auxiliary Request, Jan. 30, 2014, 8 pages.
Withers Rogers, Grounds of Appeal in support of the Notice of Appeal, Aug. 4, 2014, 24 pages.
Withers Rogers, Comments on Sections 3.1 and 3.4 of the Withdrawn Appeal, Oct. 14, 2014, 3 pages.
YouTube, "A Lemurized Formula," http://www.youtube.com/watch?v=sHAMyQak-LM, Dec. 15, 2007, 1 page.
Zimmerman & Partner, Samsung Electronics GMmbH, Supplement to Notice of Opposition, Apr. 5, 2011, 6 pages.
Zimmerman & Partner, Samsung Electronics GmbH/Apple Inc. vs EP 2 126 678 B1 (08713567.9) Opposition, Jan. 30, 2012, 27 pages.
Zimmermann & Partner, Response to Summons letter, Nov. 7, 2013, 33 pages.
Zimmermann & Partner, Response to letter dated Jan. 3, 2014, 10 pages.
TR—Notice of Allowance, dated Jan. 30, 2012, received in Canadian Patent Application No. 2,658,177, 1 page.
TR—Office Action, dated Jun. 22, 2011, received in Canadian Patent Application No. 2,658,177, 2 pages.
TR—Office Action, dated Dec. 1, 2009, received in Canadian Patent Application No. 2,658,177, 2 pages.
TR—Office Action, dated Nov. 4, 2013, received in Canadian Patent Application No. 2,759090, 3 pages.
TR—Office Action, dated Nov. 7, 2013, received in Canadian Patent Application No. 2,759,091, 4 pages.
TR—Final Office Action, dated Nov. 13, 2009, received in U.S. Appl. No. 11/620,709, 8 pages.
TR—Office Action, dated Apr. 1, 2009, received in U.S. Appl. No. 11/620,709, 8 pages.
TR—Office Action, dated Jun. 9, 2010, received in U.S. Appl. No. 11/620,709, 8 pages.
TR—Office Action, dated Jul. 21, 2010, received in U.S. Appl. No. 11/620,710, 29 pages.
TR—Notice of Allowance, dated Jul. 20, 2010, received in U.S. Appl. No. 11/620,717, 11 pages.
TR—Office Action, dated Jul. 8, 2009, received in U.S. Appl. No. 11/620,717, 6 pages.
TR—Office Action, dated Dec. 29, 2009, received in U.S. Appl. No. 11/620,717, 8 pages.
TR—Office Action (Final), dated Jun. 23, 2009, received in U.S. Appl. No. 11/620,720, 17 pages.
TR—Office Action, dated Nov. 18, 2009, received in U.S. Appl. No. 11/620,720, 17 pages.
TR—Office Action, dated Dec. 23, 2008, received in U.S. Appl. No. 11/620,720, 18 pages.
TR—Final Office Action, dated Nov. 17, 2009, received in U.S. Appl. No. 11/620,723, 8 pages.
TR—Office Action, dated Apr. 1, 2009, received in U.S. Appl. No. 11/620,723, 8 pages.
TR—Office Action, dated Jun. 8, 2010, received in U.S. Appl. No. 11/620,723, 8 pages.
TR—Notice of Allowance, dated Oct. 29, 2008, received in U.S. Appl. No. 11/956,969, 5 pages.
TR—Office Action, dated Mar. 30, 2012, received in U.S. Appl. No. 12/207,429, 9 pages.
TR—Notice of Allowance, dated May 17, 2012, received in U.S. Appl. No. 12/270,805, 14 pages.
TR—Office Action, dated Oct. 11, 2011, received in U.S. Appl. No. 12/270,805, 27 pages.
TR—Office Action, dated Oct. 11, 2011, received in U.S. Appl. No. 12/270,807, 26 pages.
TR—Notice of Allowance, dated May 11, 2012, received in U.S. Appl. No. 12/270,810, 12 pages.
TR—Notice of Allowance, dated Jul. 11, 2012, received in U.S. Appl. No. 12/270,810, 17 pages.
TR—Notice of Allowance, dated Sep. 19, 2012, received in U.S. Appl. No. 12/270,812, 22 pages.

(56) References Cited

OTHER PUBLICATIONS

TR—Office Action, dated Oct. 13, 2011, received in U.S. Appl. No. 12/270,812, 12 pages.
TR—Final Office Action, dated Feb. 14, 2013, received in U.S. Appl. No. 12/270,815, 12 pages.
TR—Office Action, dated May 17, 2012, received in U.S. Appl. No. 12/270,815, 11 pages.
TR—Office Action, dated Oct. 11, 2011, received in U.S. Appl. No. 12/270,815, 12 pages.
TR—Notice of Allowance, dated Feb. 23, 2012, received in U.S. Appl. No. 12/869,182, 5 pages.
TR—Notice of Allowance, dated Dec. 12, 2012, received in U.S. Appl. No. 12/869,182, 5 pages.
TR—Office Action, dated Jun. 20, 2012, received in U.S. Appl. No. 12/869,182, 6 pages.
TR—Office Action, dated Oct. 24, 2011, received in U.S. Appl. No. 12/869,182, 7 pages.
TR—Notice of Allowance, dated Oct. 22, 2013, received in U.S. Appl. No. 13/867,950, 8 pages.
TR—Notice of Allowance, dated Nov. 15, 2013, received in U.S. Appl. No. 13/867,950, 7 pages.
TR—Office Action, dated Jun. 26, 2013, received in U.S. Appl. No. 13/867,950, 5 pages.
TR—Office Action, dated Sep. 24, 2014, received in U.S. Appl. No. 14/189,922, 7 pages.
TR—Certificate of Grant, dated Feb. 3, 2012, received in Hong Kong Patent Application No. 10103983.1, 2 pages.
TR—Summons, dated Oct. 28, 2011, received in European Patent Application No. 08705751.9, 9 pages.
TR—Office Action, dated Nov. 26, 2012, received in European Patent Application No. 08712964.9, 6 pages.
TR—Office Action, dated Oct. 7, 2011, received in European Patent Application No. 08713567.9, 1 page.
TR—Office Action, dated Dec. 29, 2009, received in European Patent Application No. 08713567.9, 5 pages.
TR—Patent, dated Jun. 21, 2012, received in European Patent Application No. 08713567.9, 2 pages.
TR—Ex Parte Reexamination Communication, dated Jul. 26, 2013, received in U.S. Appl. No. 90/012,332, 61 pages.
TR—Office Action, dated Jul. 1, 2008, received in Australian Patent Application No. 2008100283, 2 pages.
TR—Office Action, dated Feb. 19, 2009, received in Australian Patent Application No. 2008201540, 2 pages.
TR—Office Action, dated Jul. 15, 2009, received in Australian Patent Application No. 2008201540, 2 pages.
TR—Office Action, dated Feb. 11, 2009, received in Australian Patent Application No. 2009200366, 2 pages.
TR—Office Action, dated Nov. 24, 2011, received in Australian Patent Application No. 2009208099, 3 pages.
TR—Office Action, dated Apr. 8, 2010, received in Australian Patent Application No. 2009208103, 2 pages.
TR—Office Action, dated Apr. 14, 2011, received in Australian Patent Application No. 2009208103, 3 pages.
TR—Office Action, dated Feb. 12, 2010, received in Japanese Patent Application No. 2009-544996, 3 pages.
TR—Office Action, dated Jun. 1, 2011, received in Japanese Patent Application No. 2009-544996, 1 page.
TR—Office Action, dated Nov. 8, 2010, received in Japanese Patent Application No. 2009-544996, 6 pages.
TR—Patent, dated May 20, 2011, received in Japanese Patent Application No. 2009-544996, 1 page.
TR—Office Action, dated Oct. 26, 2012, received in Japanese Patent Application No. 2010-157302, 4 pages.
TR—Office Action, dated Apr. 15, 2013, received in Japanese Patent Application No. 2010-157303, 4 pages.
TR—Office Action, dated Oct. 15, 2012, received in Japanese Patent Application No. 2010-157303, 4 pages.
TR—Notice of Allowance, dated Nov. 9, 2011, received in Australian Patent Application No. 2011201639, 2 pages.
TR—Innovation Patent, dated Mar. 2, 2012, received in Australian Patent Application No. 2012100050, 1 page.
TR—Office Action, dated Sep. 9, 2013, received in Australian Patent Application No. 2012200689, 3 pages.
TR—Office Action, dated Aug. 27, 2009, received in Korean Patent Application No. 2009-7003574, 1 page
TR—Office Action, dated Jun. 25, 2013, received in Korean Patent Application No. 2013-7000337, 3 pages.
TR—Office Action, dated Oct. 29, 2010, received in German Patent Application No. 112008000144.8, 4 pages.
Office Action, dated Jan. 5, 2012, received in Chinese Patent Application No. 200800000019.9, which corresponds with U.S. Appl. No. 11/956,969, 2 pages.
TR—Office Action, dated Feb. 18, 2013, received in Chinese Patent Application No. 200800000019.9, 2 pages.
TR—Office Action, dated Jul. 23, 2013, received in Chinese Patent Application No. 200800000019.9, 2 pages.
TR—Office Action, dated Sep. 20, 2012, received in Chinese Patent Application No. 200800000019.9, 1 page.
TR—Office Action, dated Nov. 23, 2010, received in Chinese Patent Application No. 200800000019.9, 2 pages.
TR—Office Action, dated Jan. 29, 2012, received in Chinese Patent Application No. 200880001827.7, 5 pages.
TR—Office Action, dated Jul. 2, 2013, received in Chinese Patent Application No. 200880001827.7, 1 page.
TR—Office Action, dated Nov. 11, 2010, received in Chinese Patent Application No. 200880001827.7, 2 pages.
TR—EESR, dated Nov. 29, 2011, received in European Patent Application No. 11182954.5, 6 pages.
TR—EESR, dated Nov. 30, 2011, received in European Patent Application No. 11182959.4, 5 pages.
TR—EESR, dated Jan. 12, 2011, received in European Patent Application No. 11182962.8, 8 pages.
TR—EESR, dated Jan. 12, 2011, received in European Patent Application No. 11182963.6, 7 pages.
TR—International Search Report, dated May 31, 2005, received in International Patent Application No. PCT/US2005/000089, 7 pages.
TR—International Preliminary Report on Patentability, dated Jun. 18, 2008, received in International Patent Application No. PCT/US2005/000089, 5 pages.
TR—International Search Report, dated Jul. 31, 2008, received in International Patent Application No. PCT/US2008/000058, 7 pages.
TR—International Preliminary Report on Patentability, dated Jul. 7, 2009, received in International Patent Application No. PCT/US2008/000058, 5 pages.
TR—International Search Report, dated Mar. 6, 2008, received in International Patent Application No. PCT/US2008/000103, 11 pages.
TR—International Preliminary Report on Patentability, dated Jul. 7, 2009, received in International Patent Application No. PCT/US2008/000103, 9 pages.
TR—Invitation to Pay Additional Fees, PCT Application PCT/US2008/050292, Jul. 18, 2008, 4 pages.
Office Action, dated Dec. 9, 2011, received in U.S. Appl. No. 12/566,660, 6 pages.
Notice of Allowance, dated May 24, 2012, received in U.S. Appl. No. 12/566,660, 9 pages.
Notice of Allowance, dated Jul. 26, 2012, received in U.S. Appl. No. 12/566,660, 5 pages.
Office Action, dated Dec. 9, 2011, received in Australian Patent Application No. 2010226120, which corresponds with U.S. Appl. No. 12/566,660, 3 pages.
Notice of Allowance, dated Nov. 2, 2012, received in Canadian Patent Application No. 2,755,443, which corresponds with U.S. Appl. No. 12/566,660, 1 page.
Notice of Allowance, dated Apr. 10, 2014, received in Canadian Patent Application No. 2,817,648, which corresponds with U.S. Appl. No. 12/566,660, 1 page.
Office Action, dated Oct. 9, 2013, received in Canadian Patent Application No. 2,817,890, which corresponds with U.S. Appl. No. 12/566,660, 3 pages.
Office Action, dated Apr. 22, 2014, received in Canadian Patent Application No. 2,817,890, which corresponds with U.S. Appl. No. 12/566,660, 3 pages.

(56) References Cited

OTHER PUBLICATIONS

Letters Patent, dated Dec. 29, 2015, received in Canadian Patent Application No. 2,817,890, which corresponds with U.S. Appl. No. 12/566,660, 2 pages.
Office Action, dated Nov. 28, 2016, received in Canadian Patent Application No. 2,909,730, which corresponds with U.S. Appl. No. 12/566,660, 4 pages.
Notice of Allowance, dated Oct. 24, 2017, received in Canadian Patent Application No. 2,909,730, which corresponds with U.S. Appl. No. 12/566,660, 1 page.
Patent, dated Jun. 5, 2018, received in Canadian Patent Application No. 2,909,730, which corresponds with U.S. Appl. No. 12/566,660, 4 pages.
Office Action, dated Oct. 31, 2013, received in Chinese Patent Application No. 201080020598.0, which corresponds with U.S. Appl. No. 12/566,660, 4 pages.
Decision to Grant, dated Apr. 24, 2014, received in Chinese Patent Application No. 201080020598.0, which corresponds with U.S. Appl. No. 12/566,660, 1 page.
Office Action, dated Sep. 26, 2016, received in Chinese Patent Application No. 2016092101783870, which corresponds with U.S. Appl. No. 12/566,660, 2 pages.
Notice of Allowance, dated Mar. 21, 2017, received in Chinese Patent Application No. 201410299526.4, which corresponds with U.S. Appl. No. 12/566,660, 3 pages.
Patent, dated Apr. 19, 2017, received in Chinese Patent Application No. 201410299526.4, which corresponds with U.S. Appl. No. 12/566,660, 2 pages.
Office Action, dated Apr. 5, 2017, received in Chinese Patent Application No. 201410299325.4, which corresponds with U.S. Appl. No. 12/566,660, 8 pages.
Patent, dated Aug. 25, 2017, received in Chinese Patent Application No. 201410299325.4, which corresponds with U.S. Appl. No. 12/566,660, 4 pages.
Notice of Allowance, dated Mar. 10, 2017, received in Chinese Patent Application No. 201410299324.X, which corresponds with U.S. Appl. No. 12/566,660, 3 pages.
Patent, dated Apr. 12, 2017, received in Chinese Patent Application No. 201410299324.X, which corresponds with U.S. Appl. No. 12/566,660, 2 pages.
Office Action, dated Jun. 19, 2013, received in European Patent Application No. 10712825.8, which corresponds with U.S. Appl. No. 12/566,660, 5 pages.
Office Action, dated Jul. 1, 2015, received in European Patent Application No. 10712825.8, which corresponds with U.S. Appl. No. 12/566,660, 6 pages.
Office Action, dated Mar. 20, 2014, received in European Patent Application No. 11184186.2, which corresponds with U.S. Appl. No. 12/566,660, 4 pages.
Office Action, dated Jan. 8, 2018, received in European Patent Application No. 11184186.2, which corresponds with U.S. Appl. No. 12/566,660, 4 pages.
Office Action, dated Jun. 3, 2013, received in Japanese Patent Application No. 2012-500844, which corresponds with U.S. Appl. No. 12/566,660, 5 pages.
Office Action, dated Feb. 24, 2014, received in Japanese Patent Application No. 2012-500844, which corresponds with U.S. Appl. No. 12/566,660, 2 pages.
Notice of Allowance, dated Aug. 1, 2014, received in Japanese Patent Application No. 2012-500844, which corresponds with U.S. Appl. No. 12/566,660, 2 pages.
Office Action, dated Sep. 7, 2015, received in Japanese Patent Application No. 2014-129689, which corresponds with U.S. Appl. No. 12/566,660, 3 pages.
Certificate of Patent, dated Jan. 7, 2016, received in Japanese Patent Application No. 2014-129689, which corresponds with U.S. Appl. No. 12/566,660, 3 pages.
Certificate of Patent, dated Feb. 5, 2016, received in Japanese Patent Application No. 2014-129689, which corresponds with U.S. Appl. No. 12/566,660, 1 page.
Office Action, dated Nov. 18, 2016, received in Japanese Patent Application No. 2016-017396, which corresponds with U.S. Appl. No. 12/566,660, 5 pages.
Notice of Allowance, dated Jun. 20, 2017, received in Japanese Patent Application No. 2016-017396, which corresponds with U.S. Appl. No. 12/566,660, 5 pages.
Patent, dated Jul. 28, 2017, received in Japanese Patent Application No. 2016017396, which corresponds with U.S. Appl. No. 12/566,660, 2 pages.
Office Action, dated Jul. 13, 2018, received in Japanese Patent Application No. 2017-139218, which corresponds with U.S. Appl. No. 12/566,660, 5 pages.
Notice of Allowance, dated May 29, 2013, received in Korean Patent Application No. 2011-7024288, which corresponds with U.S. Appl. No. 12/566,660, 2 pages.
Office Action, dated Oct. 4, 2013, received in U.S. Appl. No. 12/789,684, 19 pages.
Final Office Action, dated Mar. 7, 2014, received in U.S. Appl. No. 12/789,684, 23 pages.
Office Action, dated Jul. 18, 2014, received in U.S. Appl. No. 12/789,684, 29 pages.
Office Action, dated Jan. 28, 2015, received in U.S. Appl. No. 12/789,684, 29 pages.
Notice of Allowance, dated Aug. 14, 2015, received in U.S. Appl. No. 12/789,684, 15 pages.
Office Action, dated Mar. 4, 2013, received in U.S. Appl. No. 12/789,695, 13 pages.
Office Action, dated Oct. 24, 2013, received in U.S. Appl. No. 12/789,695, 14 pages.
Final Office Action, dated May 7, 2014, received in U.S. Appl. No. 12/789,695, 17 pages.
Office Action, dated Jul. 1, 2015, received in U.S. Appl. No. 12/789,695, 15 pages.
Final Office Action, dated Feb. 22, 2016, received in U.S. Appl. No. 12/789,695, 17 pages.
Notice of Acceptance, dated May 1, 2014, received in Australian Patent Application No. 2011209720, which corresponds with U.S. Appl. No. 12/789,695, 3 pages.
Office Action, dated Jun. 28, 2013, received in Australian Patent Application No. 2011209720, which corresponds with U.S. Appl. No. 12/789,695, 4 pages.
Office Action, dated Aug. 27, 2015, received in Australian Patent Application No. 2014213525, which corresponds with U.S. Appl. No. 12/789,695, 6 pages.
Notice of Allowance, dated Apr. 14, 2016, received in Australian Patent Application No. 2014213525, which corresponds with U.S. Appl. No. 12/789,695, 1 page.
Certificate of Grant, dated Aug. 11, 2016, received in Australian Patent Application No. 2014213525, which corresponds with U.S. Appl. No. 12/789,695, 1 page.
Office Action, dated Jun. 13, 2017, received in Australian Patent Application No. 2016204905, which corresponds with U.S. Appl. No. 12/789,695, 4 pages.
Office Action, dated May 25, 2018, received in Australian Patent Application No. 2016204905, which corresponds with U.S. Appl. No. 12/789,695, 4 pages.
Office Action, dated Oct. 22, 2012, received in Chinese Patent Application No. 201110063183.8, which corresponds with U.S. Appl. No. 12/789,695, 2 pages.
Office Action, dated Aug. 26, 2013, received in Chinese Patent Application No. 201110063183.8, which corresponds with U.S. Appl. No. 12/789,695, 2 pages.
Decision to Grant, dated Feb. 24, 2014, received in Chinese Patent Application No. 201110063183.8, which corresponds with U.S. Appl. No. 12/789,695, 1 page.
Office Action, dated Dec. 3, 2015, received in Chinese Patent Application No. 201310557439.X, which corresponds with U.S. Appl. No. 12/789,695, 2 pages.
Notice of Allowance, dated Jul. 27, 2016, received in Chinese Patent Application No. 201310557439.X, which corresponds with U.S. Appl. No. 12/789,695, 3 pages.

(56) References Cited

OTHER PUBLICATIONS

Patent Certificate, dated Aug. 31, 2016, received in Chinese Patent Application No. 201310557439.X, which corresponds with U.S. Appl. No. 12/789,695, 2 pages.
Office Action, dated Feb. 2, 2016, received in Chinese Patent Application No. 201310557440.2, which corresponds with U.S. Appl. No. 12/789,695, 5 pages.
Office Action, dated Nov. 9, 2016, received in Chinese Patent Application No. 201310557440.2, which corresponds with U.S. Appl. No. 12/789,695, 3 pages.
Office Action, dated May 24, 2016, received in Chinese Patent Application No. 201310557440.2, which corresponds with U.S. Appl. No. 12/789,695, 4 pages.
Notice of Allowance, dated Oct. 24, 2017, received in Chinese Patent Application No. 201310557440.2, which corresponds with U.S. Appl. No. 12/789,695, 3 pages.
Patent Certificate, dated Dec. 5, 2017, received in Chinese Patent Application No. 201310557440.2, which corresponds with U.S. Appl. No. 12/789,695, 4 pages.
Office Action, dated Aug. 24, 2016, received in Chinese Patent Application No. 201410198170.5, which corresponds with U.S. Appl. No. 12/789,695, 2 pages.
Office Action, dated Jul. 10, 2017, received in Chinese Patent Application No. 201410198170.5, which corresponds with U.S. Appl. No. 12/789,695, 3 pages.
Office Action, dated Jan. 26, 2018, received in Chinese Patent Application No. 201410198170.5, which corresponds with U.S. Appl. No. 12/789,695, 4 pages.
Notice of Allowance, dated Aug. 16, 2018, received in Chinese Patent Application No. 201410198170.5, which corresponds with U.S. Appl. No. 12/789,695, 5 pages.
Office Action, dated Jul. 26, 2013, received in European Patent Application No. 11152015.1, which corresponds with U.S. Appl. No. 12/789,695, 6 pages.
Office Action, dated Mar. 29, 2017, received in European Patent Application No. 11152015.1, which corresponds with U.S. Appl. No. 12/789,695, 11 pages.
Office Action, dated Jul. 17, 2015, received in Japanese Patent Application No. 2014-044208, which corresponds with U.S. Appl. No. 12/789,695, 5 pages.
Notice of Allowance, dated Apr. 15, 2016, received in Japanese Patent Application No. 2014-044208, which corresponds with U.S. Appl. No. 12/789,695, 3 pages.
Patent Certificate, dated May 20, 2016, received in Japanese Patent Application No. 2014-044208, which corresponds with U.S. Appl. No. 12/789,695, 2 page.
Notice of Allowance, dated Jul. 28, 2017, received in Japanese Patent Application No. 2016-098113, which corresponds with U.S. Appl. No. 12/789,695, 5 pages.
Patent, dated Sep. 1, 2017, received in Japanese Patent Application No. 2016-098113, which corresponds with U.S. Appl. No. 12/789,695, 3 pages.
Office Action, dated Apr. 30, 2014, received in Korean Patent Application No. 2012-7022239, which corresponds with U.S. Appl. No. 12/789,695, 2 pages.
Notice of Allowance, dated Mar. 30, 2015, received in Korean Patent Application No. 2012-7022239, which corresponds with U.S. Appl. No. 12/789,695, 2 pages.
Notice of Allowance, dated May 23, 2016, received in Korean Patent Application No. 10-2014-7030745, which corresponds with U.S. Appl. No. 12/789,695, 3 pages.
Letters Patent, dated Jul. 29, 2016, received in Korean Patent Application No. 10-2014-7030745, which corresponds with U.S. Appl. No. 12/789,695, 2 pages.
Notice of Allowance, dated Nov. 9, 2016, received in Korean Patent Application No. 10-2016-7020780, which corresponds with U.S. Appl. No. 12/789,695, 4 pages.
Patent, dated Jan. 5, 2017, received in Korean Patent Application No. 10-2016-7020780, which corresponds with U.S. Appl. No. 12/789,695, 3 pages.

Notice of Allowance, dated May 15, 2013, received in U.S. Appl. No. 12/892,848, 10 pages.
Office Action, dated Aug. 14, 2013, received in Australian Patent Application No. 2011268047, which corresponds with U.S. Appl. No. 12/892,848, 2 pages.
Notice of Allowance, dated Mar. 18, 2016, received in Australian Patent Application No. 2014200702, which corresponds with U.S. Appl. No. 12/892,848, 2 pages.
Certificate of Grant, dated Sep. 22, 2016, received in Australian Patent Application No. 2014200702, which corresponds with U.S. Appl. No. 12/892,848, 1 page.
Office Action, dated May 12, 2017, received in Australian Patent Application No. 2016204284, which corresponds with U.S. Appl. No. 12/892,848, 2 pages.
Notice of Acceptance, dated Nov. 15, 2017, received in Australian Patent Application No. 2016204284, which corresponds with U.S. Appl. No. 12/892,848, 3 pages.
Certificate of Grant, dated Mar. 22, 2018, received in Australian Patent Application No. 2016204284, which corresponds with U.S. Appl. No. 12/892,848, 1 page.
Office Action, dated Dec. 3, 2014, received in Chinese Patent Application No. 201180022994.1, which corresponds with U.S. Appl. No. 12/892,848, 2 pages.
Office Action, dated Nov. 24, 2015, received in Chinese Patent Application No. 201180022994.1, which corresponds with U.S. Appl. No. 12/892,848, 2 pages.
Notice of Allowance, dated Apr. 6, 2016, received in Chinese Patent Application No. 201180022994.1, which corresponds with U.S. Appl. No. 12/892,848, 2 pages.
Patent Certificate, dated May 18, 2016, received in Chinese Patent Application No. 201180022994.1, which corresponds with U.S. Appl. No. 12/892,848, 1 page.
Office Action, dated Aug. 27, 2018, received in Chinese Patent Application No. 201610455059.9, which corresponds with U.S. Appl. No. 12/892,848, 5 pages.
Office Action, dated Aug. 22, 2013, received in European Patent Application No. 11727371.4, which corresponds with U.S. Appl. No. 12/892,848, 6 pages.
Office Action, dated Aug. 26, 2015, received in European Patent Application No. 11727371.4, which corresponds with U.S. Appl. No. 12/892,848, 9 pages.
Oral Summons, dated Apr. 23, 2018, received in European Patent Application No. 11727371.4, which corresponds with U.S. Appl. No. 12/892,848, 11 pages.
Notice of Allowance, dated Aug. 22, 2014, received in Japanese Patent Application No. 2013-515382, which corresponds with U.S. Appl. No. 12/892,848, 3 pages.
Office Action, dated Nov. 13, 2015, received in Japanese Patent Application No. 2014-191701, which corresponds with U.S. Appl. No. 12/892,848, 3 pages.
Notice of Allowance, dated Jun. 27, 2016, received in Japanese Patent Application No. 2014-191701, which corresponds with U.S. Appl. No. 12/892,848, 3 pages.
Certificate of Patent, dated Jul. 29, 2016, received in Japanese Patent Application No. 2014-191701, which corresponds with U.S. Appl. No. 12/892,848, 2 pages.
Notice of Allowance, dated Jun. 5, 2017, received in Japanese Patent Application No. 2016-144701, which corresponds with U.S. Appl. No. 12/892,848, 5 pages.
Patent, dated Jun. 23, 2017, received in Japanese Patent Application No. 2016-144701, which corresponds with U.S. Appl. No. 12/892,848, 2 pages.
Office Action, dated Oct. 9, 2012, received in U.S. Appl. No. 12/892,851, 11 pages.
Final Office Action, dated Jul. 19, 2013, received in U.S. Appl. No. 12/892,851, 12 pages.
Office Action, dated May 22, 2014, received in U.S. Appl. No. 12/892,851, 11 pages.
Office Action, dated Nov. 4, 2016, received in U.S. Appl. No. 12/892,851, 13 pages.
Final Office Action, dated Jun. 30, 2017, received in U.S. Appl. No. 12/892,851, 17 pages.

(56) References Cited

OTHER PUBLICATIONS

Notice of Allowance, dated Jun. 27, 2018, received in U.S. Appl. No. 12/892,851, 7 pages.
Notice of Allowance, dated Jun. 27, 2013, received in U.S. Appl. No. 13/077,925, 10 pages.
Office Action, dated Dec. 10, 2014, received in Australian Patent Application No. 2011349513, which corresponds with U.S. Appl. No. 13/077,925, 3 pages.
Certificate of Grant, dated Jul. 16, 2015, received in Australian Patent Application No. 2011349513, which corresponds with U.S. Appl. No. 13/077,925, 2 pages.
Office Action, dated Mar. 15, 2016, received in Australian Patent Application No. 2015203638, which corresponds with U.S. Appl. No. 13/077,925, 3 pages.
Office Action, dated Oct. 24, 2017, received in Australian Patent Application No. 2017200807, which corresponds with U.S. Appl. No. 13/077,925, 3 pages.
Notice of Acceptance, dated Apr. 20, 2018, received in Australian Patent Application No. 2017200807, which corresponds with U.S. Appl. No. 13/077,925, 3 pages.
Office Action, dated Apr. 30, 2014, received in Chinese Patent Application No. 201110463262.8, which corresponds with U.S. Appl. No. 13/077,925, 2 pages.
Office Action, dated Sep. 23, 2015, received in Chinese Patent Application No. 201110463262.8, which corresponds with U.S. Appl. No. 13/077,925, 2 pages.
Notice of Allowance, dated Apr. 1, 2016, received in Chinese Patent Application No. 201110463262.8, which corresponds with U.S. Appl. No. 13/077,925, 2 pages.
Letters Patent, dated May 4, 2016, received in Chinese Patent Application No. 201110463262.8, which corresponds with U.S. Appl. No. 13/077,925, 3 pages.
Office Action, dated Oct. 19, 2012, received in Chinese Patent Application No. 201120580018.5, which corresponds with U.S. Appl. No. 13/077,925, 2 pages.
Office Action, dated Apr. 22, 2013, received in Chinese Patent Application No. 201120580018.5, which corresponds with U.S. Appl. No. 13/077,925, 2 pages.
Notification of Grant, dated Jul. 26, 2013, received in Chinese Patent Application No. 201120580018.5, which corresponds with U.S. Appl. No. 13/077,925, 1 page.
Office Action, dated Jul. 1, 2014, received in European Patent Application No. 11808779.0, which corresponds with U.S. Appl. No. 13/077,925, 5 pages.
Decision to Grant, dated Jul. 20, 2017, received in European Patent Application No. 11808779.0, which corresponds with U.S. Appl. No. 13/077,925, 2 pages.
Patent, Aug. 16, 2017, received in European Patent Application No. 11808779.0, which corresponds with U.S. Appl. No. 13/077,925, 2 pages.
Grant, dated Aug. 4, 2017, received in Hong Kong Patent Application No. 13104376.1, which corresponds with U.S. Appl. No. 13/077,925, 1 page.
Grant, dated May 4, 2018, received in Hong Kong Patent Application No. 14104128.1, which corresponds with U.S. Appl. No. 13/077,925, 2 pages.
Notice of Allowance, dated Jun. 27, 2016, received in Japanese Patent Application No. 2015-077922, which corresponds with U.S. Appl. No. 13/077,925, 5 pages.
Certificate of Patent, dated Aug. 5, 2016, received in Japanese Patent Application No. 2015-077922, which corresponds with U.S. Appl. No. 13/077,925, 2 pages.
Office Action, dated Jun. 2, 2017, received in Japanese Patent Application No. 2016-146769, which corresponds with U.S. Appl. No. 13/077,925, 7 pages.
Office Action, dated Feb. 23, 2018, received in Japanese Patent Application No. 2016-146769, which corresponds with U.S. Appl. No. 13/077,925, 6 pages.
Office Action, dated Jun. 26, 2014, received in Korean Patent Application No. 2013-7019463, which corresponds with U.S. Appl. No. 13/077,925, 2 pages.
Office Action, dated Oct. 20, 2015, received in Korean Patent Application No. 2014-7036632, which corresponds with U.S. Appl. No. 13/077,925, 2 pages.
Notice of Allowance, dated Apr. 29, 2016, received in Korean Patent Application No. 2014-7036632, which corresponds with U.S. Appl. No. 13/077,925, 3 pages.
Letters Patent, dated Jul. 29, 2016, received in Korean Patent Application No. 2014-7036632, which corresponds with U.S. Appl. No. 13/077,925, 3 pages.
Office Action, dated Aug. 23, 2016, received in Korean Patent Application No. 2016-7020964, which corresponds with U.S. Appl. No. 13/077,925, 2 pages.
Notice of Allowance, dated Mar. 31, 2017, received in Korean Patent Application No. 2016-7020964, which corresponds with U.S. Appl. No. 13/077,925, 4 pages.
Patent, dated Jun. 30, 2017, received in Korean Patent Application No. 2016-7020964, which corresponds with U.S. Appl. No. 13/077,925, 3 pages.
Office Action, dated Jul. 20, 2017, received in Korean Patent Application No. 2017-7018175, which corresponds with U.S. Appl. No. 13/077,925, 5 pages.
Notice of Allowance, dated Jan. 31, 2018, received in Korean Patent Application No. 2017-7018175, which corresponds with U.S. Appl. No. 13/077,925, 4 pages.
Patent, dated Apr. 26, 2018, received in Korean Patent Application No. 2017-7018175, which corresponds with U.S. Appl. No. 13/077,925, 2 pages.
Office Action, dated Apr. 8, 2014, received in Taiwanese Patent Application No. 100147539, which corresponds with U.S. Appl. No. 13/077,925, 4 pages.
Notice of Allowance, dated Oct. 5, 2015, received in Taiwanese Patent Application No. 103144867, which corresponds with U.S. Appl. No. 13/077,925, 3 pages.
Certificate of Grant, dated Feb. 1, 2016, received in Taiwanese Patent Application No. 103144867, which corresponds with U.S. Appl. No. 13/077,925, 2 pages.
Office Action, dated Feb. 16, 2011, received in U.S. Appl. No. 12/042,318, 25 pages.
Final Office Action, dated Sep. 15, 2011, received in U.S. Appl. No. 12/042,318, 39 pages.
Notice of Allowance, dated Dec. 16, 2013, received in U.S. Appl. No. 12/042,318, 30 pages.
Office Action, dated Feb. 25, 2011, received in Australian Patent Application No. 2009200493, which corresponds with U.S. Appl. No. 12/042,318, 3 pages.
Office Action, dated Aug. 9, 2011, received in Australian Patent Application No. 2009200493, which corresponds with U.S. Appl. No. 12/042,318, 2 pages.
Office Action, dated Feb. 22, 2012, received in Australian Patent Application No. 2011205170, which corresponds with U.S. Appl. No. 12/042,318, 3 pages.
Notice of Acceptance, dated Jul. 3, 2013, received in Australian Patent Application No. 2011205170, which corresponds with U.S. Appl. No. 12/042,318, 2 pages.
Office Action, dated Dec. 13, 2011, received in Australian Patent Application No. 2011101154, which corresponds with U.S. Appl. No. 12/042,318, 4 pages.
Letters Patent, dated May 7, 2012, received in Australian Patent Application No. 2011101154, which corresponds with U.S. Appl. No. 12/042,318, 1 page.
Office Action, dated Dec. 13, 2011, received in Australian Patent Application No. 2011101157, which corresponds with U.S. Appl. No. 12/042,318, 4 pages.
Letters Patent, dated May 8, 2012, received in Australian Patent Application No. 2011101157, which corresponds with U.S. Appl. No. 12/042,318, 1 page.
Office Action, dated Dec. 13, 2011, received in Australian Patent Application No. 2011101156, which corresponds with U.S. Appl. No. 12/042,318, 3 pages.

(56) References Cited

OTHER PUBLICATIONS

Letters Patent, dated May 8, 2012, received in Australian Patent Application No. 2011101156, which corresponds with U.S. Appl. No. 12/042,318, 1 page.
Office Action, dated Dec. 13, 2011, received in Australian Patent Application No. 2011101155, which corresponds with U.S. Appl. No. 12/042,318, 3 pages.
Letters Patent, dated May 8, 2012, received in Australian Patent Application No. 2011101155, which corresponds with U.S. Appl. No. 12/042,318, 1 page.
Office Action, dated Sep. 3, 2012, received in Australian Patent Application No. 2011265335, which corresponds with U.S. Appl. No. 12/042,318, 2 pages.
Notice of Acceptance, dated Nov. 8, 2012, received in Australian Patent Application No. 2011265335, which corresponds with U.S. Appl. No. 12/042,318, 3 pages.
Notice of Acceptance, dated Jul. 14, 2016, received in Australian Patent Application No. 2013242854, which corresponds with U.S. Appl. No. 12/042,318, 2 pages.
Certificate of Grant, dated Nov. 24, 2016, received in Australian Patent Application No. 2013242854, which corresponds with U.S. Appl. No. 12/042,318, 1 page.
Office Action, dated Feb. 17, 2017, received in Australian Patent Application No. 2016206268, which corresponds with U.S. Appl. No. 12/042,318, 2 pages.
Certificate of Grant, dated Feb. 1, 2018, received in Australian Patent Application No. 2013242854, which corresponds with U.S. Appl. No. 12/042,318, 1 page.
Notice of Allowance, dated Oct. 6, 2017, received in Australian Patent Application No. 2016206268, which corresponds with U.S. Appl. No. 12/042,318, 3 pages.
Office Action, dated Jan. 18, 2012, received in Canadian Patent Application No. 2,653,363, which corresponds with U.S. Appl. No. 12/042,318, 2 pages.
Office Action, dated Sep. 3, 2013, received in Canadian Patent Application No. 2,653,363, which corresponds with U.S. Appl. No. 12/042,318, 3 pages.
Notice of Allowance, dated Apr. 29, 2014, received in Canadian Patent Application No. 2653363, which corresponds with U.S. Appl. No. 12/042,318, 1 page.
Office Action, dated Jan. 7, 2016, received in Canadian Patent Application No. 2653363, which corresponds with U.S. Appl. No. 12/042,318, 4 pages.
Office Action, dated Dec. 28, 2016, received in Canadian Patent Application No. 2653363, which corresponds with U.S. Appl. No. 12/042,318, 1 page.
Office Action, dated Mar. 15, 2017, received in Canadian Patent Application No. 2,931,604, which corresponds with U.S. Appl. No. 12/042,318, 3 pages.
Office Action, dated Feb. 2, 2018, received in Canadian Patent Application No. 2,931,604, which corresponds with U.S. Appl. No. 12/042,318, 6 pages.
Office Action, dated Aug. 6, 2010, received in Chinese Patent Application No. 200910118596.4, which corresponds with U.S. Appl. No. 12/042,318, 2 pages.
Decision to Grant, dated Mar. 22, 2011, received in Chinese Patent Application No. 200910118596.4, 3 pages.
Office Action, dated Aug. 5, 2013, received in Chinese Patent Application No. 201110148738.9, which corresponds with U.S. Appl. No. 12/042,318, 6 pages.
Office Action, dated Jun. 5, 2014, received in Chinese Patent Application No. 201110148738.9, which corresponds with U.S. Appl. No. 12/042,318, 2 pages.
Office Action, dated Feb. 8, 2014, received in Chinese Patent Application No. 201110148738.9, which corresponds with U.S. Appl. No. 12/042,318, 2 pages.
Office Action, dated Jan. 21, 2013, received in Chinese Patent Application No. 201110148738.9, which corresponds with U.S. Appl. No. 12/042,318, 2 pages.

Office Action, dated Jun. 22, 2010, received in German Patent Application No. 102009011687.7, which corresponds with U.S. Appl. No. 12/042,318, 5 pages.
Oral Summons, dated Jul. 11, 2018, received in German Patent Application No. 102009011687.7, which corresponds with U.S. Appl. No. 12/042,318, 30 pages.
Office Action, dated Feb. 12, 2010, received in European Patent Application No. 09154313.2, which corresponds with U.S. Appl. No. 12/042,318, 1 page.
Decision revoking the European Patent, dated Apr. 2, 2014, received in European Patent Application No. 09154313.2, which corresponds with U.S. Appl. No. 12/042,318, 28 pages.
Summons to Oral Proceedings, dated May 15, 2013, received in European Patent Application No. 09154313.2, which corresponds with U.S. Appl. No. 12/042,318, 30 pages.
New Summons to Oral Proceedings, dated Jul. 18, 2013, received in European Patent Application No. 09154313.2, which corresponds with U.S. Appl. No. 12/042,318, 3 pages.
Decision to Grant, dated Jul. 26, 2012, received in European Patent Application No. 11150786.9, which corresponds with U.S. Appl. No. 12/042,318, 1 page.
Office Action, dated May 9, 2014, received in European Patent Application No. 11150788.5, which corresponds with U.S. Appl. No. 12/042,318, 6 pages.
Decision to Grant, dated Sep. 17, 2015, received in European Patent Application No. 11150788.5, which corresponds with U.S. Appl. No. 12/042,318, 1 page.
Patent, dated Oct. 14, 2015, received in European Patent Application No. 11150788.5, which corresponds with U.S. Appl. No. 12/042,318, 1 page.
Office Action, dated May 14, 2014, received in European Patent Application No. 11184167.2, which corresponds with U.S. Appl. No. 12/042,318, 6 pages.
Office Action, dated Apr. 15, 2015, received in European Patent Application No. 11184167.2, which corresponds with U.S. Appl. No. 12/042,318, 3 pages.
Office Action, dated Nov. 25, 2015, received in European Patent Application No. 11184167.2, which corresponds with U.S. Appl. No. 12/042,318, 7 pages.
Office Action, dated Feb. 16, 2016, received in European Patent Application No. 11184167.2, which corresponds with U.S. Appl. No. 12/042,318, 6 pages.
Intention to Grant, dated Sep. 28, 2016, received in European Patent Application No. 11184167.2, which corresponds with U.S. Appl. No. 12/042,318, 5 pages.
Decision to Grant, dated Mar. 23, 2017, received in European Patent Application No. 11184167.2, which corresponds with U.S. Appl. No. 12/042,318, 1 page.
Patent, dated Apr. 19, 2017, received in European Patent Application No. 11184167.2, which corresponds with U.S. Appl. No. 12/042,318, 1 page.
Office Action, dated May 14, 2014, received in European Patent Application No. 11184169.8, which corresponds with U.S. Appl. No. 12/042,318, 6 pages.
Office Action, dated Nov. 25, 2015, received in European Patent Application No. 11184169.8, which corresponds with U.S. Appl. No. 12/042,318, 8 pages.
Office Action, dated Feb. 16, 2016, received in European Patent Application No. 11184169.8, which corresponds with U.S. Appl. No. 12/042,318, 6 pages.
Intention to Grant, dated Sep. 29, 2016, received in European Patent Application No. 11184169.8, which corresponds with U.S. Appl. No. 12/042,318, 5 pages.
Decision to Grant, dated Mar. 23, 2017, received in European Patent Application No. 11184169.8, which corresponds with U.S. Appl. No. 12/042,318, 1 page.
Office Action, dated May 16, 2014, received in European Patent Application No. 11184170.6, which corresponds with U.S. Appl. No. 12/042,318, 5 pages.
Office Action, dated Apr. 16, 2015, received in European Patent Application No. 11184170.6, which corresponds with U.S. Appl. No. 12/042,318, 2 pages.

(56) References Cited

OTHER PUBLICATIONS

Office Action, dated Nov. 30, 2015, received in European Patent Application No. 11184170.6, which corresponds with U.S. Appl. No. 12/042,318, 4 pages.
Intention to Grant, dated Jul. 8, 2016, received in European Patent Application No. 11184170.6, which corresponds with U.S. Appl. No. 12/042,318, 7 pages.
Office Action, dated May 16, 2014, received in European Patent Application No. 11184172.2, which corresponds with U.S. Appl. No. 12/042,318, 5 pages.
Office Action, dated Apr. 17, 2015, received in European Patent Application No. 11184172.2, which corresponds with U.S. Appl. No. 12/042,318, 6 pages.
Office Action, dated Nov. 30, 2015, received in European Patent Application No. 11184172.2, which corresponds with U.S. Appl. No. 12/042,318, 4 pages.
Intention to Grant, dated Jul. 8, 2016, received in European Patent Application No. 11184172.2, which corresponds with U.S. Appl. No. 12/042,318, 5 pages.
Office Action, dated May 16, 2014, received in European Patent Application No. 11184409.8, which corresponds with U.S. Appl. No. 12/042,318, 6 pages.
Office Action, dated Apr. 22, 2015, received in European Patent Application No. 11184409.8, which corresponds with U.S. Appl. No. 12/042,318, 6 pages.
Office Action, dated Nov. 30, 2015, received in European Patent Application No. 11184409.8, which corresponds with U.S. Appl. No. 12/042,318, 4 pages.
Intention to Grant, dated Jul. 1, 2016, received in European Patent Application No. 11184409.8, which corresponds with U.S. Appl. No. 12/042,318, 5 pages.
Office Action, dated Oct. 22, 2014, received in European Patent Application No. 12156394.4, which corresponds with U.S. Appl. No. 12/042,318, 6 pages.
Office Action, dated Nov. 25, 2015, received in European Patent Application No. 12156394.4, which corresponds with U.S. Appl. No. 12/042,318, 8 pages.
Decision to Grant, dated Jul. 28, 2016, received in European Patent Application No. 12156394.4, which corresponds with U.S. Appl. No. 12/042,318, 1 page.
Office Action, dated Oct. 22, 2014, received in European Patent Application No. 12156395.1, which corresponds with U.S. Appl. No. 12/042,318, 6 pages.
Office Action, dated Nov. 25, 2015, received in European Patent Application No. 12156395.1, which corresponds with U.S. Appl. No. 12/042,318, 9 pages.
Intention to Grant, dated Aug. 9, 2016, received in European Patent Application No. 12156395.1, which corresponds with U.S. Appl. No. 12/042,318, 3 pages.
Certificate of Grant, dated Nov. 30, 2012, received in Hong Kong Patent Application No. 11110416.2, which corresponds with U.S. Appl. No. 12/042,318, 1 page.
Certificate of Grant, dated Jul. 17, 2015, received in Hong Kong Patent Application No. 12105027.2, which corresponds with U.S. Appl. No. 12/042,318, 2 pages.
Certificate of Grant, dated Jan. 26, 2018, received in Hong Kong Patent Application No. 12106620.1, which corresponds with U.S. Appl. No. 12/042,318, 4 pages.
Certificate of Grant, dated Jan. 26, 2018, received in Hong Kong Patent Application No. 12106621.0, which corresponds with U.S. Appl. No. 12/042,318, 4 pages.
Certificate of Granted, dated Oct. 27, 2017, received in Hong Kong Patent Application No. 12106622.9, which corresponds with U.S. Appl. No. 12/042,318, 2 pages.
Certificate of Granted, dated Nov. 3, 2017, received in Hong Kong Patent Application No. 12106623.8, which corresponds with U.S. Appl. No. 12/042,318, 2 pages.
Certificate of Grant, dated Nov. 3, 2017, received in Hong Kong Patent Application No. 12106624.7, which corresponds with U.S. Appl. No. 12/042,318, 2 pages.
Office Action, dated Nov. 3, 2017, received in Hong Kong Patent Application No. 13100042.3, which corresponds with U.S. Appl. No. 12/042,318, 2 pages.
Certificate of Grant, dated Oct. 13, 2017, received in Hong Kong Patent Application No. 13100043.2, which corresponds with U.S. Appl. No. 12/042,318, 2 pages.
Office Action, dated Jul. 20, 2015, received in Israel Patent Application No. 197386, which corresponds with U.S. Appl. No. 12/042,318, 3 pages.
Notice of Allowance, dated Nov. 23, 2015, received in Israel Patent Application No. 197386, which corresponds with U.S. Appl. No. 12/042,318, 2 pages.
Patent, dated May 30, 2016, received in Israel Patent Application No. 197386, which corresponds with U.S. Appl. No. 12/042,318, 2 pages.
Office Action, dated Aug. 26, 2011, received in Japanese Patent Application No. 2009-080377, which corresponds with U.S. Appl. No. 12/042,318, 2 pages.
Decision to Grant, dated Jul. 27, 2012, received in Japanese Patent Application No. 2009-080377, which corresponds with U.S. Appl. No. 12/042,318, 4 pages.
Decision to Grant, dated Nov. 1, 2013, received in Japanese Patent Application No. 2012-186775, which corresponds with U.S. Appl. No. 12/042,318, 3 pages.
Office Action, dated Apr. 4, 2016, received in Japanese Patent Application No. 2015-085361, which corresponds with U.S. Appl. No. 12/042,318, 3 pages.
Office Action, dated Sep. 8, 2017, received in Japanese Patent Application No. 2015-085361, which corresponds with U.S. Appl. No. 12/042,318, 4 pages.
Patent, dated Oct. 13, 2017, received in Japanese Patent Application No. 2015-085361, which corresponds with U.S. Appl. No. 12/042,318, 2 pages.
Office Action, dated Jul. 9, 2018, received in Japanese Patent Application No. 2017-195359, which corresponds with U.S. Appl. No. 12/042,318, 5 pages.
Office Action, dated Jan. 18, 2011, received in U.S. Appl. No. 12/042,067, 13 pages.
Final Office Action, dated Jul. 28, 2011, received in U.S. Appl. No. 12/042,067, 12 pages.
Office Action, dated Mar. 14, 2013, received in U.S. Appl. No. 12/042,067, 15 pages.
Notice of Allowance, dated Dec. 6, 2013, received in U.S. Appl. No. 12/042,067, 9 pages.
Notice of Allowance, dated Sep. 27, 2013, received in U.S. Appl. No. 12/042,067, 10 pages.
Office Action, dated Jun. 13, 2012, received in Chinese Patent Application No. 200980000014.0, which corresponds with U.S. Appl. No. 12/042,067, 2 pages.
Office Action, dated Oct. 19, 2011, received in Chinese Patent Application No. 200980000014.0, which corresponds with U.S. Appl. No. 12/042,067, 2 pages.
Decision to Grant, dated Nov. 27, 2012, received in Chinese Patent Application No. 200980000014.0, which corresponds with U.S. Appl. No. 12/042,067, 1 page.
Office Action, dated May 4, 2015, received in Chinese Patent Application No. 20130053142.X, which corresponds with U.S. Appl. No. 12/042,067, 6 pages.
Office Action, dated Mar. 21, 2016, received in Chinese Patent Application No. 20130053142.X, which corresponds with U.S. Appl. No. 12/042,067, 7 pages.
Office Action, dated Oct. 10, 2016, received in Chinese Patent Application No. 20130053142.X, which corresponds with U.S. Appl. No. 12/042,067, 8 pages.
Office Action, dated Jun. 2, 2017, received in Chinese Patent Application No. 20130053142.X, which corresponds with U.S. Appl. No. 12/042,067, 2 pages.
Decision to Grant, dated Apr. 14, 2016, received in European Patent Application No. 09700006.1, which corresponds with U.S. Appl. No. 12/042,067, 1 page.
Office Action, dated Oct. 19, 2010, received in German Patent Application No. 112009000001.0, which corresponds with U.S. Appl. No. 12/042,067, 5 pages.

(56) References Cited

OTHER PUBLICATIONS

Office Action, dated Sep. 26, 2012, received in German Patent Application No. 112009000001.0, which corresponds with U.S. Appl. No. 12/042,067, 5 pages.
Office Action, dated Oct. 15, 2010, received in European Patent Application No. 09700006.1, which corresponds with U.S. Appl. No. 12/042,067, 4 pages.
Decision to Refuse, dated Jul. 15, 2013, received in European Patent Application No. 09700006.1, which corresponds with U.S. Appl. No. 12/042,067, 12 pages.
Summons to Oral Proceedings, dated Mar. 7, 2013, received in European Patent Application No. 09700006.1, which corresponds with U.S. Appl. No. 12/042,067, 5 pages.
Summons to Oral Proceedings, dated Mar. 10, 2015, received in European Patent Application No. 09700006.1, which corresponds with U.S. Appl. No. 12/042,067, 9 pages.
Decision to Grant, dated Apr. 12, 2015, received in European Patent Application No. 09700006.1, which corresponds with U.S. Appl. No. 12/042,067, 5 pages.
Office Action, dated Oct. 30, 2013, received in European Patent Application No. 12188748.3, which corresponds with U.S. Appl. No. 12/042,067, 5 pages.
Decision to refuse, dated Dec. 12, 2014, received in European Patent Application No. 12188748.3, which corresponds with U.S. Appl. No. 12/042,067, 12 pages.
Summons to Attend Oral Proceedings, dated Apr. 22, 2014, received in European Patent Application No. 12188748.3, which corresponds with U.S. Appl. No. 12/042,067, 3 pages.
Appeal Decision, dated Oct. 9, 2017, received in European Patent Application No. 12188748.3, which corresponds with U.S. Appl. No. 12/042,067, 16 pages.
Patent, dated Aug. 4, 2017, received in Honk Kong Patent Application No. 10111901.3, which corresponds with U.S. Appl. No. 12/042,067, 2 pages.
Office Action, dated Oct. 24, 2011, received in Japanese Patent Application No. 2010-502356, which corresponds with U.S. Appl. No. 12/042,067, 2 pages.
Office Action, dated Jan. 6, 2014, received in Japanese Patent Application No. 2012-224838, which corresponds with U.S. Appl. No. 12/042,067, 1 page.
Office Action, dated Jan. 4, 2011, received in U.S. Appl. No. 12/042,299, 9 pages.
Final Office Action, dated Jul. 8, 2011, received in U.S. Appl. No. 12/042,299, 8 pages.
Office Action, dated May 3, 2012, received in U.S. Appl. No. 12/042,299, 9 pages.
Notice of Allowance, dated Dec. 12, 2012, received in U.S. Appl. No. 12/042,299, 8 pages.
Office Action, dated Oct. 26, 2011, received in Chinese Patent Application No. 200980000013.6, which corresponds with U.S. Appl. No. 12/042,299, 2 pages.
Office Action, dated Dec. 5, 2012, received in Chinese Patent Application No. 200980000013.6, which corresponds with U.S. Appl. No. 12/042,299, 2 pages.
Office Action, dated Jun. 6, 2012, received in Chinese Patent Application No. 200980000013.6, which corresponds with U.S. Appl. No. 12/042,299, 2 pages.
Office Action, dated Jul. 3, 2013, received in Chinese Patent Application No. 200980000013.6, which corresponds with U.S. Appl. No. 12/042,299, 6 pages.
Notification of Grant, dated Nov. 6, 2013, received in Chinese Patent Application No. 200980000013.6, which corresponds with U.S. Appl. No. 12/042,299, 3 pages.
Office Action, dated Apr. 28, 2016, received in Chinese Patent Application No. 2016042501712900, which corresponds with U.S. Appl. No. 12/042,299, 2 pages.
Office Action, dated Jul. 20, 2017, received in Chinese Patent Application No. 201410028534.5, which corresponds with U.S. Appl. No. 12/042,299, 5 pages.
Office Action, dated Feb. 9, 2018, received in Chinese Patent Application No. 201410028534.5, which corresponds with U.S. Appl. No. 12/042,299, 3 pages.
Notice of Allowance, dated Jul. 31, 2018, received in Chinese Patent Application No. 201410028534.5, which corresponds with U.S. Appl. No. 12/042,299, 3 pages.
Office Action, dated Jun. 1, 2016, received in Chinese Patent Application No. 2014100285627, which corresponds with U.S. Appl. No. 12/042,299, 3 pages.
Office Action, dated Apr. 26, 2017, received in Chinese Patent Application No. 2014100285627, which corresponds with U.S. Appl. No. 12/042,299, 5 pages.
Notice of Allowance, dated Nov. 28, 2017, received in Chinese Patent Application No. 2014100285627, which corresponds with U.S. Appl. No. 12/042,299, 3 pages.
Patent, dated Feb. 9, 2018, received in Chinese Patent Application No. 2014100285627, which corresponds with U.S. Appl. No. 12/042,299, 4 pages.
Office Action, dated Aug. 10, 2010, received in German Patent Application No. 112009000003.7, which corresponds with U.S. Appl. No. 12/042,299, 3 pages.
Office Action, dated Sep. 26, 2012, received in German Patent Application No. 112009000003.7, which corresponds with U.S. Appl. No. 12/042,299, 5 pages.
Office Action, dated Mar. 9, 2012, received in European Patent Application No. 09700007.9, which corresponds with U.S. Appl. No. 12/042,299, 7 pages.
Office Action, dated Nov. 26, 2010, received in European Patent Application No. 09700007.9, which corresponds with U.S. Appl. No. 12/042,299, 5 pages.
Office Action, dated Aug. 28, 2014, received in European Patent Application No. 09700007.9, which corresponds with U.S. Appl. No. 12/042,299, 8 pages.
Summons to oral proceedings, dated Oct. 30, 2013, received in European Patent Application No. 09700007.9, which corresponds with U.S. Appl. No. 12/042,299, 5 pages.
Decision to Refuse Application, dated Sep. 6, 2017, received in European Patent Application No. 09700007.9, which corresponds with U.S. Appl. No. 12/042,299, 15 pages.
Office Action, dated Sep. 12, 2012, received in European Patent Application No. 11184226.6, which corresponds with U.S. Appl. No. 12/042,299, 5 pages.
Office Action, dated Jul. 25, 2016, received in European Patent Application No. 11184226.6, which corresponds with U.S. Appl. No. 12/042,299, 9 pages.
Summons to Attend Oral Proceedings, dated Dec. 6, 2017, received in European Patent Application No. 11184226.6, which corresponds with U.S. Appl. No. 12/042,299, 8 pages.
Decision to Refuse, dated Jun. 5, 2018, received in European Patent Application No. 11184226.6, which corresponds with U.S. Appl. No. 12/042,299, 14 pages.
Office Action, dated Sep. 12, 2012, received in European Patent Application No. 11184224.1, which corresponds with U.S. Appl. No. 12/042,299, 4 pages.
Decision to Refuse, dated Feb. 11, 2015, received in European Patent Application No. 11184224.1, which corresponds with U.S. Appl. No. 12/042,299, 10 pages.
Summons to Attend Oral Proceedings, dated Oct. 30, 2013, received in European Patent Application No. 11184224.1, which corresponds with U.S. Appl. No. 12/042,299, 5 pages.
Office Action, dated Sep. 1, 2017, received in European Patent Application No. 11184224.1, which corresponds with U.S. Appl. No. 12/042,299, 6 pages.
Office Action, dated Sep. 12, 2012, received in European Patent Application No. 11184223.3, which corresponds with U.S. Appl. No. 12/042,299, 4 pages.
Summons to Attend Oral Proceedings, dated Oct. 30, 2013, received in European Patent Application No. 11184223.3, which corresponds with U.S. Appl. No. 12/042,299, 5 pages.
Decision to refuse, dated Feb. 11, 2015, received in European Patent Application No. 11184223.3, which corresponds with U.S. Appl. No. 12/042,299, 10 pages.

(56) References Cited

OTHER PUBLICATIONS

Office Action, dated Sep. 12, 2012, received in European Patent Application No. 11184222.5, which corresponds with U.S. Appl. No. 12/042,299, 4 pages.
Summons to Attend Oral Proceedings, dated Oct. 30, 2013, received in European Patent Application No. 11184222.5, which corresponds with U.S. Appl. No. 12/042,299, 5 pages.
Decision to refuse dated Feb. 11, 2015, received in European Patent Application No. 11184222.5, which corresponds with U.S. Appl. No. 12/042,299, 10 pages.
Office Action, dated Aug. 15, 2011, received in Japanese Patent Application No. 2010-502358, which corresponds with U.S. Appl. No. 12/042,299, 2 pages.
Decision to Grant, dated Mar. 23, 2012, received in Japanese Patent Application No. 2010-502358, which corresponds with U.S. Appl. No. 12/042,299, 5 pages.
Office Action, dated Sep. 6, 2013, received in Japanese Patent Application No. 2012-088747, which corresponds with U.S. Appl. No. 12/042,299, 4 pages.
Office Action, dated Aug. 11, 2014, received in Japanese Patent Application No. 2012-088747, which corresponds with U.S. Appl. No. 12/042,299, 1 page.
Decision to Grant, dated Feb. 16, 2015, received in Japanese Patent Application No. 2012-088747, which corresponds with U.S. Appl. No. 12/042,299, 3 pages.
Office Action, dated Nov. 30, 2015, received in Japanese Patent Application No. 2014-250268, which corresponds with U.S. Appl. No. 12/042,299, 4 pages.
Letters Patent, dated Jul. 15, 2016, received in Japanese Patent Application No. 2014-250268, which corresponds with U.S. Appl. No. 12/042,299, 2 pages.
Office Action, dated Jun. 2, 2017, received in Japanese Patent Application No. 2016-133582, which corresponds with U.S. Appl. No. 12/042,299, 5 pages.
Notice of Allowance, dated Nov. 17, 2017, received in Japanese Patent Application No. 2016-133582, which corresponds with U.S. Appl. No. 12/042,299, 5 pages.
Patent, dated Jan. 5, 2018, received in Japanese Patent Application No. 2016-133582, which corresponds with U.S. Appl. No. 12/042,299, 2 pages.
Notice of Allowance, dated Jun. 13, 2013, received in U.S. Appl. No. 13/077,927, 10 pages.
Office Action, dated Jan. 3, 2013, received in U.S. Appl. No. 13/077,931, 13 pages.
Final Office Action, dated Sep. 9, 2013, received in U.S. Appl. No. 13/077,931, 14 pages.
Office Action, dated Jul. 17, 2014, received in U.S. Appl. No. 13/077,931, 21 pages.
Office Action, dated Aug. 20, 2015, received in U.S. Appl. No. 13/077,931, 22 pages.
Notice of Allowance, dated Dec. 31, 2014, received in U.S. Appl. No. 13/077,931, 8 pages.
Notice of Allowance, dated Jan. 14, 2016, received in U.S. Appl. No. 13/077,931, 8 pages.
Office Action, dated Nov. 21, 2012, received in U.S. Appl. No. 13/163,624, 9 pages.
Office Action, dated Mar. 22, 2013, received in U.S. Appl. No. 13/163,624, 9 pages.
Office Action, dated Oct. 24, 2013, received in U.S. Appl. No. 13/163,624, 8 pages.
Notice of Allowance, dated May 12, 2014, received in U.S. Appl. No. 13/163,624, 5 pages.
Office Action, dated Mar. 20, 2013, received in U.S. Appl. No. 13/163,626, 8 pages.
Office Action, dated Nov. 26, 2012, received in U.S. Appl. No. 13/163,626, 8 pages.
Office Action, dated Oct. 24, 2013, received in U.S. Appl. No. 13/163,626, 8 pages.
Notice of Allowance, dated Mar. 31, 2014, received in U.S. Appl. No. 13/163,626, 5 pages.
Office Action, dated Dec. 30, 2010, received in U.S. Appl. No. 12/042,237, 9 pages.
Final Office Action, dated Jun. 2, 2011, received in U.S. Appl. No. 12/042,237, 9 pages.
Office Action, dated Sep. 14, 2011, received in U.S. Appl. No. 12/042,237, 8 pages.
Notice of Allowance, dated Mar. 6, 2012, received in U.S. Appl. No. 12/042,237, 8 pages.
Office Action, dated Jul. 14, 2011, received in Chinese Patent Application No. 200980000015.5, which corresponds with U.S. Appl. No. 12/042,237, 2 pages.
Office Action, dated Feb. 22, 2012, received in Chinese Patent Application No. 200980000015.5, which corresponds with U.S. Appl. No. 12/042,237, 2 pages.
Office Action, dated Sep. 11, 2012, received in Chinese Patent Application No. 200980000015.5, which corresponds with U.S. Appl. No. 12/042,237, 1 page.
Office Action, dated Apr. 27, 2017, received in Chinese Patent Application No. 201510175905.7, which corresponds with U.S. Appl. No. 12/042,237, 5 pages.
Office Action, dated Feb. 1, 2018, received in Chinese Patent Application No. 201510175905.7, which corresponds with U.S. Appl. No. 12/042,237, 3 pages.
Office Action, dated Jun. 30, 2017, received in Chinese Patent Application No. 201510175915.0, which corresponds with U.S. Appl. No. 12/042,237, 5 pages.
Office Action, dated Jan. 17, 2018, received in Chinese Patent Application No. 201510175915.0, which corresponds with U.S. Appl. No. 12/042,237, 3 pages.
Office Action, dated Jul. 11, 2018, received in Chinese Patent Application No. 201510175915.0, which corresponds with U.S. Appl. No. 12/042,237, 4 pages.
Office Action, dated Sep. 26, 2012, received in German Patent Application No. 112009000002.9, which corresponds with U.S. Appl. No. 12/042,237, 5 pages.
Office Action, dated Jul. 12, 2010, received in European Patent Application No. 09700008.7, which corresponds with U.S. Appl. No. 12/042,237, 3 pages.
Summons to oral proceedings, dated Mar. 10, 2015, received in European Patent Application No. 09700008.7, which corresponds with U.S. Appl. No. 12/042,299, 12 pages.
Summons to oral proceedings, dated Mar. 27, 2013, received in European Patent Application No. 09700008.7, which corresponds with U.S. Appl. No. 12/042,299, 4 pages.
Decision to Refuse, dated Oct. 8, 2013, received in European Patent Application No. 09700008.7, which corresponds with U.S. Appl. No. 12/042,237, 15 pages.
Decision to Grant, dated Dec. 2, 2015, received in European Patent Application No. 09700008.7, which corresponds with U.S. Appl. No. 12/042,237, 5 pages.
Decision to Grant, dated Apr. 14, 2016, received in European Patent Application No. 09700008.7, which corresponds with U.S. Appl. No. 12/042,237, 1 page.
Patent Certificate, May 11, 2016, received in European Patent Application No. 09700008.7, which corresponds with U.S. Appl. No. 12/042,237, 2 pages.
Office Action, dated Nov. 16, 2016, received in European Patent Application No. 15175530.3, which corresponds with U.S. Appl. No. 12/042,237, 4 pages.
Patent, dated Aug. 4, 2017, received in Honk Kong Application No. 10100282.5, which corresponds with U.S. Appl. No. 12/042,237, 2 pages.
Office Action, dated Sep. 2, 2013, received in Japanese Patent Application No. 2010-502357, which corresponds with U.S. Appl. No. 12/042,237, 11 pages.
Office Action, dated Mar. 4, 2013, received in Japanese Patent Application No. 2010-502357, which corresponds with U.S. Appl. No. 12/042,237, 2 pages.
Office Action, dated Jan. 16, 2012, received in Japanese Patent Application No. 2010-502357, which corresponds with U.S. Appl. No. 12/042,237, 2 pages.

(56) References Cited

OTHER PUBLICATIONS

Office Action, dated Sep. 24, 2013, received in Japanese Patent Application No. 2012-218235, which corresponds with U.S. Appl. No. 12/042,237, 3 pages.
Letters Patent, dated Oct. 31, 2014, received in Japanese Patent Application No. 2012-218235, which corresponds with U.S. Appl. No. 12/042,237, 2 pages.
Office Action, dated May 20, 2015, received in U.S. Appl. No. 13/221,827, 26 pages.
Office Action, dated Jun. 23, 2014, received in U.S. Appl. No. 13/221,827, 18 pages.
Office Action, dated Oct. 4, 2016, received in U.S. Appl. No. 13/221,827, 20 pages.
Notice of Allowance, dated May 5, 2017, received in U.S. Appl. No. 13/221,827, 20 pages.
Notice of Allowance, dated Dec. 3, 2012, received in U.S. Appl. No. 13/221,830, 6 pages.
Notice of Allowance, dated May 23, 2012, received in U.S. Appl. No. 13/221,830, 7 pages.
Office Action, dated Nov. 4, 2011, received in U.S. Appl. No. 11/620,727, 15 pages.
Final Office Action, dated Mar. 12, 2012, received in U.S. Appl. No. 11/620,727, 20 pages.
Office Action, dated Aug. 15, 2012, received in U.S. Appl. No. 11/620,727, 19 pages.
Final Office Action, dated Mar. 7, 2013, received in U.S. Appl. No. 11/620,727, 23 pages.
Examiner's Answer, dated Feb. 13, 2014, received in U.S. Appl. No. 11/620,727, 23 pages.
Office Action, dated Jan. 6, 2012, received in Chinese Patent Application No. 200880001811.6, which corresponds with U.S. Appl. No. 11/620,727, 2 pages.
Office Action, dated Aug. 10, 2011, received in Chinese Patent Application No. 200880001811.6, which corresponds with U.S. Appl. No. 11/620,727, 3 pages.
Office Action, dated Oct. 21, 2010, received in Chinese Patent Application No. 200880001811.6, which corresponds with U.S. Appl. No. 11/620,727, 2 pages.
Office Action, dated Feb. 21, 2014, received in Chinese Patent Application No. 201210128932.5, which corresponds with U.S. Appl. No. 11/620,727, 2 pages.
Office Action, dated Oct. 30, 2014, received in Chinese Patent Application No. 201210128932.5, which corresponds with U.S. Appl. No. 11/620,727, 2 pages.
Office Action, dated May 11, 2015, received in Chinese Patent Application No. 201210128932.5, which corresponds with U.S. Appl. No. 11/620,727, 4 pages.
Office Action, dated Dec. 24, 2014, received in Chinese Patent Application No. 201210128915.1, which corresponds with U.S. Appl. No. 11/620,727, 2 pages.
Notice of Allowance, dated Feb. 5, 2016, received in Chinese Patent Application No. 201210128915.1, which corresponds with U.S. Appl. No. 11/620,727, 2 pages.
Certificate of Patent, dated Mar. 16, 2016, received in Chinese Patent Application No. 201210128915.1, which corresponds with U.S. Appl. No. 11/620,727, 1 pages.
Office Action, dated Nov. 15, 2014, received in Chinese Patent Application No. 201210128911.3, which corresponds with U.S. Appl. No. 11/620,727, 2 pages.
Office Action, dated Jan. 29, 2016, received in Chinese Patent Application No. 201210128911.3, which corresponds with U.S. Appl. No. 11/620,727, 6 pages.
Office Action, dated Dec. 19, 2011, received in European Patent Application No. 08705471.4, which corresponds with U.S. Appl. No. 11/620,727, 6 pages.
Office Action, dated Jan. 29, 2015, received in Patent Application No. 08705471.4, which corresponds with U.S. Appl. No. 11/620,727, 8 pages.
Summons to Attend Oral Proceedings, dated Dec. 6, 2017, received in European Patent Application No. 08705471.4, which corresponds with U.S. Appl. No. 11/620,727, 6 pages.
Decision to Refuse a European Patent Application, dated Jul. 20, 2018, received in European Patent Application No. 08705471.4, which corresponds with U.S. Appl. No. 11/620,727, 14 pages.
Patent, dated Jun. 2, 2017, received in Hong Kong Patent Application No. 13104177.2, which corresponds with U.S. Appl. No. 11/620,727, 2 pages.
Office Action, dated Nov. 5, 2012, received in U.S. Appl. No. 13/221,836, 16 pages.
Final Office Action, dated May 15, 2013, received in U.S. Appl. No. 13/221,836, 22 pages.
Office Action, dated Oct. 30, 2013, received in U.S. Appl. No. 13/221,836, 31 pages.
Final Office Action, dated May 20, 2014, received in U.S. Appl. No. 13/221,836, 36 pages.
Decision on Appeal, dated Jan. 3, 2017, received in U.S. Appl. No. 13/221,836, 6 pages.
Notice of Allowance, dated Feb. 21, 2017, received in U.S. Appl. No. 13/221,836, 10 pages.
Office Action, dated Jul. 24, 2012, received in U.S. Appl. No. 13/221,837, 13 pages.
Final Office Action, dated Feb. 14, 2013, received in U.S. Appl. No. 13/221,837, 13 pages.
Examiner's Answer, dated Feb. 11, 2014, received in U.S. Appl. No. 13/221,837, 19 pages.
Office Action, dated Jan. 10, 2012, received in U.S. Appl. No. 13/251,121, 16 pages.
Final Office Action, dated Jul. 9, 2012, received in U.S. Appl. No. 13/251,121, 21 pages.
Final Office Action, dated Sep. 23, 2013, received in U.S. Appl. No. 13/251,121, 24 pages.
Office Action, dated May 1, 2013, received in U.S. Appl. No. 13/251,121, 17 pages.
Examiner's Answer, dated Apr. 29, 2014, received in U.S. Appl. No. 13/251,121, 41 pages.
Notice of Allowance, dated Sep. 20, 2016, received in U.S. Appl. No. 13/251,121, 7 pages.
Office Action, dated Jan. 31, 2012, received in U.S. Appl. No. 13/251,146, 16 pages.
Final Office Action, dated Jun. 20, 2012, received in U.S. Appl. No. 13/251,146, 14 pages.
Office Action, dated Apr. 11, 2013, received in U.S. Appl. No. 13/251,146, 15 pages.
Final Office Action, dated Oct. 2, 2013, received in U.S. Appl. No. 13/251,146, 20 pages.
Examiner's Answer, dated May 7, 2014, received in U.S. Appl. No. 13/251,146, 43 pages.
Office Action, dated Feb. 10, 2012, received in U.S. Appl. No. 13/251,150, 23 pages.
Final Office Action, dated Jul. 5, 2012, received in U.S. Appl. No. 13/251,150, 27 pages.
Office Action, dated Jun. 7, 2013, received in U.S. Appl. No. 13/251,150, 34 pages.
Final Office Action, dated Dec. 11, 2013, received in U.S. Appl. No. 13/251,150, 44 pages.
Examiner's Answer, dated Jun. 17, 2014, received in U.S. Appl. No. 13/251,150, 47 pages.
Notice of Allowance, dated Dec. 21, 2016, received in U.S. Appl. No. 13/251,150, 10 pages.
Office Action, dated Jan. 20, 2012, received in U.S. Appl. No. 13/251,152, 20 pages.
Final Office Action, dated Jun. 20, 2012, received in U.S. Appl. No. 13/251,152, 24 pages.
Office Action, dated Apr. 23, 2013, received in U.S. Appl. No. 13/251,152, 29 pages.
Final Office Action, dated Oct. 18, 2013, received in U.S. Appl. No. 13/251,152, 29 pages.
Examiner's Answer, dated May 21, 2014, received in U.S. Appl. No. 13/251,152, 45 pages.
Notice of Allowance, dated Sep. 7, 2016, received in U.S. Appl. No. 13/251,152, 8 pages.

(56) References Cited

OTHER PUBLICATIONS

Notice of Allowance, dated Dec. 1, 2016, received in U.S. Appl. No. 13/251,152, 8 pages.
Office Action, dated Aug. 29, 2012, received in U.S. Appl. No. 11/620,715, 15 pages.
Final Office Action, dated Mar. 1, 2013, received in U.S. Appl. No. 11/620,715, 15 pages.
Examiner's Answer, dated Feb. 13, 2014, received in U.S. Appl. No. 11/620,715, 22 pages.
Decision on Appeal, dated Jun. 2, 2017, received in U.S. Appl. No. 11/620,715, 10 pages.
Office Action, dated Jul. 21, 2011, received in Chinese Patent Application No. 200880001855.9, which corresponds with U.S. Appl. No. 11/620,715, 2 pages.
Office Action, dated Jun. 6, 2012, received in Chinese Patent Application No. 200880001855.9, which corresponds with U.S. Appl. No. 11/620,715, 3 pages.
Office Action, dated Nov. 5, 2012, received in Chinese Patent Application No. 200880001855.9, which corresponds with U.S. Appl. No. 11/620,715, 2 pages.
Office Action, dated Mar. 7, 2013, received in Chinese Patent Application No. 200880001855.9, which corresponds with U.S. Appl. No. 11/620,715, 1 page.
Office Action, dated Jul. 29, 2014, received in Chinese Patent Application No. 200880001855.9, which corresponds with U.S. Appl. No. 11/620,715, 14 pages.
Office Action, dated Feb. 2, 2018, received in Chinese Patent Application No. 201510379780.X, which corresponds with U.S. Appl. No. 11/620,715, 5 pages.
Office Action, dated Oct. 20, 2014, received in European Patent Application No. 08712946.6, which corresponds with U.S. Appl. No. 11/620,715, 6 pages.
Office Action, dated Oct. 30, 2012, received in European Patent Application No. 08712946.6, which corresponds with U.S. Appl. No. 11/620,715, 5 pages.
Notice of Allowance, dated Dec. 21, 2016, received in European Patent Application No. 08712946.6, which corresponds with U.S. Appl. No. 11/620,715, 7 pages.
Decision to Grant, dated May 11, 2017, received in European Patent Application No. 08712946.6, which corresponds with U.S. Appl. No. 11/620,715, 1 page.
Patent, dated Jul. 6, 2017, received in European Patent Application No. 08712946.6, which corresponds with U.S. Appl. No. 11/620,715, 1 page.
Office Action, dated Jun. 18, 2012, received in U.S. Appl. No. 13/464,800, 10 pages.
Notice of Allowance, dated Nov. 13, 2012, received in U.S. Appl. No. 13/464,800, 8 pages.
Notice of Allowance, dated Dec. 19, 2012, received in U.S. Appl. No. 13/464,800, 9 pages.
Office Action, dated Oct. 9, 2012, received in U.S. Appl. No. 13/084,472, 14 pages.
Final Office Action, dated Jun. 20, 2013, received in U.S. Appl. No. 13/084,472, 20 pages.
Office Action, dated Dec. 6, 2013, received in U.S. Appl. No. 13/084,472, 23 pages.
Final Office Action, dated Jun. 17, 2014, received in U.S. Appl. No. 13/084,472, 31 pages.
Office Action, dated Dec. 10, 2014, received in U.S. Appl. No. 13/084,472, 24 pages.
Notice of Allowance, dated Jul. 7, 2015, received in U.S. Appl. No. 13/084,472, 8 pages.
Notice of Allowance, dated Oct. 26, 2015, received in U.S. Appl. No. 13/084,472, 8 pages.
Notice of Allowance, dated Jan. 15, 2014, received in U.S. Appl. No. 13/620,390, 10 pages.
Supplemental Notice of Allowance, dated Jan. 27, 2014, received in U.S. Appl. No. 13/620,390, 2 pages.
Office Acrtion, dated Mar. 5, 2013, received in U.S. Appl. No. 13/670,378, 28 pages.
Notice of Allowance, dated Jul. 24, 2013, received in U.S. Appl. No. 13/670,378, 9 pages.
Office Acrtion, dated Feb. 26, 2016, received in U.S. Appl. No. 14/043,774, 5 pages.
Notice of Allowance, dated Jun. 27, 2016, received in U.S. Appl. No. 14/043,774, 7 pages.
Office Acrtion, dated Apr. 28, 2015, received in U.S. Appl. No. 13/791,621, 6 pages.
Notice of Allowance, dated Nov. 5, 2015, received in U.S. Appl. No. 13/791,621, 5 pages.
Notice of Allowance, dated Mar. 1, 2016, received in U.S. Appl. No. 13/791,621, 7 pages.
Office Acrtion, dated Apr. 27, 2016, received in U.S. Appl. No. 14/290,931, 12 pages.
Final Office Acrtion, dated Nov. 25, 2016, received in U.S. Appl. No. 14/290,931, 13 pages.
Notice of Allowance, dated Apr. 7, 2017, received in U.S. Appl. No. 14/290,931, 11 pages.
Office Acrtion, dated Apr. 2, 2018, received in Chinese Patent Application No. 201480032919.7, which corresponds with U.S. Appl. No. 14/290,931, 4 pages.
Office Acrtion, dated Nov. 2, 2016, received in U.S. Appl. No. 14/290,931, 21 pages.
Notice of Allowance, dated Apr. 20, 2017, received in U.S. Appl. No. 14/188,635, 11 pages.
Notice of Allowance, dated May 18, 2017, received in U.S. Appl. No. 14/188,635, 5 pages.
Office Action, dated Jan. 4, 2016, received in U.S. Appl. No. 14/171,680, 7 pages.
Notice of Allowance, dated Apr. 18, 2016, received in U.S. Appl. No. 14/171,680, 5 pages.
Notice of Allowance, dated May 28, 2015, received in U.S. Appl. No. 14/180,267, 11 pages.
Notice of Allowance, dated Sep. 15, 2015, received in U.S. Appl. No. 14/180,267, 5 pages.
Notice of Allowance, dated Dec. 31, 2015, received in U.S. Appl. No. 14/180,267, 5 pages.
Notice of Allowance, dated Feb. 11, 2016, received in U.S. Appl. No. 14/180,267, 2 pages.
Office Action, dated Jun. 30, 2017, received in U.S. Appl. No. 15/046,252, 8 pages.
Notice of Allowance, dated Dec. 19, 2017, received in U.S. Appl. No. 15/046,252, 5 pages.
Office Action, dated Feb. 15, 2018, received in U.S. Appl. No. 15/139,260, 22 pages.
Notice of Allowance, dated Aug. 13, 2018, received in U.S. Appl. No. 15/139,260, 10 pages.
Office Action, dated Sep. 12, 2016, received in U.S. Appl. No. 15/197,704, 7 pages.
Notice of Allowance, dated Jan. 20, 2017, received in U.S. Appl. No. 15/197,704, 5 pages.
Notice of Allowance, dated May 5, 2017, received in U.S. Appl. No. 15/197,704, 5 pages.
Office Action, dated Apr. 21, 2017, received in U.S. Appl. No. 15/432,746, 9 pages.
Office Action, dated Aug. 30, 2017, received in U.S. Appl. No. 15/432,746, 9 pages.
Final Office Action, dated Jan. 18, 2018, received in U.S. Appl. No. 15/432,746, 9 pages.
Notice of Allowance, dated Mar. 20, 2018, received in U.S. Appl. No. 15/432,746, 5 pages.
Office Action, dated Jan. 19, 2018, received in U.S. Appl. No. 14/978,655, 13 pages.
Office Action, dated Jan. 25, 2018, received in U.S. Appl. No. 15/623,322, 14 pages.
Final Office Action, dated Aug. 8, 2018, received in U.S. Appl. No. 15/623,322, 13 pages.
Office Action, dated Apr. 4, 2018, received in U.S. Appl. No. 15/786,323, 11 pages.
Office Action, dated Jun. 12, 2018, received in U.S. Appl. No. 15/676,954, 10 pages.

(56) References Cited

OTHER PUBLICATIONS

Extended European Search Report, dated Dec. 7, 2011, received in European Patent Application No. 11184186.2, which corresponds to U.S. Appl. No. 12/566,660, 6 pages.
International Search Report and Written Opinion, dated Oct. 5, 2010, received in International Patent Application No. PCT/US2010/027118, which corresponds with U.S. Appl. No. 12/566,660, 15 pages.
International Preliminary Report on Patentability, dated Sep. 20, 2011, received in International Patent Application No. PCT/US2010/027118, which corresponds with U.S. Appl. No. 12/566,660, 10 pages.
Invitation to Pay Additional Fees, PCT Application PCT/US2010/027118, Jul. 13, 2010, 5 pages.
International Search Report and Written Opinion, dated Jun. 1, 2011, received in International Patent Application No. PCT/US2011/020404, which corresponds with U.S. Appl. No. 12/789,684, 7 pages.
International Preliminary Report on Patentability, dated Jul. 10, 2012, received in International Patent Application No. PCT/US2011/020404, which corresponds with U.S. Appl. No. 12/789,684, 5 pages.
Extended European Search Report, dated May 20, 2011, received in European Patent Application No. 11152015.1, which corresponds with U.S. Appl. No. 12/789,695, 9 pages.
International Search Report and Written Opinion, dated May 20, 2011, received in International Patent Application No. PCT/US2011/022516, which corresponds with U.S. Appl. No. 12/789,695, 13 pages.
International Preliminary Report on Patentability, dated Aug. 9, 2012, received in International Patent Application No. PCT/US2011/022516, which corresponds with U.S. Appl. No. 12/789,695, 11 pages.
International Search Report and Written Opinion, dated Dec. 13, 2011, received in International Patent Application No. PCT/US11/039583, which corresponds with U.S. Appl. No. 12/892,848, 10 pages.
International Preliminary Report on Patentability, dated Dec. 14, 2012, received in International Patent Application No. PCT/US2011/039583, which corresponds with U.S. Appl. No. 12/892,848, 7 pages.
Extended European Search Report, dated Oct. 18, 2017, received in European Patent Application No. 17177247.8, which corresponds to U.S. Appl. No. 13/077,925, 11 pages.
International Search Report and Written Opinion, dated Jun. 1, 2012, received in International Patent Application No. PCT/US2011/065859, which corresponds with U.S. Appl. No. 13/077,925, 21 pages.
International Preliminary Report on Patentability, dated Jun. 25, 2013, received in International Patent Application No. PCT/US2011/065859, which corresponds with U.S. Appl. No. 13/077,925, 15 pages.
Invitation to Pay Additional Fees, PCT Application PCT/US2011/065859, Mar. 12, 2012, 5 pages.
Extended European Search Report, dated Apr. 21, 2009, received in European Patent Application No. 09154313.2, which corresponds with U.S. Appl. No. 12/042,318, 6 pages.
Extended European Search Report, dated Mar. 2, 2011, received in European Patent Application No. 11150786.9, which corresponds with U.S. Appl. No. 12/042,318, 5 pages.
Extended European Search Report, dated Mar. 1, 2011, received in European Patent Application No. 11150788.5, which corresponds with U.S. Appl. No. 12/042,318, 6 pages.
Extended European Search Report, dated Nov. 23, 2011, received in European Patent Application No. 11184167.2, which corresponds with U.S. Appl. No. 12/042,318, 6 pages.
Extended European Search Report, dated Nov. 24, 2011, received in European Patent Application No. 11184169.8, which corresponds with U.S. Appl. No. 12/042,318, 6 pages.
Extended European Search Report, dated Nov. 18, 2011, received in European Patent Application No. 11184170.6, which corresponds with U.S. Appl. No. 12/042,318, 6 pages.
Extended European Search Report, dated Nov. 18, 2011, received in European Patent Application No. 11184172.2, which corresponds with U.S. Appl. No. 12/042,318, 6 pages.
Extended European Search Report, dated Nov. 30, 2011, received in European Patent Application No. 11184409.8, which corresponds with U.S. Appl. No. 12/042,318, 6 pages.
Extended European Search Report, dated Jun. 5, 2012, received in European Patent Application No. 12156394.4, which corresponds with U.S. Appl. No. 12/042,318, 4 pages.
Extended European Search Report, dated Jul. 9, 2012, received in European Patent Application No. 12156395.1, which corresponds with U.S. Appl. No. 12/042,318, 8 pages.
Extended European Search Report, dated Aug. 4, 2017, received in European Patent Application No. 17158104.4, which corresponds with U.S. Appl. No. 12/042,318, 7 pages.
International Search Report and Written Opinion, dated Apr. 16, 2009, received in International Patent Application No. PCT/US2009/034772, which corresponds with U.S. Appl. No. 12/042,318, 9 pages.
International Preliminary Report on Patentability, dated Sep. 7, 2010, received in International Patent Application No. PCT/US2009/034772, which corresponds with U.S. Appl. No. 12/042,318, 7 pages.
Extended European Search Report, dated Feb. 28, 2013, received in European Patent Application No. 12188748.3, which corresponds with U.S. Appl. No. 12/042,067, 8 pages.
Extended European Search Report, dated Dec. 22, 2015, received in European Patent Application No. 15175530.3, which corresponds with U.S. Appl. No. 12/042,067, 9 pages.
International Search Report and Written Opinion, dated Jul. 3, 2009, received in International Patent Application No. PCT/US2009/035856, which corresponds with U.S. Appl. No. 12/042,067, 10 pages.
International Preliminary Report on Patentability, dated Sep. 16, 2010, received in International Patent Application No. PCT/US2009/035856, which corresponds with U.S. Appl. No. 12/042,067, 6 pages.
Extended European Search Report, dated Jan. 13, 2012, received in European Patent Application No. 11184226.6, which corresponds with U.S. Appl. No. 12/042,299, 7 pages.
Extended European Search Report, dated Jan. 13, 2012, received in European Patent Application No. 11184224.1, which corresponds with U.S. Appl. No. 12/042,299, 7 pages.
Extended European Search Report, dated Jan. 13, 2012, received in European Patent Application No. 11184223.3, which corresponds with U.S. Appl. No. 12/042,299, 4 pages.
Extended European Search Report, dated Jan. 13, 2012, received in European Patent Application No. 11184222.5, which corresponds with U.S. Appl. No. 12/042,299, 4 pages.
International Search Report and Written Opinion, dated Nov. 11, 2009, received in International Patent Application No. PCT/US2009/035874, which corresponds with U.S. Appl. No. 12/042,299, 10 pages.
International Preliminary Report on Patentability, dated Sep. 16, 2010, received in International Patent Application No. PCT/US2009/035874, which corresponds with U.S. Appl. No. 12/042,299, 7 pages.
International Search Report and Written Opinion, dated Jul. 3, 2009, received in International Patent Application No. PCT/US2009/035858, which corresponds with U.S. Appl. No. 12/042,237, 10 pages.
International Preliminary Report on Patentability, dated Sep. 7, 2010, received in International Patent Application No. PCT/US2009/035858, which corresponds with U.S. Appl. No. 12/042,237, 6 pages.
International Search Report and Written Opinion, dated Jun. 4, 2008, received in International Patent Application No. PCT/US2008/000089, which corresponds with U.S. Appl. No. 11/620,717, 10 pages.

(56) References Cited

OTHER PUBLICATIONS

International Preliminary Report on Patentability, dated Jul. 7, 2009, received in International Patent Application No. PCT/US2008/000089, which corresponds with U.S. Appl. No. 11/620,717, 9 pages.
International Search Report and Written Opinion, dated Apr. 22, 2008, received in International Patent Application No. PCT/US2008/000060, which corresponds with U.S. Appl. No. 11/620,717, 8 pages.
International Preliminary Report on Patentability, dated Jul. 7, 2009, received in International Patent Application No. PCT/US2008/000060, which corresponds with U.S. Appl. No. 11/620,727, 7 pages.
Extended European Search Report, dated Nov. 3, 2017, received in European Patent Application No. 17165698.6, which corresponds with U.S. Appl. No. 11/620,715, 9 pages.
International Search Report and Written Opinion, dated May 2, 2008, received in International Patent Application No. PCT/US2008/000069, which corresponds with U.S. Appl. No. 11/620,715, 12 pages.
International Preliminary Report on Patentability, dated Jul. 7, 2009, received in International Patent Application No. PCT/US2008/000069, which corresponds with U.S. Appl. No. 11/620,715, 8 pages.
International Search Report and Written Opinion, dated Dec. 4, 2014, received in International Patent Application No. PCT/US2014/040406, which corresponds with U.S. Appl. No. 14/290,931, 9 pages.
International Preliminary Report on Patentability, dated Dec. 15, 2015, received in International Patent Application No. PCT/US2014/040406, which corresponds with U.S. Appl. No. 14/290,931, 6 pages.
Oral Summons, dated May 9, 2019, received in European Patent Application No. 10712825.8, which corresponds with U.S. Appl. No. 12/566,660, 9 pages.
Oral Summons, dated Apr. 11, 2019, received in Indian Patent Application No. 6174/CHENP/2011, which corresponds with U.S. Appl. No. 12/566,332, 5 pages.
Summons, dated Mar. 15, 2019, received in European Patent Application No. 11152015.1, which corresponds with U.S. Appl. No. 12/789,695, 4 pages.
Office Action, dated May 17, 2019, received in Chinese Patent Application No. 201610455059.9, which corresponds with U.S. Appl. No. 12/892,848, 4 pages.
Patent, dated Apr. 17, 2019, received in European Patent Application No. 11727371.4, which corresponds with U.S. Appl. No. 12/892,848, 3 pages.
Decision to Grant, dated Mar. 21, 2019, received in European Patent Application No. 11727371.4, which corresponds with U.S. Appl. No. 12/892,848, 4 pages.
Office Action, dated Jun. 29, 2019, received in Australian Patent Application No. 2018211275, which corresponds with U.S. Appl. No. 13/077,925, 2 pages.
Notice of Allowance, dated Aug. 9, 2019, received in Chinese Patent Application No. 201610383388.7, which corresponds with U.S. Appl. No. 13/077,925, 3 pages.
Office Action, dated Jul. 11, 2019, received in European Patent Application No. 17177247.8, which corresponds with U.S. Appl. No. 13/077,925, 7 pages.
Certificate of Grant, dated Jun. 6, 2019, received in Australian Patent Application No. 2017279639, which corresponds with U.S. Appl. No. 12/042,318, 1 page.
Patent, dated Jul. 9, 2019, received in Canadian Patent Application No. 2,931,604, which corresponds with U.S. Appl. No. 12/042,318, 5 pages.
Notice of Allowance, dated Apr. 2, 2019, received in Canadian Patent Application No. 3,011,844, which corresponds with U.S. Appl. No. 12/042,318, 4 pages.
Patent, dated Jul. 9, 2019, received in Canadian Patent Application No. 3,011,844, which corresponds with U.S. Appl. No. 12/042,318, 4 pages.
Notice of Allowance, dated May 20, 2019, received in Israel Patent Application No. 197386, which corresponds with U.S. Appl. No. 12/042,318, 6 pages.
Office Action, dated Jun. 3, 2019, received in Japanese Patent Application No. 2017-195359, which corresponds with U.S. Appl. No. 12/042,318, 6 pages.
Office Action, dated May 31, 2019, received in Chinese Patent Application No. 201310053142.X, which corresponds with U.S. Appl. No. 12/042,067, 3 pages.
Summons, dated Feb. 8, 2019, received in German Patent application No. 112009000003.7, which corresponds with U.S. Appl. No. 12/042,299, 10 pages.
Office Action, dated May 21, 2019, received in German Patent application No. 112009000003.7, which corresponds with U.S. Appl. No. 12/042,299, 4 pages.
Decision to Refuse an EP App, dated Feb. 26, 2019, received in European Patent Application No. 11184224.1, which corresponds with U.S. Appl. No. 12/042,299, 5 pages.
Decision to Refuse a EP App, dated Feb. 26, 2019, received in European Patent Application No. 11184223.3, which corresponds with U.S. Appl. No. 12/042,299, 4 pages.
Rejection Decision, dated Apr. 24, 2019, received in Chinese Patent Application No. 201510175905.7, which corresponds with U.S. Appl. No. 12/042,237, 2 pages.
Patent, dated May 3, 2019, received in Chinese Patent Application No. 201510175915.0, which corresponds with U.S. Appl. No. 12/042,237, 4 pages.
Summons, dated Feb. 18, 2019, received in European Patent Application No. 15175530.3, which corresponds with U.S. Appl. No. 12/042,237, 6 pages.
Office Action, dated Jul. 23, 2019, received in Chinese Patent Application No. 201510379780.X, which corresponds with U.S. Appl. No. 11/620,715, 6 pages.
Office Action, dated Feb. 28, 2019, received in European Patent Application No. 17165698.6, which corresponds with U.S. Appl. No. 11/620,715, 7 pages.
Notice of Allowance, dated Mar. 29, 2019, received in Chinese Patent Application. No. 201480032919.7, which corresponds with U.S. Appl. No. 14/290,931, 3 pages.
Patent, dated Jun. 14, 2019, received in Chinese Patent Application No. 201480032919.7, which corresponds with U.S. Appl. No. 14/290,931, 6 pages.
Office Action, dated Apr. 30, 2019, received in U.S. Appl. No. 15/339,768, 19 pages.
Office Action, dated May 2, 2019, received in U.S. Appl. No. 15/623,322, 13 pages.
Final Office Action, dated May 8, 2019, received in U.S. Appl. No. 15/647,180, 15 pages.
Office Action, dated May 30, 2019, received in U.S. Appl. No. 15/786,323, 13 pages.
Office Action, dated Jul. 8, 2019, received in U.S. Appl. No. 15/676,954, 13 pages.
Office Action, dated Aug. 23, 2018, received in European Patent Application No. 10712825.8, which corresponds with U.S. Appl. No. 12/566,660, 5 pages.
Office Action, dated Jun. 12, 2018, received in Indian Patent Application No. 6174/CHENP/2011, which corresponds with U.S. Appl. No. 12/566,332, 8 pages.
Notice of Allowance, dated Sep. 3, 2018, received in Japanese Patent Application No. 2017-139218, which corresponds with U.S. Appl. No. 12/566,660, 5 pages.
Patent, dated Sep. 28, 2018, received in Japanese Patent Application No. 2017-139218, which corresponds with U.S. Appl. No. 12/566,660, 2 pages.
Notice of Acceptance, dated Jul. 5, 2018, received in Australian Patent Application No. 2016204905, which corresponds with U.S. Appl. No. 12/789,695, 3 pages.
Office Action, dated Aug. 23, 2018, received in European Patent Application No. 11152015.1, which corresponds with U.S. Appl. No. 12/789,695, 7 pages.

(56) References Cited

OTHER PUBLICATIONS

Intention to Grant, dated Nov. 2, 2018, received in European Patent Application No. 11727371.4, which corresponds with U.S. Appl. No. 12/892,848, 5 pages.
Notice of Allowance, dated Nov. 8, 2018, received in U.S. Appl. No. 12/892,851, 7 pages.
Certificate of Grant, dated Aug. 23, 2018, received in Australian Patent Application No. 2017200807, which corresponds with U.S. Appl. No. 13/077,925, 1 page.
Office Action, dated Jan. 11, 2019, received in Chinese Patent Application No. 201610383388.7, which corresponds with U.S. Appl. No. 13/077,925, 5 pages.
Office Action, dated Sep. 14, 2018, received in European Patent Application No. 17177247.8, which corresponds with U.S. Appl. No. 13/077,925, 6 pages.
Final Office Action, dated Jan. 28, 2019, received in Japanese Patent Application No. 2016-146769, which corresponds with U.S. Appl. No. 13/077,925, 8 pages.
Office Action, dated Dec. 14, 2018, received in Australian Patent Application No. 2017279639, which corresponds with U.S. Appl. No. 12/042,318, 2 page.
Intention to Grant, dated Feb. 12, 2019, received in Australian Patent Application No. 2017279639, which corresponds with U.S. Appl. No. 12/042,318, 3 page.
Notice of Allowance, dated Dec. 10, 2018, received in Canadian Patent Application No. 2,931,604, which corresponds with U.S. Appl. No. 12/042,318, 3 pages.
Patent, dated Feb. 7, 2019, received in German Patent Application No. 102009011687.7, which corresponds with U.S. Appl. No. 12/042,318, 3 pages.
Oral Summons, dated Sep. 3, 2018, received in European Patent Application No. 11184224.1, which corresponds with U.S. Appl. No. 12/042,299, 7 pages.
Oral Summons, dated Sep. 5, 2018, received in European Patent Application No. 11184223.3, which corresponds with U.S. Appl. No. 12/042,299, 6 pages.
Oral Summons, dated Sep. 3, 2018, received in European Patent Application No. 11184222.5, which corresponds with U.S. Appl. No. 12/042,299, 6 pages.
Notice of Allowance, dated Sep. 25, 2018, received in Japanese Patent Application No. 2017-238833, which corresponds with U.S. Appl. No. 12/042,299, 5 pages.
Patent, dated Nov. 2, 2018, received in Japanese Patent Application No. 2017-238833, which corresponds with U.S. Appl. No. 12/042,299, 2 pages.
Office Action, dated Oct. 8, 2018, received in Chinese Patent Application No. 201510175905.7, which corresponds with U.S. Appl. No. 12/042,237, 3 pages.
Notice of Allowance, dated Feb. 18, 2019, received in Chinese Patent Application No. 201510175915.0, which corresponds with U.S. Appl. No. 12/042,237, 3 pages.
Oral Summons, dated Jan. 24, 2019, received in German Patent Application No. 112009000002.9, which corresponds with U.S. Appl. No. 12/042,237, 3 pages.
Office Action, dated Nov. 13, 2018, received in Chinese Patent Application No. 201480032919.7, which corresponds with U.S. Appl. No. 14/290,931, 4 pages.
Office Action, dated Oct. 24, 2018, received in European Patent Application No. 14734672.0, which corresponds with U.S. Appl. No. 14/290,931, 8 pages.
Office Action, dated Oct. 19, 2018, received in U.S. Appl. No. 15/647,180, 12 pages.
Final Office Action, dated Dec. 10, 2018, received in U.S. Appl. No. 15/786,323, 12 pages.
Final Office Action, dated Mar. 1, 2019, received in U.S. Appl. No. 15/676,954, 13 pages.
Decision to Grant, dated Sep. 19, 2019, received in European Patent Application No. 11184186.2, which corresponds with U.S. Appl. No. 12/566,660, 1 page.
Decision to Grant, dated Sep. 19, 2019, received in Hong Kong Patent Application No. 12107271.1, which corresponds with U.S. Appl. No. 12/566,660, 1 pages.
Office Action, dated Oct. 7, 2019, received in Japanese Patent Application No. 2018-175226, which corresponds with U.S. Appl. No. 12/566,660, 5 pages.
Office Action, dated Oct. 21, 2019, received in Chinese Patent Application No. 201610455059.9, which corresponds with U.S. Appl. No. 12/892,848, 4 pages.
Patent, dated Sep. 13, 2019, received in Chinese Patent Application No. 201610383388.7, which corresponds with U.S. Appl. No. 13/077,925, 6 pages.
Patent, dated Oct. 1, 2019, received in Israel Patent Application No. 244139, which corresponds with U.S. Appl. No. 12/042,318, 6 pages.
Notice of Allowance, dated Sep. 4, 2019, received in Chinese Patent Application No. 201310053142.X, which corresponds with U.S. Appl. No. 12/042,067, 3 pages.
Patent, dated Oct. 11, 2019, received in Chinese Patent Application No. 201310053142.X, which corresponds with U.S. Appl. No. 12/042,067, 6 pages.
Decision to Grant, dated Aug. 13, 2019, received in German Patent application No. 112009000003.7, which corresponds with U.S. Appl. No. 12/042,299, 10 pages.
Certificate of Grant, dated Sep. 6, 2019, received in Hong Kong Patent Application No. 14110202.7, which corresponds with U.S. Appl. No. 12/042,299, 5 pages.
Notice of Allowance, dated Oct. 10, 2019, received in Chinese Patent Application No. 201510175905.7, which corresponds with U.S. Appl. No. 12/042,237, 3 pages.
Decision to Grant, dated Sep. 27, 2019, received in German Patent Application No. 112009000002.9, which corresponds with U.S. Appl. No. 12/042,237, 2 pages.
Office Action, dated Oct. 10, 2019, received in U.S. Appl. No. 15/647,180, 14 pages.
Notice of Allowance, dated Aug. 21, 2019, received in U.S. Appl. No. 15/979,357, 21 pages.
Office Action, dated Nov. 7, 2019, received in German Patent Application No. 112010001143.5, which corresponds with U.S. Appl. No. 12/566,660, 14 pages.
Patent, dated Oct. 16, 2019, received in European Patent Application No. 11184186.2, which corresponds with U.S. Appl. No. 12/566,660, 6 pages.
Office Action, dated Nov. 15, 2019, received in Japanese Patent Application No. 2018-200268, 5 pages.
Patent, dated Nov. 26, 2019, received in Chinese Patent Application No. 201510175905.7, which corresponds with U.S. Appl. No. 12/042,237, 6 pages.
Office Action, dated Nov. 1, 2019, received in Chinese Patent Application No. 201510379780.X, which corresponds with U.S. Appl. No. 11/620,715, 3 pages.
Final Office Action, dated Nov. 22, 2019, received in U.S. Appl. No. 15/339,768, 22 pages.
Final Office Action, dated Dec. 11, 2019, received in U.S. Appl. No. 15/623,322, 17 pages.
Final Office Action, dated Dec. 11, 2019. U.S. Appl. No. 15/786,323, 17 pages.

* cited by examiner

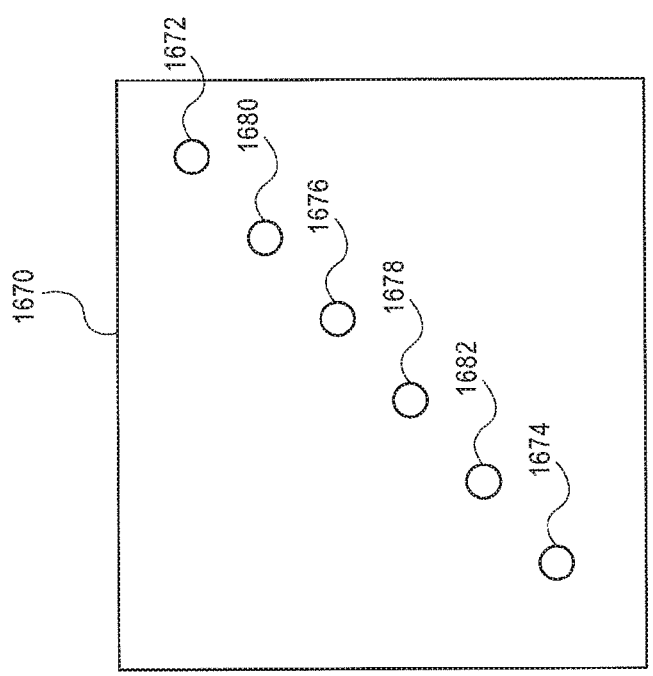

APPLICATION PROGRAMMING INTERFACE FOR GESTURE OPERATIONS

RELATED APPLICATIONS

This application is a continuation of U.S. application Ser. No. 15/139,260, filed Apr. 26, 2016, which is a continuation of U.S. application Ser. No. 11/620,727, filed Jan. 7, 2007, both of which are incorporated by reference herein in their entireties.

This application is related to: (1) U.S. application Ser. No. 13/221,836, filed Aug. 30, 2011; (2) U.S. application Ser. No. 13/221,837, filed Aug. 30, 2011; (3) U.S. application Ser. No. 13/251,121, filed Sep. 30, 2011; (4) U.S. application Ser. No. 13/251,146, filed Sep. 30, 2011; (5) U.S. application Ser. No. 13/251,150, filed Sep. 30, 2011; and (6) U.S. application Ser. No. 13/251,152, filed Sep. 30, 2011, all of which are incorporated herein in their entireties.

FIELD OF THE DISCLOSURE

This disclosure relates to application programming interfaces that provide gesture operations.

COMPUTER PROGRAM LISTING

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

Applicant has submitted herewith Computer Program Listings which are included as Appendix A, attached.

BACKGROUND OF THE DISCLOSURE

An API is a source code interface that a computer system or program library provides in order to support requests for services from a software application. An API is specified in terms of a programming language that can be interpretative or compiled when an application is built, rather than an explicit low level description of how data is laid out in memory. The software that provides the functionality described by an API is said to be an implementation of the API.

Various devices such as electronic devices, computing systems, portable devices, and handheld devices have software applications. The API interfaces between the software applications and user interface software to provide a user of the device with certain features and operations. A user may desire certain operations such as scrolling, selecting, gesturing, and animating operations for a display of the device.

Scrolling is the act of sliding a directional (e.g., horizontal or vertical) presentation of content, such as text, drawings, or images, across a screen or display window. In a typical graphical user interface, scrolling is done with the help of a scrollbar or using keyboard shortcuts, often the arrow keys. Gesturing is a type of user input with two or more input points. Animating operations include changing content within a given time period.

The various types of devices may have a limited display size, user interface, software, API interface and/or processing capability which limits the ease of use of the devices. User interfaces of devices implement APIs in order to provide requested functionality and features. These user interfaces can have difficulty interpreting the various types of user inputs and providing the intended functionality associated with the user inputs.

SUMMARY OF THE DESCRIPTION

At least certain embodiments of the present disclosure include one or more application programming interfaces in an environment with user interface software interacting with a software application. Various function calls or messages are transferred via the application programming interfaces between the user interface software and software applications. Example application programming interfaces transfer function calls to implement scrolling, gesturing, and animating operations for a device.

At least certain embodiments of the present disclosure include an environment with user interface software interacting with a software application. A method for operating through an application programming interface (API) in this environment includes transferring a set bounce call. The method further includes setting at least one of maximum and minimum bounce values. The set bounce call causes a bounce of a scrolled region in an opposite direction of a scroll based on a region past an edge of the scrolled region being visible in a display region at the end of the scroll.

At least certain embodiments of the present disclosure include an environment with user interface software interacting with a software application. A method for operating through an application programming interface (API) in this environment includes transferring a rubberband call. Rubberbanding a scrolled region within a display region occurs by a predetermined maximum displacement when the scrolled region exceeds a display edge. The method further includes transferring an edge rubberband call to set displacement values for at least one edge of the display (e.g., top and bottom edges, left and right edges).

At least certain embodiments of the present disclosure include an environment with user interface software interacting with a software application to provide gesture operations for a display of a device. A method for operating through an application programming interface (API) in this environment includes transferring a scaling transform call. The gesture operations include performing a scaling transform such as a zoom in or zoom out in response to a user input having two or more input points. The gesture operations also include performing a rotation transform to rotate an image or view in response to a user input having two or more input points.

At least certain embodiments of the present disclosure include a method for performing animations for a display of a device. The method includes starting at least one animation. The method further includes determining the progress of each animation. The method further includes completing each animation based on a single timer. The single timer can be based on a redraw interval of the display hardware.

Various devices which perform one or more of the foregoing methods and machine readable media which, when executed by a processing system, cause the processing system to perform these methods, are also described.

Other methods, devices and machine readable media are also described.

BRIEF DESCRIPTION OF THE DRAWINGS

The disclosure is described by way of example with reference to the accompanying drawings, wherein:

FIG. 16C illustrates user inputs for changing a scale factor.

DETAILED DESCRIPTION

Figure 1:
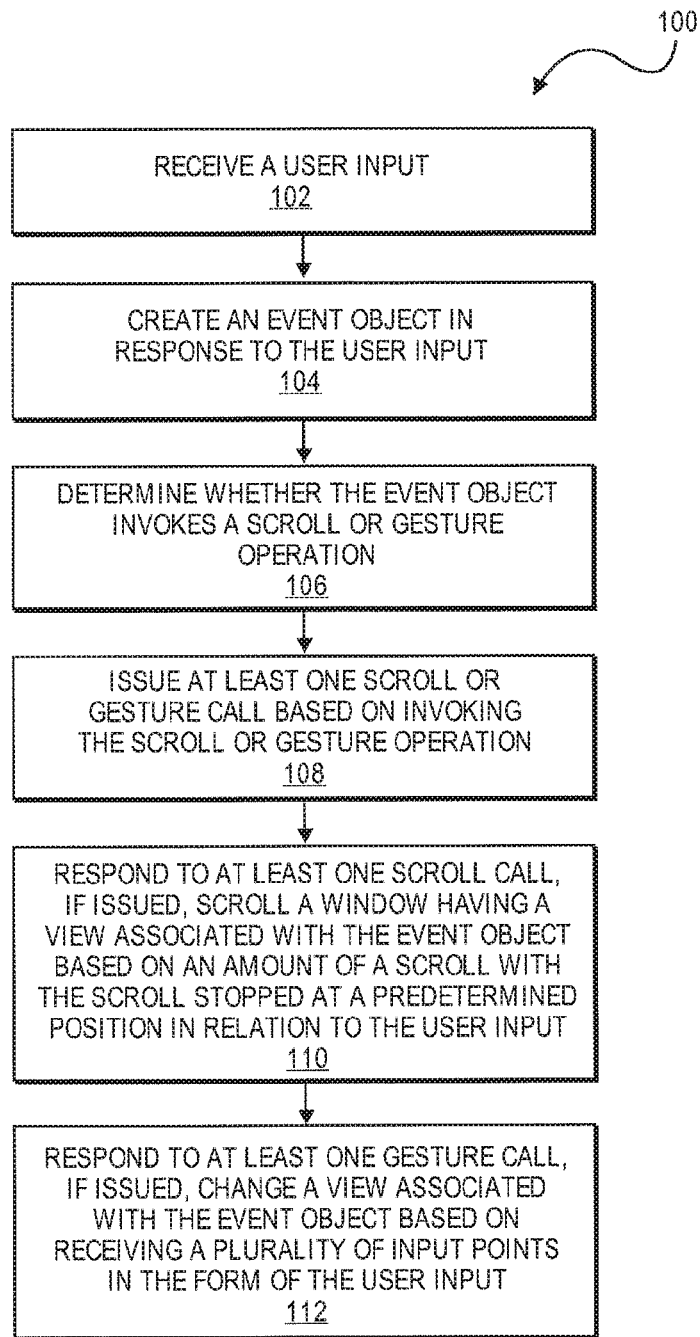
FIG. 1 is flow chart of a method for responding to a user input of a data processing device.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

At least certain embodiments of the present disclosure include one or application programming interfaces in an environment with user interface software interacting with a software application. Various function calls or messages are transferred via the application programming interfaces between the user interface software and software applications. Transferring the function calls or messages may include issuing, initiating, invoking or receiving the function calls or messages. Example application programming interfaces transfer function calls to implement scrolling, gesturing, and animating operations for a device having a display region. An API may also implement functions having parameters, variables, or pointers. An API may receive parameters as disclosed or other combinations of parameters. In addition to the APIs disclosed, other APIs individually or in combination can perform similar functionality as the disclosed APIs.

The display region is a form of a window. A window is a display region which may not have a border and may be the entire display region or area of a display. In some embodiments, a display region may have at least one window and/or at least one view (e.g., web, text, or image content). A window may have at least one view. The methods, systems, and apparatuses disclosed can be implemented with display regions, windows, and/or views.

At least certain embodiments of the present disclosure include scrolling operations for scrolling a display of a device. The scrolling operations include bouncing a scrolled region in an opposite direction of a scroll when a scroll completes, rubberbanding a scrolled region by a predetermined maximum displacement when the scrolled region exceeds a display edge, and setting a scrolling angle that locks the scroll in a horizontal or vertical direction.

At least certain embodiments of the present disclosure include gesture operations for a display of a device. The gesture operations include performing a scaling transform such as a zoom in or zoom out in response to a user input having two or more input points. The gesture operations also include performing a rotation transform to rotate an image or view in response to a user input having two or more input points.

At least certain embodiments of the present disclosure include a method for performing animations for a display of a device. The method includes starting at least one animation. The method further includes determining the progress of each animation. The method further includes completing each animation based on a single timer. The single timer can be based on a redraw interval of the display hardware.

At least certain embodiments of the disclosure may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). In some embodiments, the display device and input device are integrated while in other embodiments the display device and input device are separate devices. Examples of a portable media player are described in U.S. patent application Ser. No. 11/586,862, titled "Automated Response to and Sensing of User Activity in Devices" and published U.S. patent application numbers 2003/0095096 and 2004/0224638 which have been incorporated by reference into the present application.

Embodiments of the disclosure described herein may be part of other types of data processing systems, such as, for example, entertainment systems or personal digital assistants (PDAs), or general purpose computer systems, or special purpose computer systems, or an embedded device within another device, or cellular telephones which do not include media players, or multi touch tablet devices, or other multi touch devices, or devices which combine aspects or functions of these devices (e.g., a media player, such as an iPod®, combined with a PDA, an entertainment system, and a cellular telephone in one device). In this disclosure, electronic devices and consumer devices are types of devices.

FIG. 1 is flow chart of a method for responding to a user input of a device. The method 100 includes receiving a user input at block 102. The user input may be in the form of an input key, button, wheel, touch, or other means for interacting with the device. The method 100 further includes creating an event object in response to the user input at block 104. The method 100 further includes determining whether the event object invokes a scroll or gesture operation at block 106. For example, a single touch that drags a distance across a display of the device may be interpreted as a scroll operation. In one embodiment, a two or more finger touch of the display may be interpreted as a gesture operation. In certain embodiments, determining whether the event object invokes a scroll or gesture operation is based on receiving a drag user input for a certain time period. The method 100 further includes issuing at least one scroll or gesture call based on invoking the scroll or gesture operation at block 108. The method 100 further includes responding to at least one scroll call, if issued, by scrolling a window having a view (e.g., web, text, or image content) associated with the event object based on an amount of a scroll with the scroll stopped at a predetermined position in relation to the user input at block 110. For example, an input may end at a certain position on a display of the device. The scrolling may continue until reaching a predetermined position in relation to the last input received from the user. The method 100 further includes responding to at least one gesture call, if issued, by changing a view associated with the event object based on receiving a plurality of input points in the form of the user input at block 112.

In certain embodiments of the present disclosure, scroll operations include attaching scroll indicators to a content edge of a display. Alternatively, the scroll indicators can be attached to the display edge. In some embodiments, user input in the form of a mouse/finger down causes the scroll indicators to be displayed on the display edge, content edge, or window edge of the scrolled region. If a mouse/finger up is then detected, the scroll indicators are faded out from the display region, content edge, or window edge of the scrolled region.

In certain embodiments of the present disclosure, gesture operations include responding to at least one gesture call, if issued, by rotating a view associated with the event object based on receiving a plurality of input points in the form of the user input. Gesture operations may also include scaling a view associated with the event object by zooming in or zooming out based on receiving the user input.

In some embodiments, a device includes a display region having multiple views or windows. Each window may have a multiple views including superviews and subviews. It is necessary to determine which window, view, superview, or subview is contacted by a user input in the form of a mouse up, mouse down, or drag, etc. An API can set various modes for making this determination. In one embodiment, a pass mode sends mouse down, mouse up, and drag inputs to the nearest subview. In another embodiment, an intercept on drag mode sends a drag input to the superview while mouse up and down inputs are sent to the subview. In another embodiment, an intercept mode sends all drag, mouse up and down inputs to the superview. The superview may be scroller software operating as a subclass of a view software. The subview may be view software operating as a subclass of the user interface software.

Figure 2:
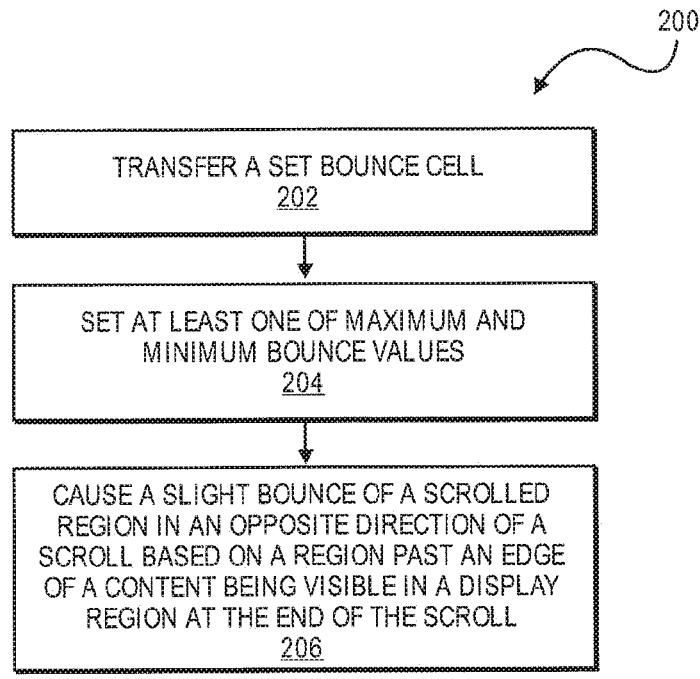
FIG. 2 illustrates details of an application programming interface in flow chart form according to certain teachings of the present disclosure.

FIG. 2 illustrates details of an application programming interface in flow chart form according to certain teachings of the present disclosure. The application programming interface operates in an environment with user interface software interacting with a software application in order to provide a bounce operation. The method 200 for providing a bounce operation includes transferring a set bounce call at block 202. The method 200 further includes setting at least one of maximum and minimum bounce values at block 204. The minimum and maximum bounce values may be associated with at least one edge of a window that has received a user input. The method 200 further includes causing a bounce of a scrolled region in an opposite direction of a scroll based on a region past the scrolled region being visible in a display region at the end of the scroll at block 206. The scrolled region may be a content region.

In certain embodiments of the present disclosure, transferring the set bounce call is either one of issuing, initiating, invoking or receiving the set bounce call.

Figure 3:
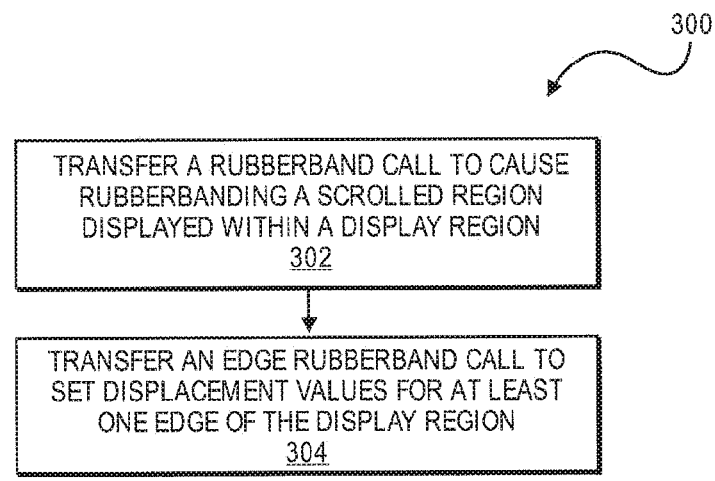
FIG. 3 illustrates details of an application programming interface in flow chart form according to certain teachings of the present disclosure.

FIG. 3 illustrates details of an application programming interface in flow chart form according to certain teachings of the present disclosure. The application programming interface operates in an environment with user interface software interacting with a software application in order to provide a rubberband operation. The method 300 for providing a rubberband operation includes transferring a rubberband call to cause rubberbanding a scrolled region displayed within a display at block 302. The method 300 further includes transferring an edge rubberband call to set displacement values for at least one edge of the display at block 304. In some embodiments, the displacement values are set for top and bottom edges, left and right edges, or all edges.

Rubberbanding a scrolled region according to the method 300 occurs by a predetermined maximum displacement value when the scrolled region exceeds a display edge of a display of a device based on the scroll. If a user scrolls content of the display making a region past the edge of the content visible in the display, then the displacement value limits the maximum amount for the region outside the content. At the end of the scroll, the content slides back making the region outside of the content no longer visible on the display.

In certain embodiments of the present disclosure, transferring the rubberband call is either one of issuing, initiating, invoking or receiving the rubberband call.

Figure 4:
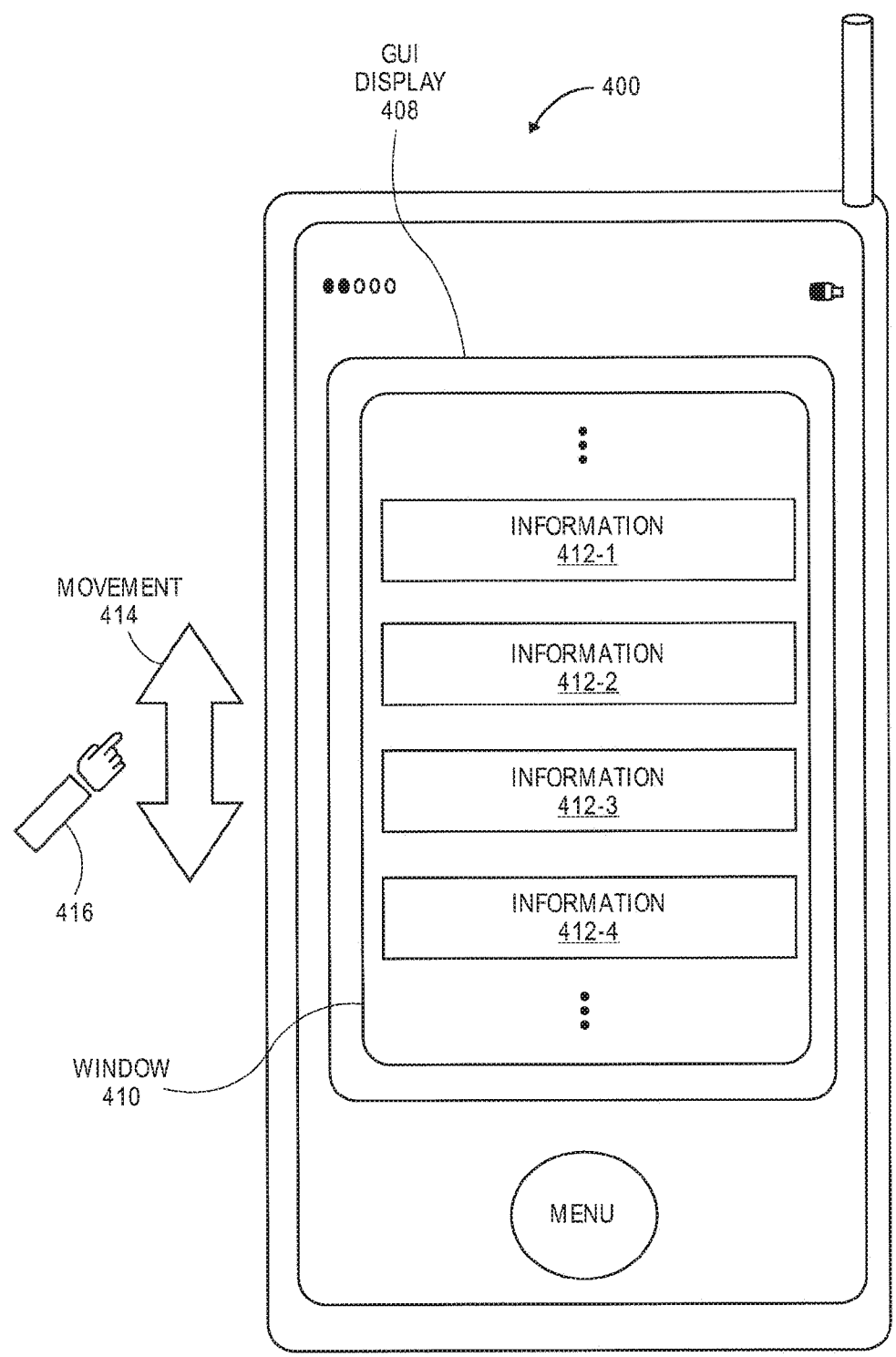
FIG. 4 is a schematic diagram illustrating an embodiment of user interface of a portable electronic device 400 having a touch-sensitive display 408.

FIG. 4 is a schematic diagram illustrating an embodiment of user interface of a portable electronic device 400 having a touch-sensitive display 408. The display 408 may include a window 410. The window 410 may include one or more displayed objects, such as information objects 412-1 to 412-4. In an exemplary embodiment, the information objects 412 may correspond to contact information for one or more individuals in a list of items. The displayed objects may be moved in response to detecting or determining movement 414 of a point of contact with the display, such as that associated with one or more digits 416 of a user (which are not drawn to scale in FIG. 4). In some embodiments, movement of the displayed objects may be accelerated in response to detecting or determining accelerated movement of the point of contact. While embodiment 400 includes one window 410, in other embodiments there may be two or more display windows. In addition, while embodiment 400 illustrates movement 414 in a particular direction, in other embodiments movement of the displayed objects may be in response to movement 414 in one or more other directions, or in response to a scalar (i.e., a determined or detected movement independent of the direction).

Figure 5A:
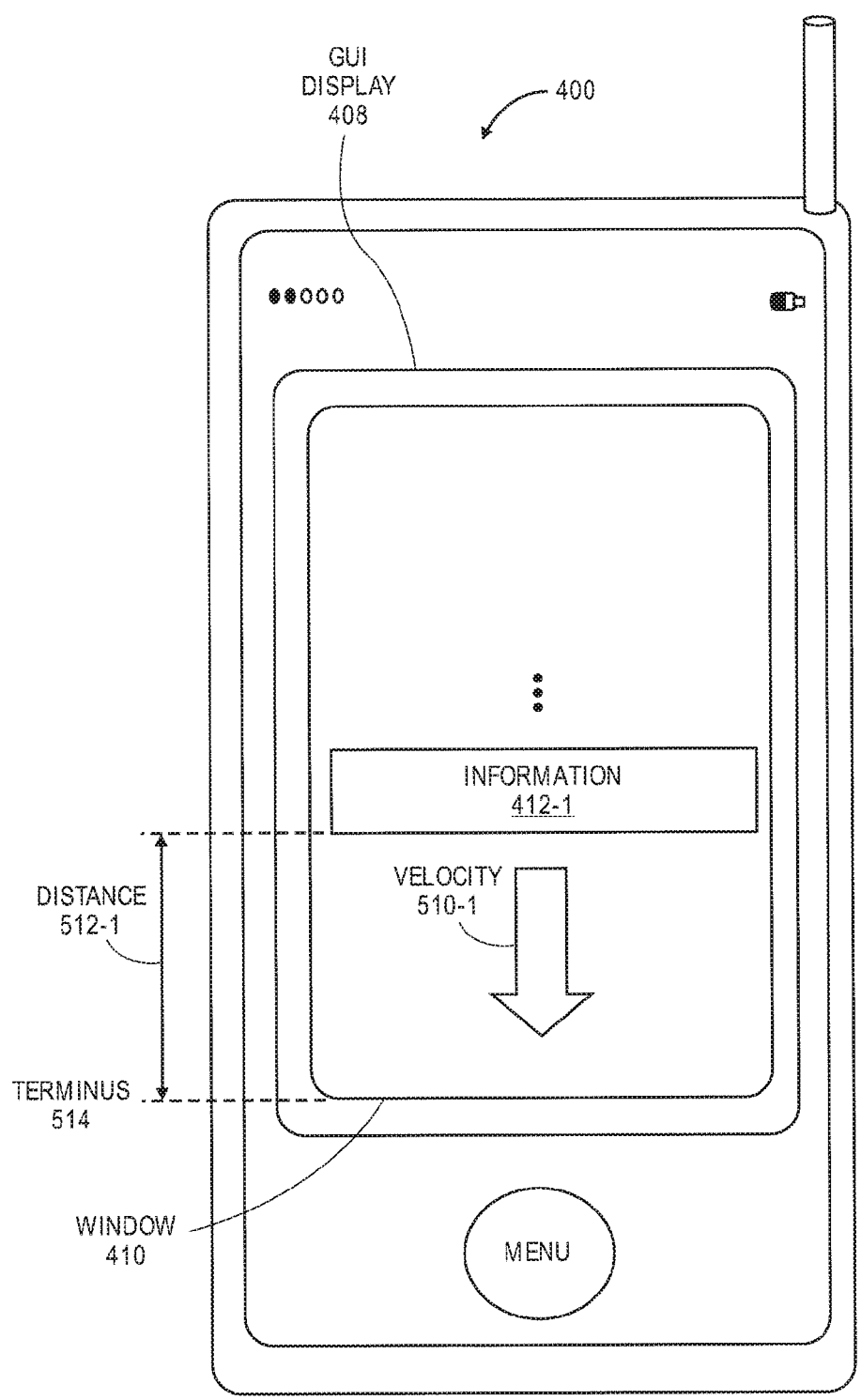
FIG. 5A-5C illustrate at least some embodiments of user interface of a portable electronic device 400 having a touch-sensitive display.
Figure 5B:
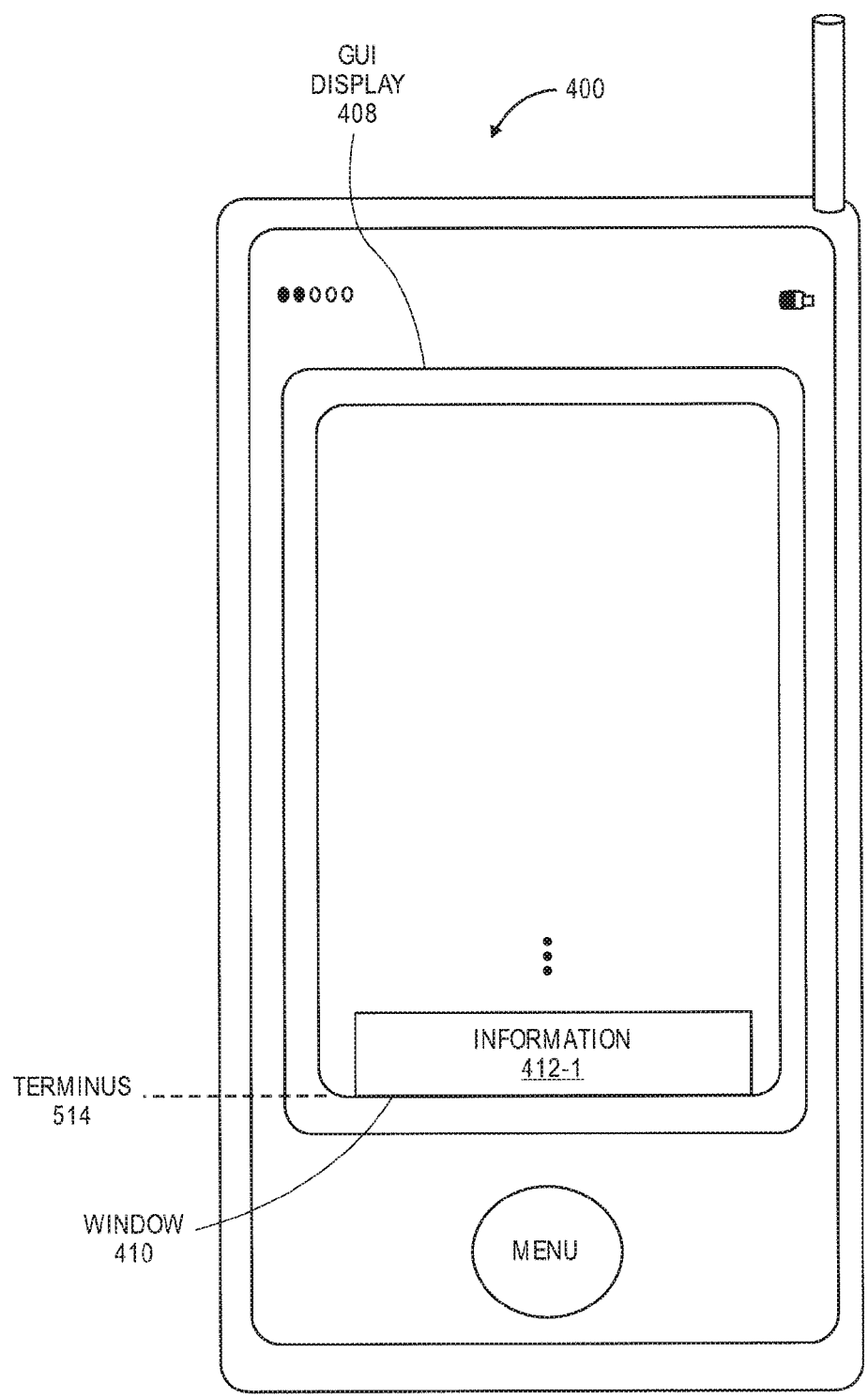
Figure 5C:
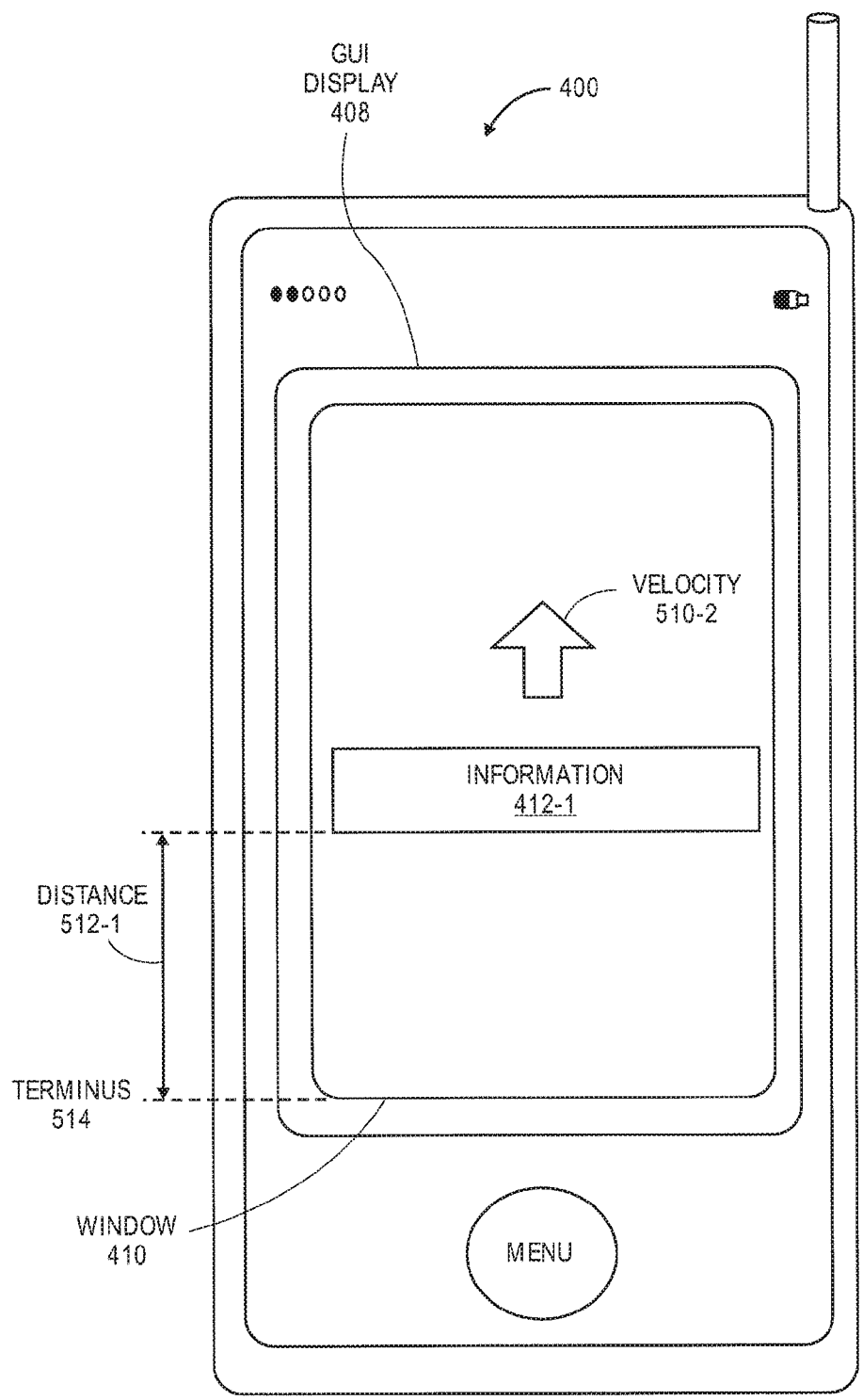

FIGS. 5A-5C illustrate the scrolling of a list of items on a device to a terminus of the list, at which point one or more displayed items at the end of the list smoothly bounce off the end of the display, reverse direction, and then optionally come to a stop. FIG. 5A is a schematic diagram illustrating an embodiment of user interface of a portable electronic device 400 having a touch-sensitive display. One or more displayed objects, such as information object 412-1 may be a distance 512-1 from a terminus 514 of the list of items which is an edge of a scrolled region and may be moving with a velocity 510-1 while the list is being scrolled. Note that the terminus 514 is a virtual boundary associated with the displayed objects, as opposed to a physical boundary associated with the window 410 and/or the display 408. As illustrated in FIG. 5B, when the one or more displayed objects, such as the information object 412-1, reach or intersect with the terminus 514, the movement corresponding to the scrolling may stop, i.e., the scrolling velocity may be zero at an instant in time. As illustrated in FIG. 5C, the one or more displayed objects, such as the information 412-1, may subsequently reverse direction. At a time after the intersection with the terminus 514, the information object 412-1 may have velocity 510-2 and may be a distance 512-2 from the terminus 514. In some embodiments, the magnitude of velocity 510-2 may be less than the magnitude of velocity 510-1 when the distance 512-2 equals the distance 512-1, i.e., the motion of the one or more displayed objects is damped after the scrolling list reaches and "bounces" at its terminus.

In at least some embodiments of the present disclosure, the method 200 performs the bounce operations described in FIGS. 5A-5C. The bounce call transferred at block 202 determines whether a bounce operation is enabled. The maximum and minimum bounces values determine the amount of bouncing of the scrolled region in an opposite direction of the scroll.

FIGS. 6A-6D illustrate the scrolling of a list of items to a terminus of the list, at which point an area beyond the terminus is displayed and the list is then scrolled in an opposite direction until the area beyond the terminus is no longer displayed, in accordance with some embodiments. The rubberband operation of method 300 is illustrated in the example of FIGS. 6A-6D with the listed items being email messages. FIGS. 6A-6D illustrate an exemplary user interface 3500A for managing an inbox in accordance with some embodiments. An analogous user interface may be used to display and manage other mailboxes (e.g., drafts, sent, trash, personal, etc.). In addition, other types of lists are possible, including but not limited to lists of instant message conversations, favorite phone numbers, contact information, labels, email folders, email addresses, physical addresses, ringtones, or album names.

Figure 6A:
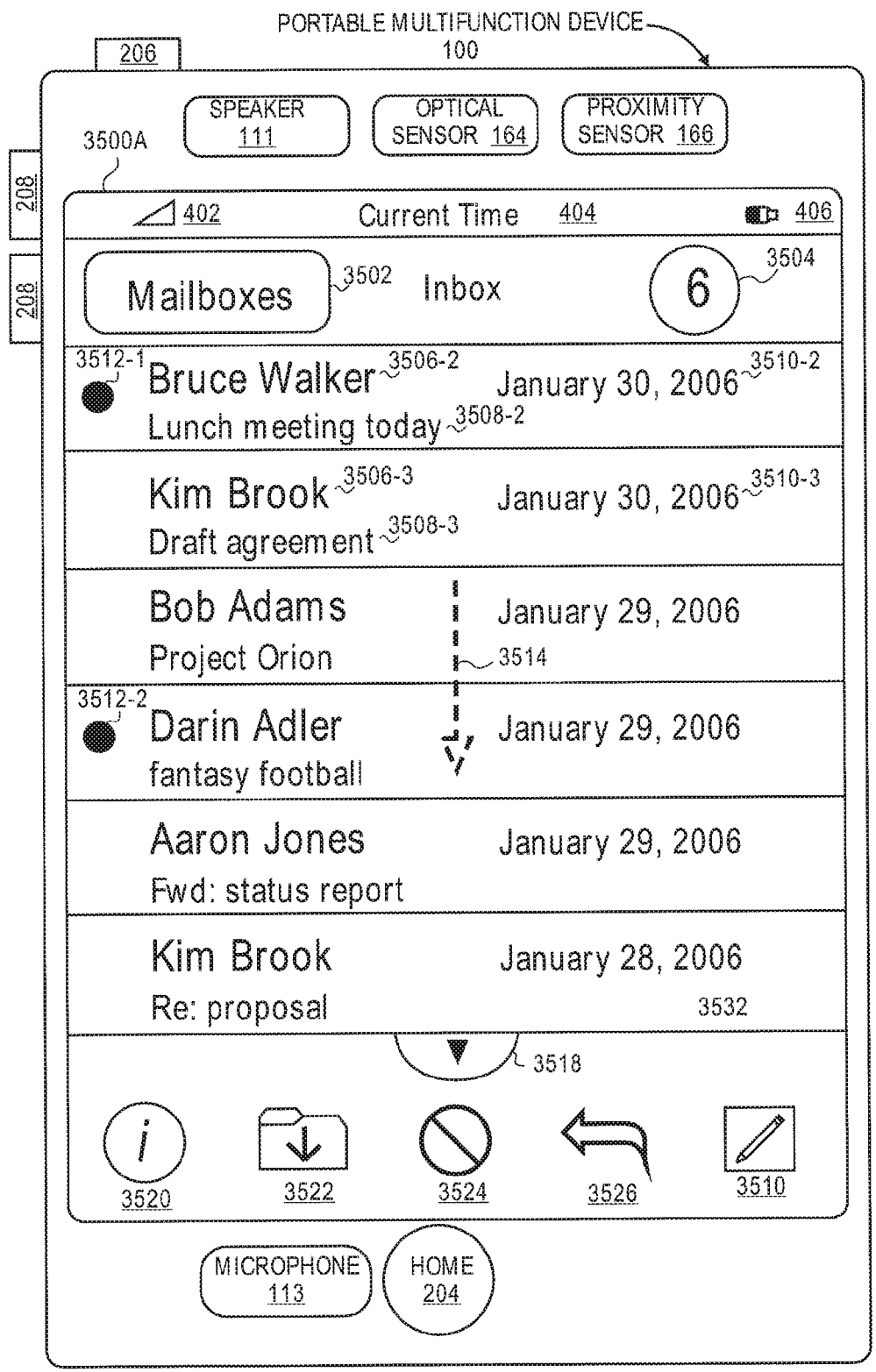
FIG. 6A-6D illustrate the scrolling of a list of items to a terminus of the list, at which point an area beyond the terminus is displayed and the list is then scrolled in an opposite direction until the area beyond the terminus is no longer displayed, in accordance with some embodiments.

If the list of emails fills more than the allotted screen area, the user may scroll through the emails using vertically upward and/or vertically downward swipe gestures on the touch screen. In the example of FIG. 6A, a portion of a list of emails is displayed in the screen area, including a top displayed email 3530 from Bruce Walker and a bottom displayed email 3532 from Kim Brook. A user performs a vertically downward swipe gesture 3514 to scroll toward the top of the list. The vertically downward gesture 3514 need not be exactly vertical; a substantially vertical gesture is sufficient. In some embodiments, a gesture within a predetermined angle of being perfectly vertical results in vertical scrolling.

Figure 6B:
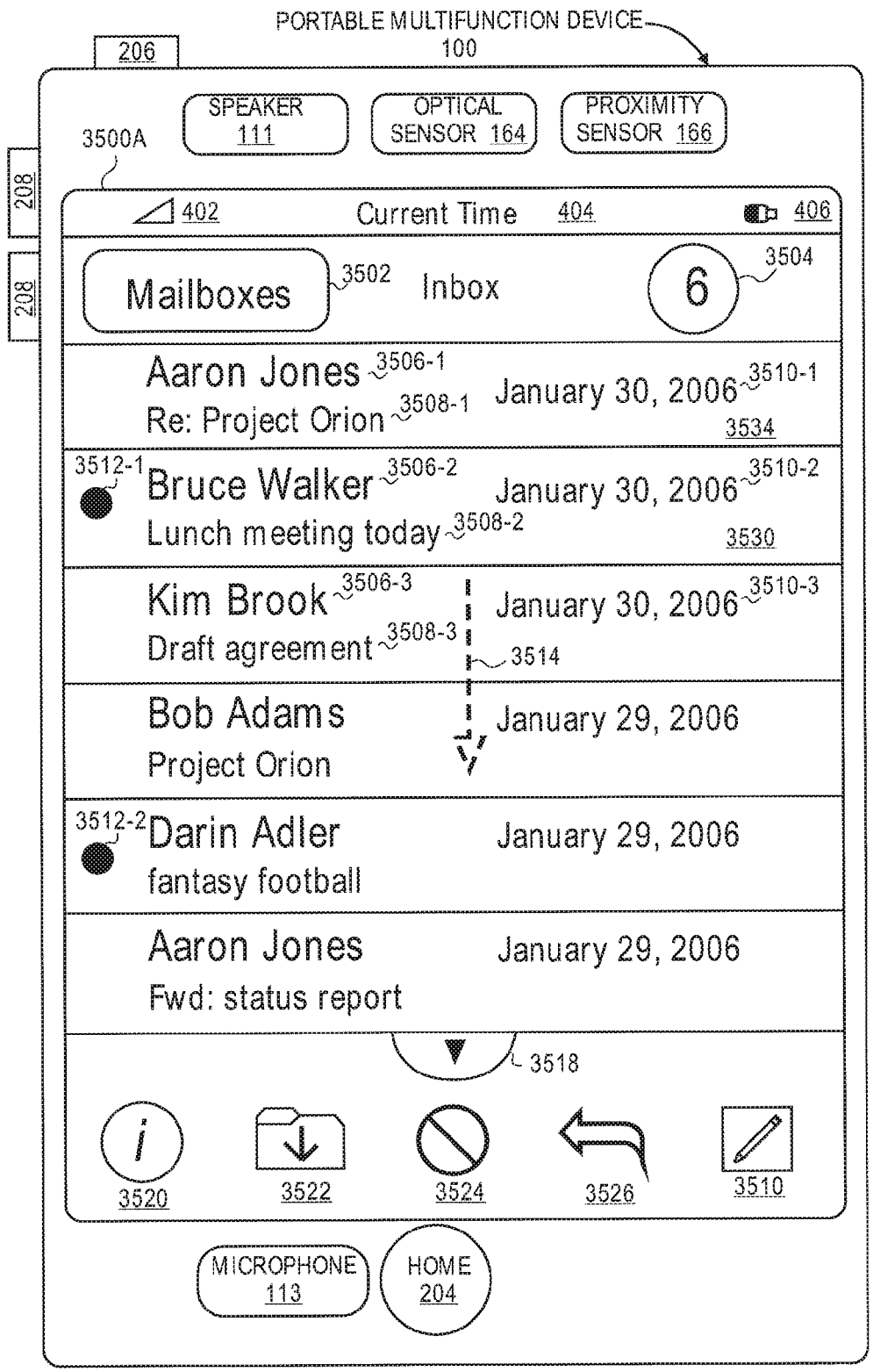

As a result of detecting the vertically downward gesture 3514, in FIG. 6B the displayed emails have shifted down, such that the previous bottom displayed email 3532 from Kim Brook is no longer displayed, the previous top displayed email 3530 from Bruce Walker is now second from the top, and the email 3534 from Aaron Jones, which was not displayed in FIG. 6A, is now displayed at the top of the list.

Figure 6C:
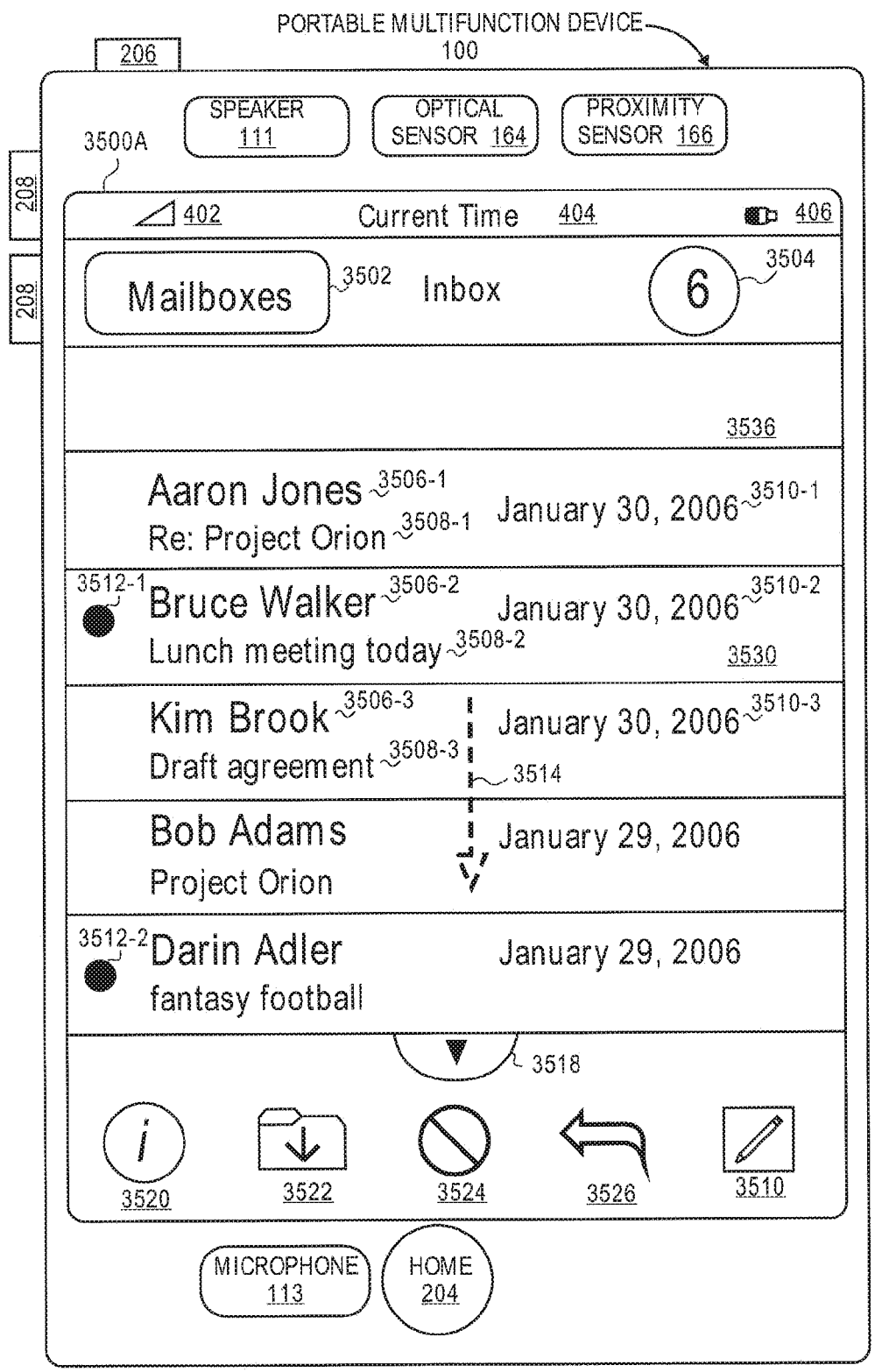

In this example, the email 3534 from Aaron Jones is the first email in the list and thus is the terminus of the list. Upon reaching this email 3534, in response to continued detection of the vertically downward gesture 3514, an area 3536 (FIG. 6C) above the first email 3534 (i.e., beyond the terminus of the list) is displayed. In some embodiments, the area displayed beyond the terminus of the list is visually indistinct from the background of the list. In FIG. 6C, both the area 3536 and the background of the emails (e.g., emails 3534 and 3530) are white and thus are visually indistinct.

Figure 6D:
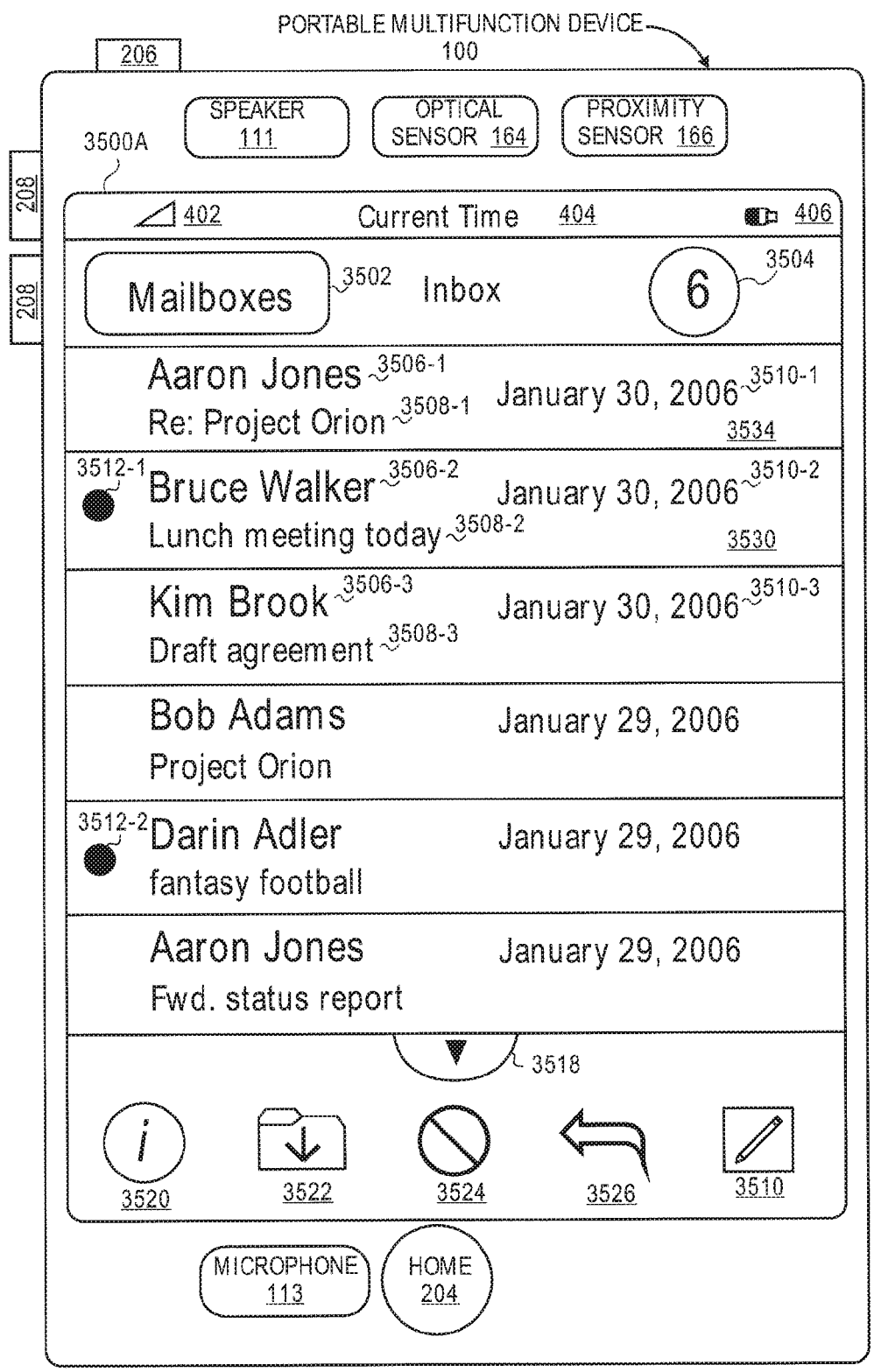

Once vertically downward gesture 3514 is complete, such that a corresponding object is no longer detected on or near the touch screen display, the list is scrolled in an opposite direction until the area 3536 is no longer displayed. FIG. 6D illustrates the result of this scrolling in the opposite direction, the email 3534 from Aaron Jones is now displayed at the top of the screen area allotted to the list and the area 3536 is not displayed.

In the example of FIGS. 6A-6D, a vertically downward gesture resulted in display of an area beyond the first item in the list. As described in FIG. 3, the values for the predetermined maximum displacement (e.g., display of an area beyond the first item in the list) are set at block 304 for top and bottom edges or at block 306 for all edges of the window.

Similarly, a vertically upward gesture may result in display of an area beyond the last item of the list, if the vertically upward gesture continues once the list has been scrolled to the last item. The last item may be considered a terminus of the list, similar to the first item. As discussed above, the gesture need not be exactly vertical to result in vertical scrolling; a gesture within a predefined range of angles from perfectly vertical is sufficient.

Figure 7:
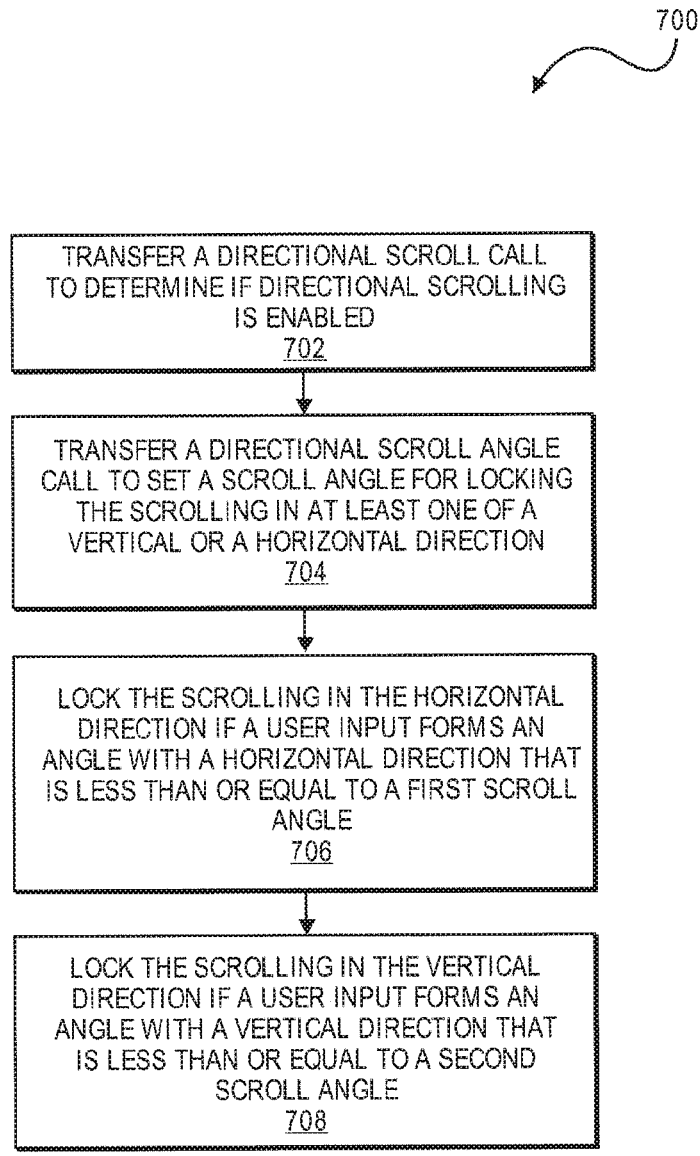
FIG. 7 illustrates details of an application programming interface in flow chart form according to certain teachings of the present disclosure.

FIG. 7 illustrates details of an application programming interface in flow chart form according to certain teachings of the present disclosure. The application programming interface operates in an environment with user interface software interacting with a software application in order to provide a directional scrolling operation. The method 700 for operating through an application programming interface (API) includes transferring a directional scroll angle call to determine if directional scrolling is enabled at block 702. The method 700 further includes transferring a directional scroll angle call to set a scroll angle for locking the scrolling in at least one of a vertical or a horizontal direction at block 704. The method 700 further includes locking the scrolling in the horizontal direction if a user input forms an angle with a horizontal direction that is less than or equal to a first scroll angle at block 706. The method 700 further includes locking the scrolling in the vertical direction if a user input forms an angle with the vertical direction that is less than or equal to a second scroll angle at block 708.

In certain embodiments, a user input in the form of a drag forms an angle with the horizontal direction that is less than the first scroll angle. In this case, the user presumably intends to scroll in the horizontal direction. The scrolling will be locked in the horizontal direction until the user input exceeds the first scroll angle. A second scroll angle may be used for locking the user input in the vertical direction. The second scroll angle may be set equal to the first scroll angle.

Figure 8:
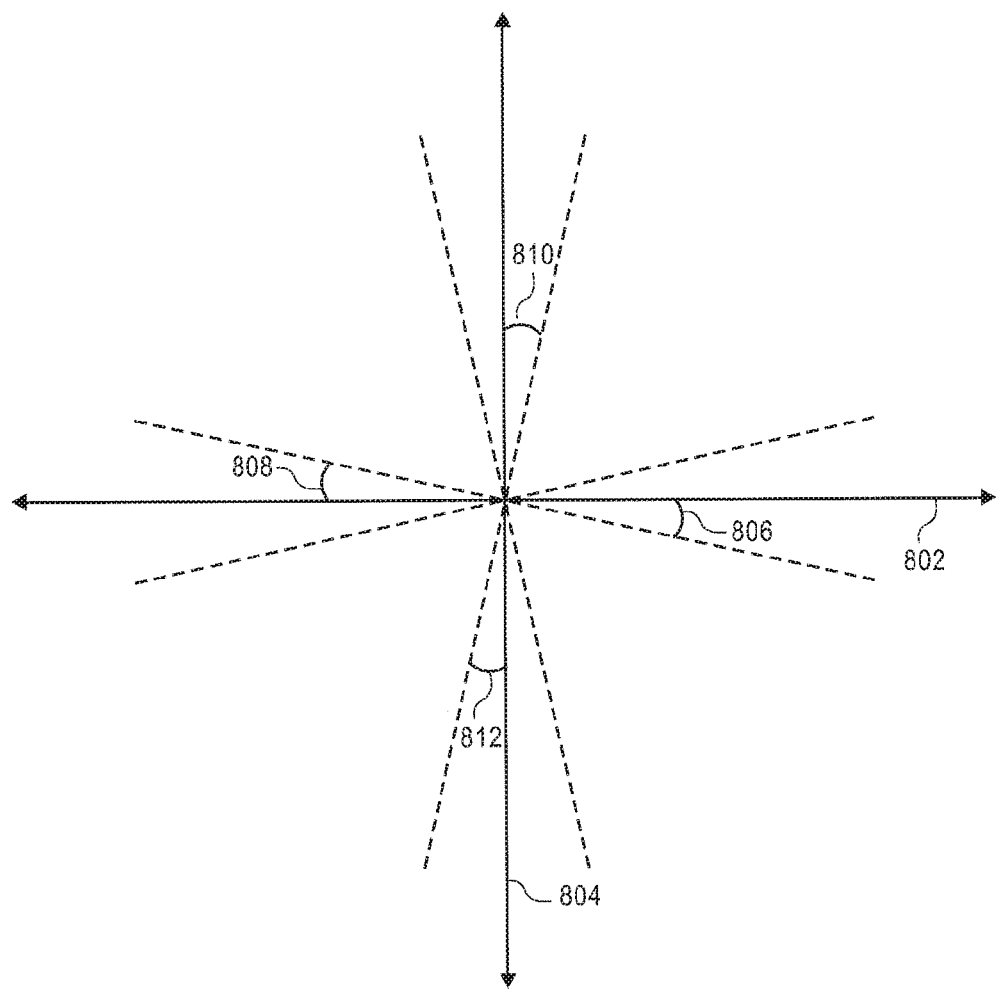
FIG. 8 illustrates first and second scroll angles for locking a scroll of a display of a device in a horizontal or vertical direction according to certain teachings of the present disclosure.

FIG. 8 illustrates first and second scroll angles for locking a scroll of a display of a device in a horizontal or vertical direction. The horizontal direction 802 and vertical direction 804 are in reference to a window or a display of a device. As discussed in the method 700, a user input such as a drag movement forming an angle with the horizontal direction 802 less than or equal to the first scrolling angle 806 or 808 will lock the user input in the horizontal direction. In a similar manner, a user input forming an angle with the vertical direction 810 less than or equal to the second scrolling angle 810 or 812 will lock the user input in the vertical direction. The first and second scrolling angles may be set at the same angle or at different angles as well. For example, the first and second scrolling angles may be set at 25 degrees. A user input less than or equal to 25 degrees with respect to the horizontal or vertical direction will lock the scrolling in the appropriate direction.

In some embodiments, the horizontal and vertical locking angles can be determined in part by the aspect of the content. For example, content in the form of a tall page may receive a larger vertical locking angle compared to the horizontal locking angle.

Figure 9:
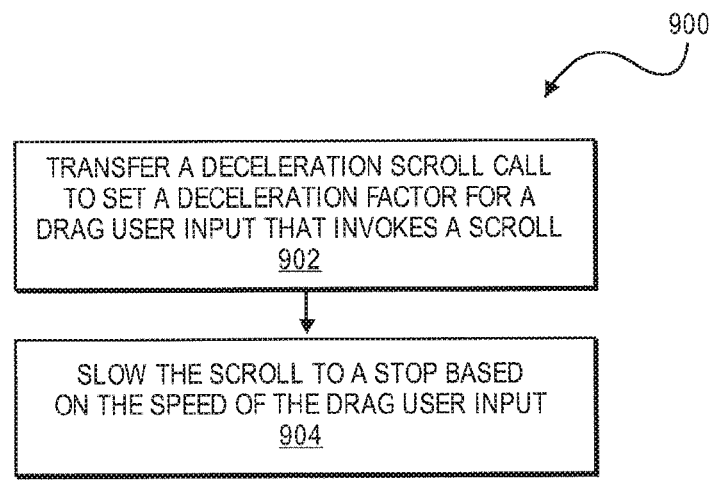
FIG. 9 illustrates details of an application programming interface in flow chart form according to certain teachings of the present disclosure.

FIG. 9 illustrates details of an application programming interface in flow chart form according to certain teachings of the present disclosure. The application programming interface operates in an environment with user interface software interacting with a software application in order to provide a deceleration scroll operation. The method 900 for providing the deceleration scroll operation includes transferring a deceleration scroll call to set a deceleration factor for a drag user input at block 902. The method 900 further includes slowing the scroll to a stop based on the speed of the drag user input and the deceleration factor at block 904.

In certain embodiments, a user input in the form of a drag invokes a scroll operation for a certain time period. The user input has a certain speed. The scroll of the scrolled region of a window or a display region of a display of a device will be stopped after the user input stops by applying a deceleration factor to the speed of the user input during the drag movement.

Figure 10:
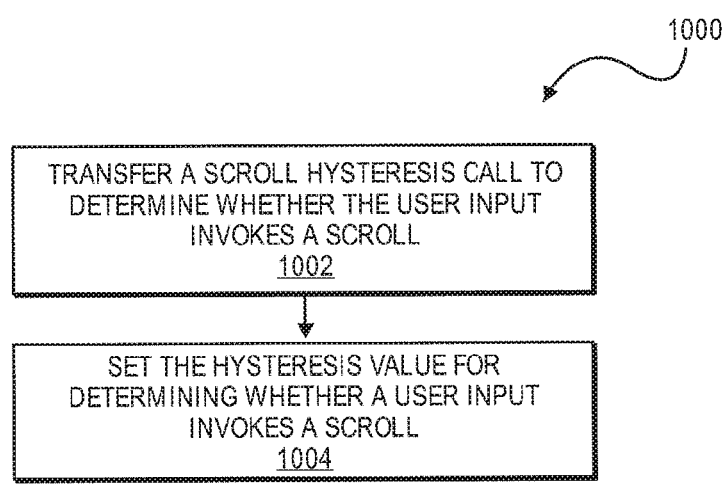
FIG. 10 illustrates details of an application programming interface in flow chart form according to certain teachings of the present disclosure.

FIG. 10 illustrates details of an application programming interface in flow chart form according to certain teachings of the present disclosure. The application programming interface operates in an environment with user interface software interacting with a software application in order to provide a scroll hysteresis operation. The method 1000 for providing the scroll hysteresis operation includes transferring a scroll hysteresis call to determine whether a user input invokes a scroll at block 1002. The method 1000 further includes setting a hysteresis value for determining whether a user input invokes a scroll at block 1004.

In certain embodiments, a user input in the form of a drag over a certain distance across a display or window within a display of a device invokes a scroll operation. The hysteresis value determines the certain distance which the user input must drag across the display or window prior to invoking a scroll operation. A user input that does not drag the certain predetermined distance will not invoke a scroll operation and may be considered a mouse up or down input or other type of input.

Figure 11:
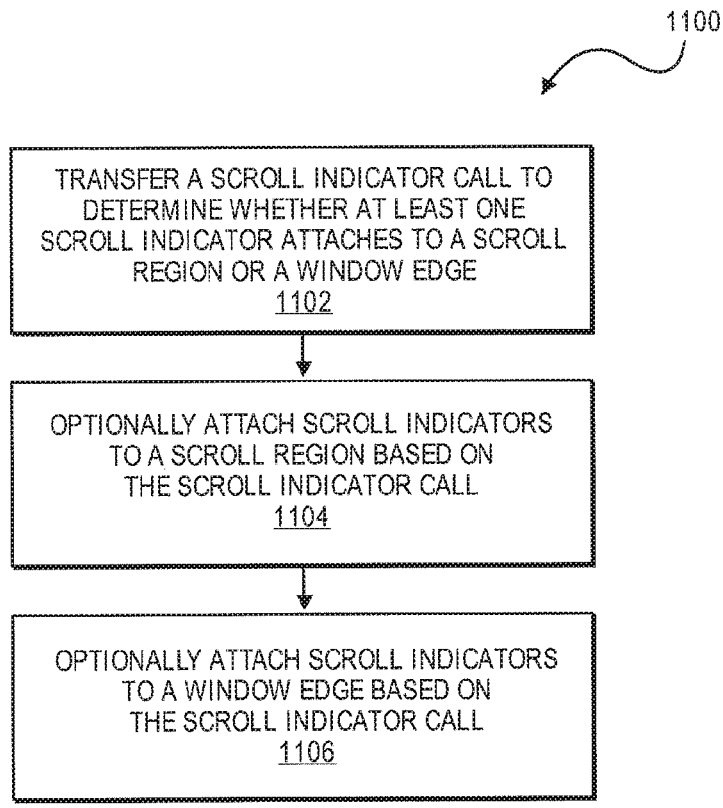
FIG. 11 illustrates details of an application programming interface in flow chart form according to certain teachings of the present disclosure.

FIG. 11 illustrates details of an application programming interface in flow chart form according to certain teachings of the present disclosure. The application programming interface operates in an environment with user interface software interacting with a software application in order to attach a scroll indicator to a scroll region edge or a window edge of a device. In some embodiments, the scroll region edge is associated with a content edge. The window or display edge may be associated with the edge of a display region. The method 1100 for providing the scroll indicator includes transferring a scroll indicator call to determine whether at least one scroll indicator attaches to an edge of a scroll region or a window edge at block 1102. A scroll indicator may be displayed on any display edge, window edge or scroll region edge. The method 1100 further includes optionally attaching at least one scroll indicator to the edge of the scroll region based on the scroll indicator call at block 1104. Alternatively, the method 1100 further includes optionally attaching at least one scroll indicator to the window edge of the view based on the scroll indicator call at block 1106.

In some embodiments, the operations of method 1100 can be altered, modified, combined, or deleted. For example, block 1104 can be deleted. Likewise, block 1106 can be deleted from the method 1100. Alternatively, the order of block 1104 and block 1106 can be switched. Other methods having various operations that have been disclosed within the present disclosure can also be altered, modified, rearranged, collapsed, combined, or deleted.

In certain embodiments of the present disclosure, transferring the scroll indicator call is either one of issuing, initiating, invoking or receiving the scroll indicator call. For example, the user interface software (e.g., software kit or library) may receive the scroll indicator call from the software application.

Figure 12:
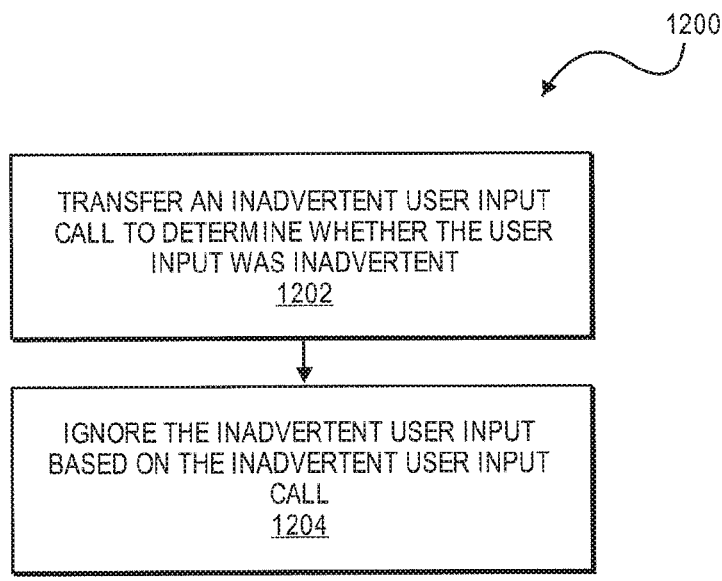
FIG. 12 illustrates details of an application programming interface in flow chart form according to certain teachings of the present disclosure.

FIG. 12 illustrates details of an application programming interface in flow chart form according to certain teachings of the present disclosure. The application programming interface operates in an environment with user interface software interacting with a software application in order to determine if an inadvertent user input contacts a view of a display of a device. The method 1200 includes transferring an inadvertent user input call to determine whether the user input was inadvertent at block 1202. The method 1200 further includes ignoring the inadvertent user input based on the determination of the inadvertent user input call at block 1204. In one embodiment, the inadvertent user input call comprises a thumb detection call to determine whether the user input was an inadvertent thumb.

In certain embodiments of the present disclosure, transferring the inadvertent user input call is either one of issuing, initiating, invoking or receiving the inadvertent user input call.

A gesture API provides an interface between an application and user software in order to handle gesturing. Gesturing may include scaling, rotating, or other changes to a view, window, or display. A mask may merely permit certain changes while limiting or not permitting other changes. Events of all kinds come into the application via a graphics framework. They are enqueued, collaleced if necessary and dispatched. If the events are system level events (e.g., application should suspend, device orientation has changed, etc.) they are routed to the application having an instance of a class of the user interface software. If the events are hand events based on a user input, the events are routed to the window they occurred over. The window then routes these events to the appropriate control by calling the instance's mouse and gesture methods. The control that receives a mouse down or mouse entered function will continue to get all future calls until the hand is lifted. If a second finger is detected, the gesture methods or functions are invoked. These functions may include start, change, and end gesture calls. The control that receives start gesture call will be sent all future change gesture calls until the gesture ends.

Figure 13:
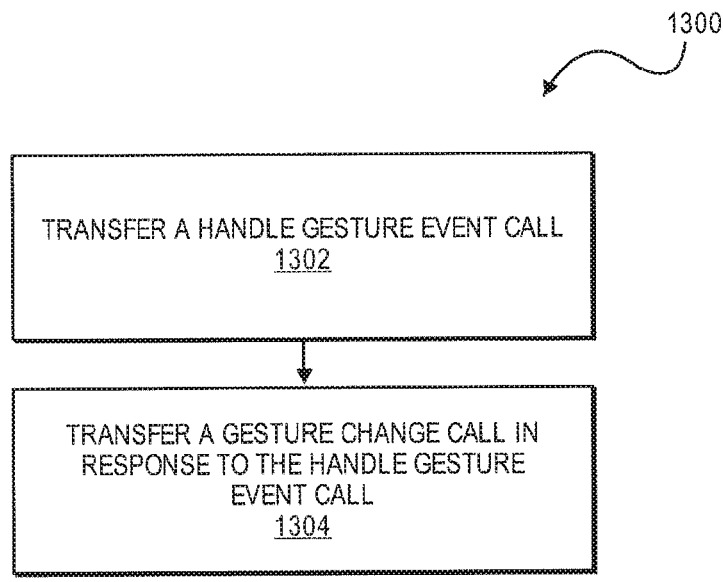
FIG. 13 illustrates details of an application programming interface in flow chart form according to certain teachings of the present disclosure.

FIG. 13 illustrates details of an application programming interface in flow chart form according to certain teachings of the present disclosure. The application programming interface operates in an environment with user interface software interacting with a software application in order to provide a gesture operation. The method 1300 for providing the gesture operation includes transferring a handle gesture event call at block 1302. The method 1300 further includes transferring a gesture change call in response to the handle gesture event call at block 1304.

In certain embodiments, a user input in the form of two or more points is received by a display of a device. A multi-touch driver of the device receives the user input and packages the event into an event object. A window server receives the event object and determines whether the event object is a gesture event object. If the window server determines that a gesture event object has been received, then user interface software issues or transfers the handle gesture call at block 1302 to a software application associated with the view. The software application confirms that a gesture event has been received and passes the handle gesture call to a library of the user interface software. The window server also associates the gesture event object with the view that received the user input. The library responds by transferring a gesture change call in response to the handle gesture event call at block 1304.

In one embodiment, a window or view associated with the user input receives the change call in order to perform the gesture event. The user software that provides the view receives a gesture start event call, a gesture changed event call, a zoom to scale setting for the view, and a gesture end call. The gesture calls receive an input of a gesture event which may be base event having a type such as a hand event, keyboard event, system event, etc. A delegate associated with the application receives a start gesture call, gesture did change call, and gesture did finish call. The user software is dynamically linking into the application during the run time of the gesture process.

In some embodiments, the gesture changed function call contains the following information about the gesture:
the number of fingers currently down;
the number of fingers initially down;
the rotation of the hand;
the scale of the hand;
the translation of the hand;
the position of the inner and outermost fingers; and
the pressure of the first finger.

In other embodiments, more information about each finger down may be included as follows:
the stage of the finger (just touch down, fully pressed, lifting off, etc.);
the position of the finger;
the proximity of the finger (how hard you're touching);
the orientation of the finger (what angle the ovoid is at);
the length of the major and minor axis;
the velocity of the finger; and
the eccentricity of the finger's ovoid.

A gesture event object may be a chord event object having a chord count (e.g., number of fingers contacted the view or display), a chord start event, a chord change event, and a chord end event. A chord change event may include a scaling or rotation transform.

Figure 14:
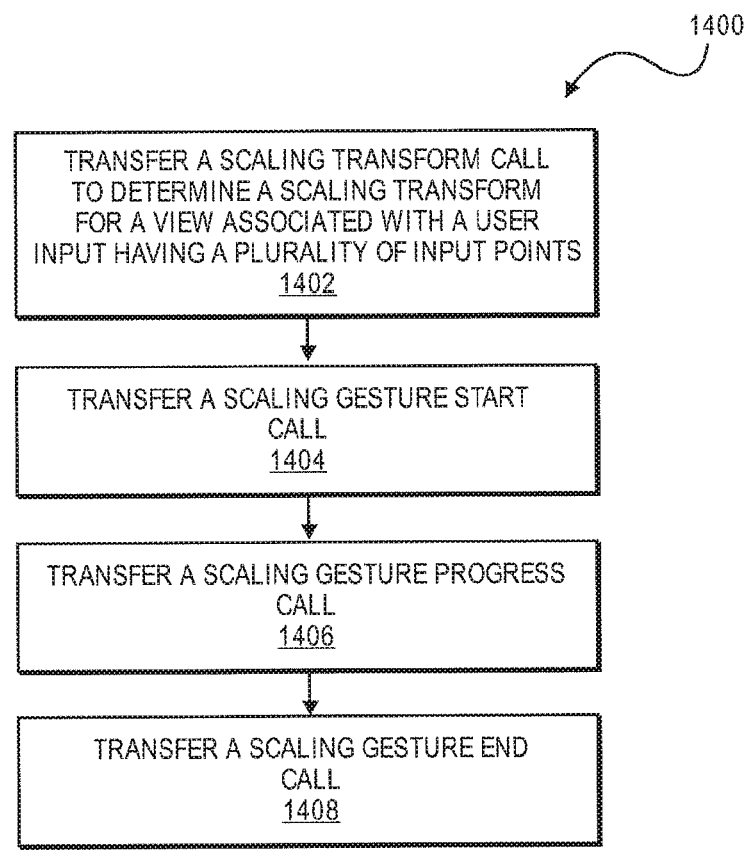
FIG. 14 illustrates details of an application programming interface in flow chart form according to certain teachings of the present disclosure.

FIG. 14 illustrates details of an application programming interface in flow chart form according to certain teachings of the present disclosure. The application programming interface operates in an environment with user interface software interacting with a software application in order to provide a scaling transform of a display region, window, or view of a display of a device. The method 1400 for providing the scaling transform includes transferring a scaling transform call to determine a scaling transform for a view associated with a user input having a plurality of input points at block 1402. The method 1400 further includes transferring a scaling gesture start call at block 1404. The method 1400 further includes transferring a scaling gesture progress call at block 1406. The method 1200 further includes transferring a scaling gesture end call at block 1408.

Figure 15:
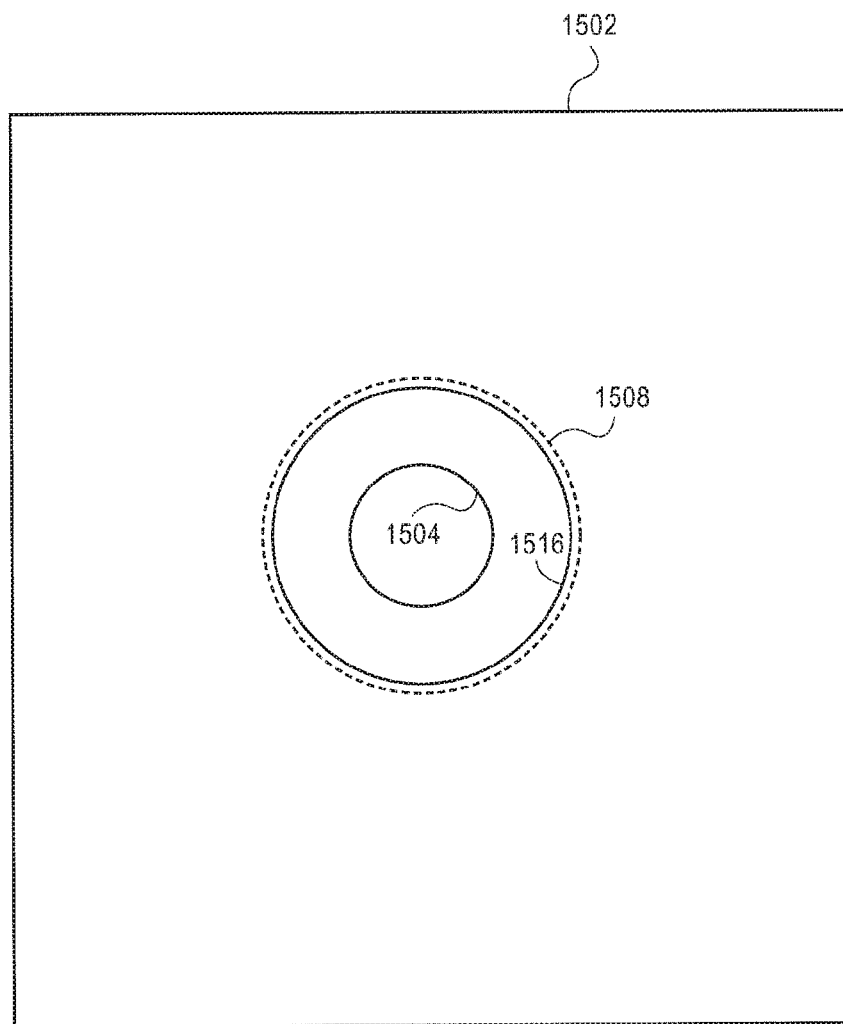
FIG. 15 illustrates a display of a device having a scaling transform of a view.

In certain embodiments, a user input in the form of two or more input points (e.g., fingers) moves together or apart to invoke a gesture event that performs a scaling transform on the view associated with the user input. A scale transform includes a minimum and maximum scale factor. FIG. 15 illustrates a display 1502 of a device having a scaling transform of a view. The view 1504 (e.g., web, text, or image content) has a first scale factor. A user input (e.g., two fingers moving apart) associated with the view 1504 is interpreted as a gesture event to zoom out from view 1504 to view 1508 having a second scale factor that exceeds the maximum scale factor of the view 1516. A snapback flag determines whether the zoom out can proceed past the maximum scale factor to view 1508 prior to snapping back to the maximum scale factor associated with view 1516.

Figure 16B:
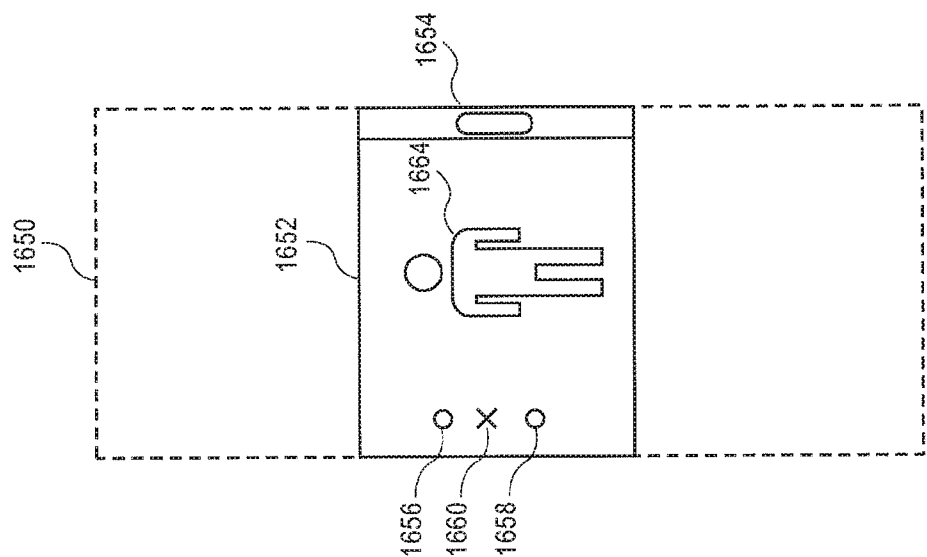
FIGS. 16A-16B illustrate a display of a device with a view having a first and a second scaling factor.
Figure 16A:
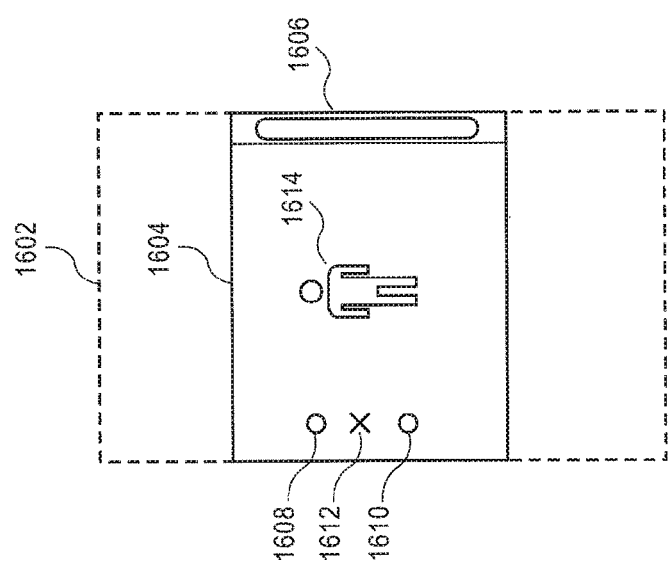

FIG. 16A illustrates a display 1604 of a device having a first scaling factor of a view 1616. A user input (e.g., two fingers 1608 and 1610 moving together) associated with the view 1614 is interpreted as a gesture event to zoom in from view 1614 to view 1664 having a second scale factor as illustrated in FIG. 16B. The dashed regions 1602 and 1650 represent the total area of the content with the only content being displayed in the display area 1604 and 1652. In performing the scaling transform from FIG. 16A to FIG. 16B, the center of the gesture event, center 1612 for FIG. 16A and center 1660 for FIG. 16B, remains in the same position with respect to the display 1604. The scroll indicator 1606 shrinks to become scroll indicator 1654 during the transform to indicate that a smaller portion of the total content 1650 is being displayed on display 1604 as a result of the zoom in operation. The dashed region 1650 is larger than the dashed region 1602 to represent that a larger portion of content is not being displayed on display 1652 in FIG. 16B as a result of the zoom in operation.

In at least some embodiments of the present disclosure, a user desires to change a view 1670 from a scale factor of 2× to a scale factor of 1×. As illustrated in FIG. 16C, a first set of user inputs 1672 and 1674 that move to the second set of user inputs 1676 and 1678 will decrease the scale factor from 2× to 1×. It may be desirable for the user to scale from 2× to 1× without having to move the user inputs a large distance across the view 1670. In an environment with user interface software interacting with a software application, a gesture scaling transform flag may be set in order to determine a scaling transform for a view associated with a user input having a plurality of input points. The scaling transform flag scales either from a current scale factor to a minimum scale factor or from the current scale factor to a maximum scale factor. For example, a flag may be set at the position associated with a 1.5× scale factor and a third set of user inputs 1680 and 1682. A user desiring to change the scale factor from 2× to 1× would only have to move his fingers, the user inputs, from the first set 1672 and 1674 to the third set 1680 and 1682 if the gesture scaling transform flag has been set at a scale factor of 1.5×.

Figure 17:
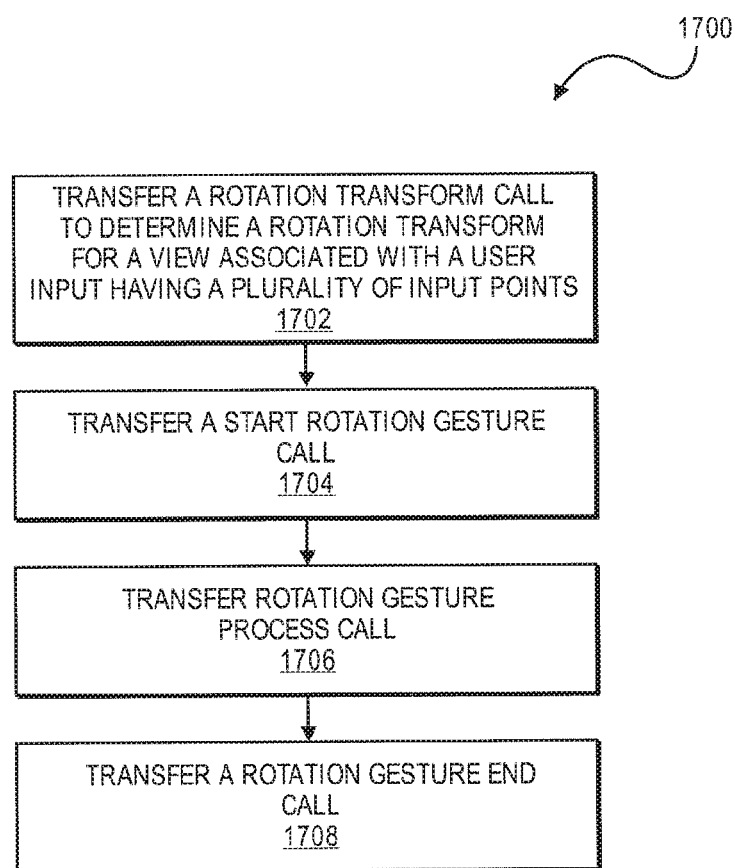
FIG. 17 illustrates details of an application programming interface in flow chart form according to certain teachings of the present disclosure.

FIG. 17 illustrates details of an application programming interface in flow chart form according to certain teachings of the present disclosure. The application programming interface operates in an environment with user interface software interacting with a software application in order to provide a rotation transform of a view, window, or display region of a display of a device. The method 1700 for providing the rotation transform includes transferring a rotation transform call to determine a rotation transform for a view associated with a user input having a plurality of input points at block 1702. The method 1700 further includes transferring a rotation gesture start call at block 1704. The method 1700 further includes transferring a rotation gesture progress call at block 1706. The method 1700 further includes transferring a rotation gesture end call at block 1708.

In certain embodiments, a user input in the form of two or more input points rotates to invoke a gesture event that performs a rotation transform on the view associated with the user input. The rotation transform includes a minimum and maximum degree of rotation for associated minimum and maximum rotation views. The user input may temporarily rotate a view past a maximum degree of rotation prior to the view snapping back to the maximum degree of rotation.

Figure 18:
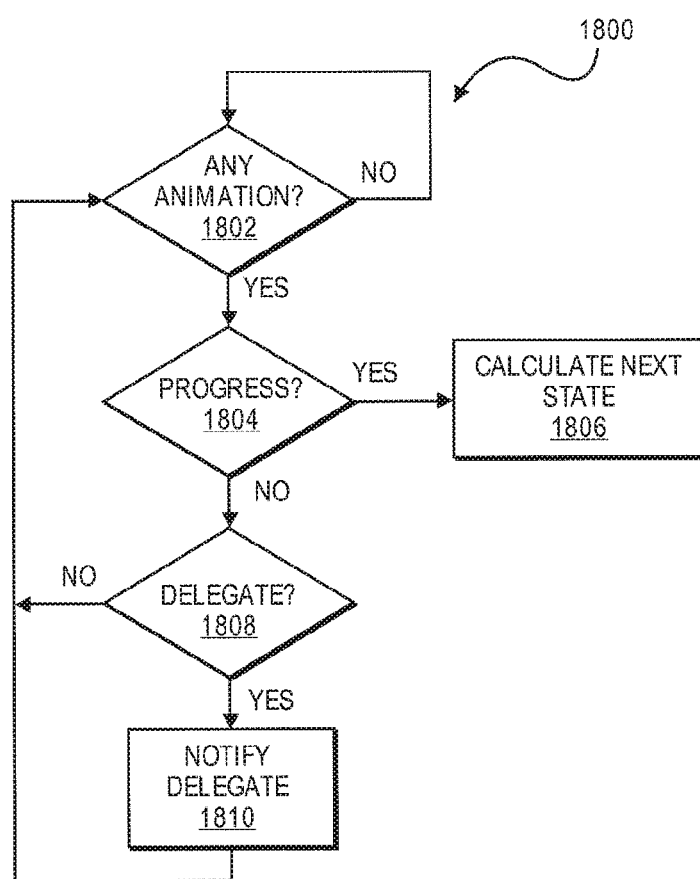
FIG. 18 illustrates details of an application programming interface in flow chart form according to certain teachings of the present disclosure.

FIG. 18 illustrates details of an application programming interface in flow chart form according to certain teachings of the present disclosure. The application programming interface operates in an environment with user interface software interacting with a software application in order to notify a delegate of at least one animation associated with a display region, window, or view of a display of a device. A delay in the animation may be specified by the API. Also, multiple animations may be assigned priority by the API. The method 1800 for notifying the delegate includes determining whether any animation occurs at block 1802. The method 1800 further includes checking the progress of an animation at block 1804. If progress has occurred, then the next state (e.g., position, opacity, or transform) of the animation can be calculated at block 1806. If progress has completed at block 1806, then at block 1808 it is determined whether the view associated with the completed animation is associated with a delegate. If so, a delegate call is transferred to notify the delegate of the animation for the view at block 1810. The delegate operating under the control of the software application can change other views in response to the view being modified by the animation.

In certain embodiments, software invokes an animation that performs a scaling transform on the view associated with the user input. A display may include numerous views. The view being increased in size by the scaling transform may obstruct other views in which case the other views may need to be reduced in size. Alternatively, the view being decreased in size by the scaling transform may create additional area for other views to increase in size.

Figure 19:
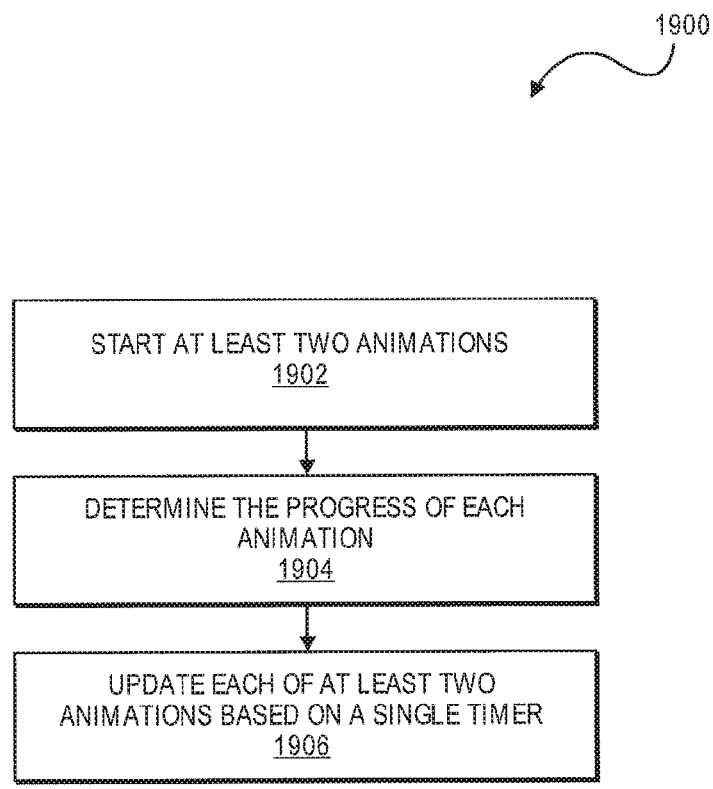
FIG. 19 is flow chart of a method for animating views displayed on a display of a device.

FIG. 19 is flow chart of a method for animating a display region, windows, or views displayed on a display of a device. The method 1900 includes starting at least two animations at block 1902. The method 1900 further includes determining the progress of each animation at block 1904. The method 1900 further includes completing each animation based on a single timer at block 1906.

In certain embodiments of the present disclosure, the single timer includes a timer based on a redraw interval which is a time period between the display of a current frame and a next frame of the display of the device. In this case, changes in animation are updated to the display during the redraw interval in order to display the changes during the next frame of the display. The progress of each animation may be calculated periodically or based upon a progress call.

The method 1900 may further include determining whether each animation is associated with a delegate. The delegate is then notified of the animation. Other views not associated with an animation may be changed depending on the software application controlling the delegate.

Figure 20:
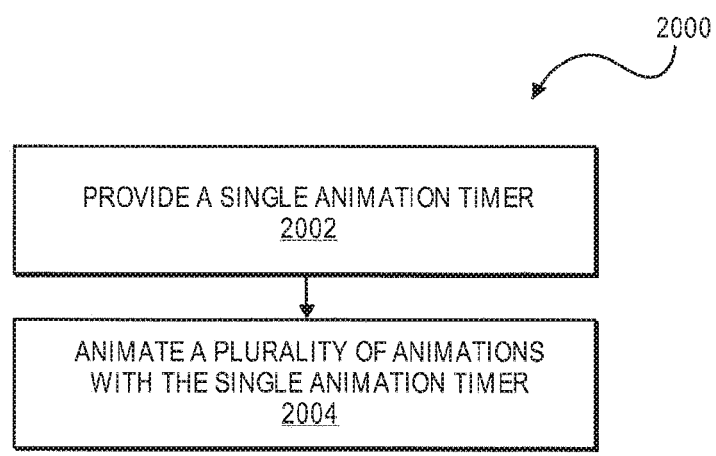
FIG. 20 is flow chart of a method for animating views displayed on a display of a device.

FIG. 20 is flow chart of a method for animating a display region, windows, or views displayed on a display of a device. The method 2000 includes providing a single animation timer at block 2002. The method 2000 further includes animating a plurality of animations with the single animation timer at block 2004. For example, a single timer may control all animations which occur simultaneously. The animations may include a transform, a frame, and an opacity animation. A animation transform may include a scaling or rotation transform. A frame animation may include resizing of a frame. An opacity animation changes the opacity from opaque to transparent or vice versa.

Figure 21:
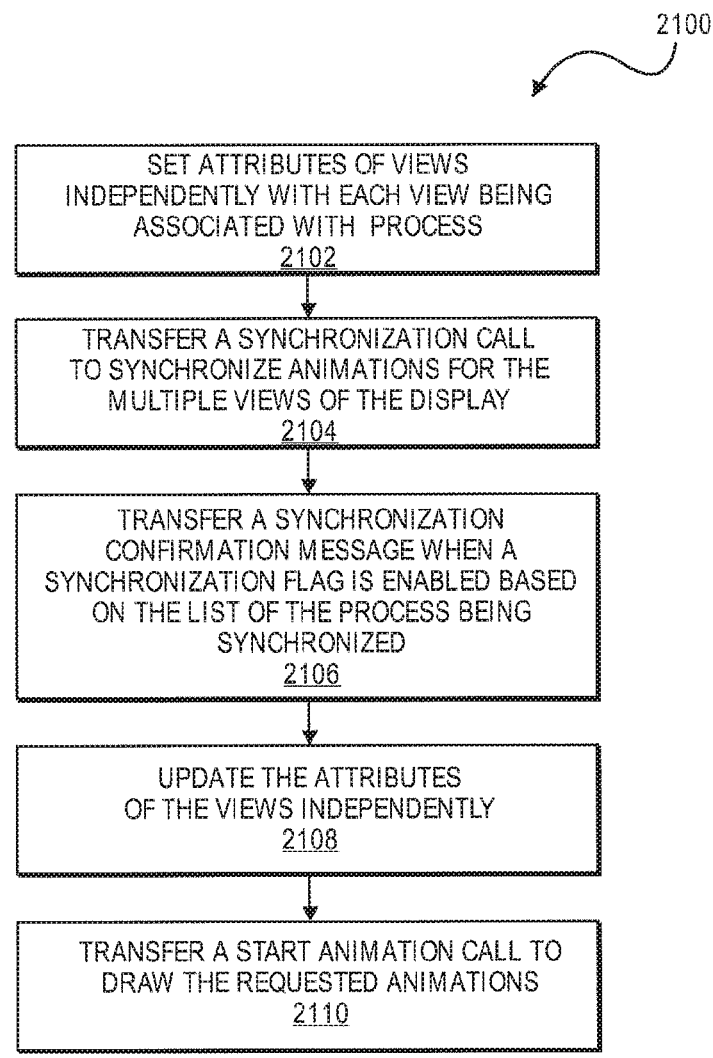
FIG. 21 illustrates details of an application programming interface in flow chart form according to certain teachings of the present disclosure.

FIG. 21 illustrates details of an application programming interface in flow chart form according to certain teachings of the present disclosure. The application programming interface operates in an environment with user interface software interacting with multiple software applications or processes in order to synchronize animations associated with multiple views or windows of a display of a device. The method 2100 for synchronizing the animations includes setting attributes of views independently with each view being associated with a process at block 2102. For example, an attribute or property of a view may include a position, size, opacity, etc. An animation alters one or more attributes from a first state to a second state. The method 2100 further includes transferring a synchronization call to synchronize animations for the multiple views of the display at block 2104. The synchronization call may include input parameters or arguments such as an identification of the synchronization of the processes and a list of the processes that are requesting animation of the multiple views. In one embodiment, the synchronization call includes the identification and the number of processes that are requesting animation. In one embodiment, each application or process sends a synchronization call at different times. The method 2100 further includes transferring a synchronization confirmation message when a synchronization flag is enabled at block 2106. The synchronization flag can be enabled when the processes to be synchronized have each sent messages to a window server operating the user interface software. The method 2100 further includes updating the attributes of the views from a first state to a second state independently at block 2108. In one embodiment, the window server receives the updated attributes from each process at different times. The method 2100 further includes transferring a start animation call to draw the requested animations when both processes have updated attributes associated with the second state at block 2110.

In some embodiments, a first data structure or layer tree represents a hierarchy of layers that correspond to the views or windows of the processes. A second data structure or render tree represents a similar copy of the layer tree. However, the render tree is not updated until the independent processes have completed their separate animations. At this time, the render tree updates and redraws the screen with the new animations.

Figure 22A:
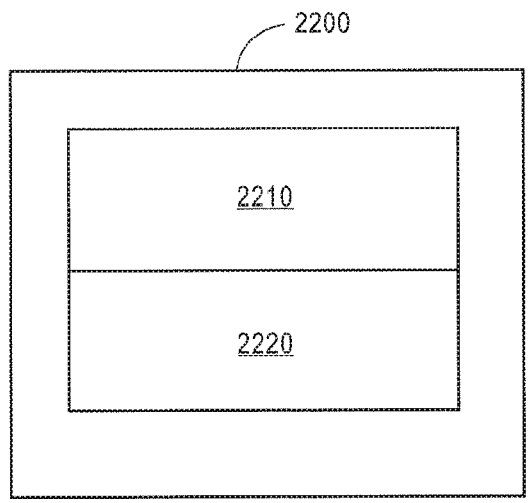
FIGS. 22A and 22B illustrate synchronizing the resizing of windows of a display of a device.
Figure 22B:
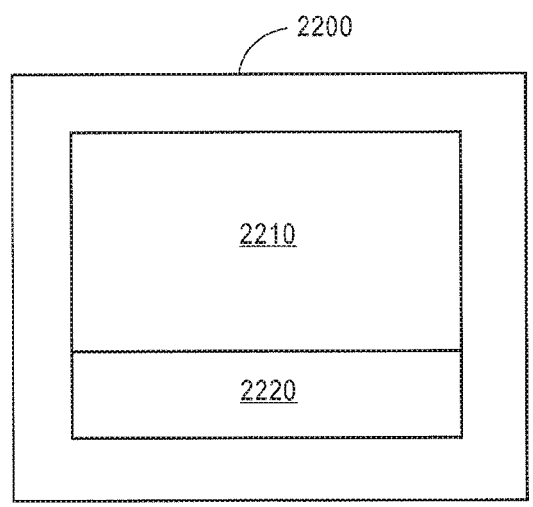

FIGS. 22A and 22B illustrate synchronizing the resizing of views or windows of a display of a device. For example, a window 2210 associated with a first process with a size attribute may increase in size by changing from a first state, window 2210 in FIG. 22A, to a second state, window 2210 in FIG. 22B. At approximately the same time, a second window 2220 may decrease in size in proportion to the increase in size of the first window 2210. The method 2100 provides synchronization of the resizing of the windows 2210 and 2220 illustrated in FIGS. 22A and 22B. The animations in changing from the first state to the second state may occur incrementally and occur with the synchronization of method 2100.

Figure 23:
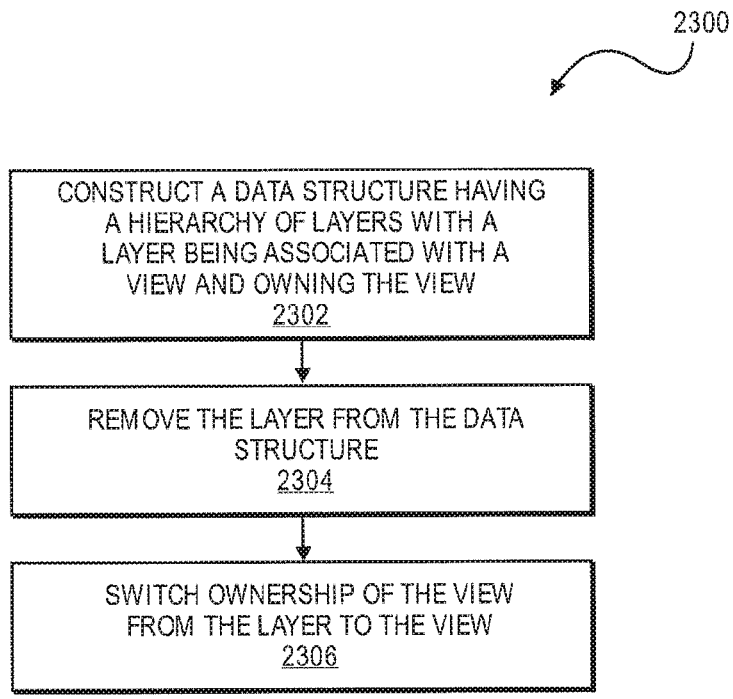
FIG. 23 illustrates a method for switching ownership of a view of an application displayed on a display of a data processing device.

FIG. 23 illustrates a method for switching ownership of a view of an application displayed on a display of a data processing device. The method 2300 includes constructing a data structure having a hierarchy of layers with a layer being associated with a view and owning the view at block 2302. The layers may be content, windows, video, images, text, media, or any other type of object for user interface of the application. The method 2300 further includes removing the layer from the data structure at block 2304. The method 2300 further includes switching ownership of the view from the layer to the view at block 2306.

In some embodiments, each layer from the data structure is associated with a view. The layer associated with the view sends a delegate function call to the view in order to generate content provided by the view. A first pointer reference points from the layer to the view. A second pointer reference points from the view to the layer. The number of references pointing to an object such as the view is defined as the retained count of the object. The view may receive notification that the layer will be removed from the data structure. Removing the layer from the data structure may occur based on the view associated with the layer being removed from the display of the device. When the layer is removed from the data structure or layer tree the pointer from the layer to the view will be removed. The view will have a retained count of zero and be deallocated or removed from memory if the ownership of the view is not reversed. The view will have a retained count of at least one if ownership is reversed.

Figure 24:
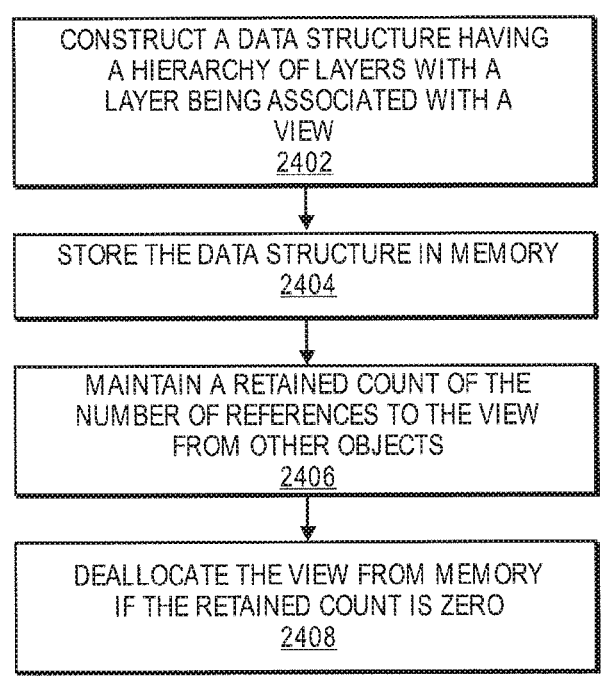
FIG. 24 illustrates a method for memory management of a view of an application displayed on a display of a device.

FIG. 24 illustrates a method for memory management of a view of an application displayed on a display of a device. The method 2400 includes constructing a data structure having a hierarchy of layers with at least one layer being associated with the view at block 2402. The method 2400 further includes storing the data structure in memory at block 2404. The method 2400 further includes maintaining a retained count of the number of references to the view from other objects at block 2406. The method 2400 further includes deallocating the view from memory if the retained count is zero at block 2408. As discussed above, the retained count of the view will be decremented if the layer is removed from the data structure. Removing the layer from the data structure may occur based on the view associated with the layer being removed from the display of the device.

Figure 25A:
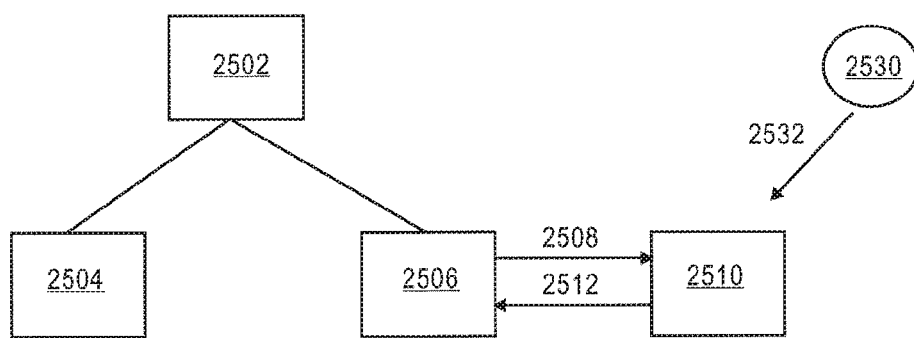
FIGS. 25A and 25B illustrate a data structure having a hierarchy of layers with a layer being associated with a view.
Figure 25B:
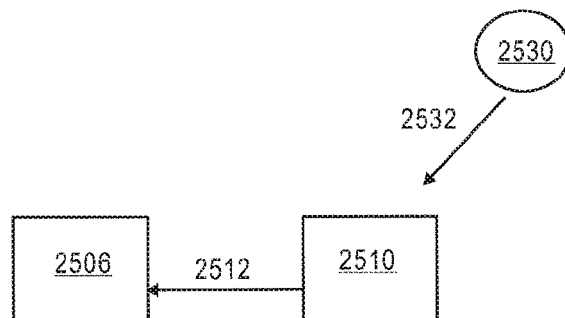

FIGS. 25A and 25B illustrate a data structure having a hierarchy of layers with a layer being associated with a view. The data structure includes layers 2502, 2504, and 2506. Layer 2506 is associated with the view 2510. The layer 2506 associated with the 2510 view sends a delegate call to the view in order to generate content provided by the view. A first pointer reference 2508 points from the layer 2506 to the view 2510. A second pointer reference 2512 points from the view 2510 to the layer 2506. A third pointer reference 2532 may point from user interface (UI) controller 2530 to the view 2510. The UI controller 2530 may control operations associated with the view 2510 such as scrolling the view 2510 in response to a user input. The view 2510 in FIG. 25A has a retained count of two based on the pointer references 2508 and 2532.

If the layer 2506 is removed from the data structure as illustrated in FIG. 25B, then the pointer 2508 is removed. View 2510 will have a lower retained count as illustrated in FIG. 25B. If view 2510 has a retained count of zero, then the memory storing the view 2510 will be deallocated.

Figure 26:
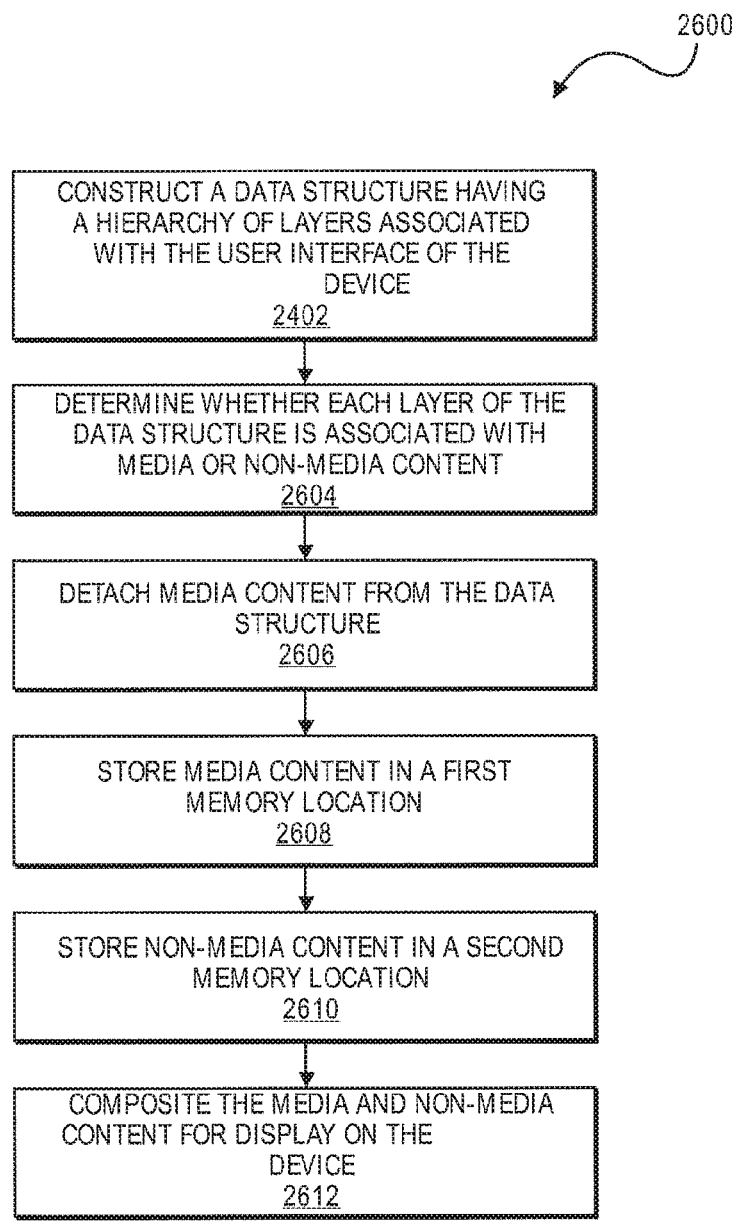
FIG. 26 illustrates a method for compositing media and non-media content of user interface for display on a device.

FIG. 26 illustrates a method for compositing media and non-media content of user interface for display on a device. The method 2600 includes constructing a data structure having a hierarchy of layers associated with the user interface of the device at block 2602. The method 2600 further includes determining whether each layer of the data structure is associated with media or non-media content at block 2604. The data structure or layer tree is traversed in order to determine whether each of the layers of the data structure is associated with media or non-media content. The method 2600 further includes detaching a layer associated with media content from the data structure at block 2606. The method 2600 further includes storing media content in a first memory location at block 2606. The method 2600 further includes storing non-media content in a second memory location at block 2608. The method 2600 further includes compositing the media and non-media content for display on the device at block 2610.

In some embodiments, compositing the media and non-media content includes retrieving the media content from the first memory location, retrieving the non-media content from the second memory location, and scanning the media and non-media content directly to the display. The memory location can be any type of memory located in cache, main memory, a graphics processing unit, or other location within a device. The media content may include video, video plug-in, audio, image, or other time varying media. The media content may be in the form of a YUV model with the Y representing a luminance component (the brightness) and U and V representing chrominance (color) components. The media content may be scanned to the display at a rate of substantially twenty to forty frames per second. The media content may be scaled prior to being scanned to the display of the device.

The non-media content may include content, views, and images that do not require frequent updating. The non-media content may be in the form of a RGB model which is an additive model in which red, green, and blue (often used in additive light models) are combined in various ways to reproduce other colors. The non-media content may be scanned to the display at a slower rate compared to the media content.

Figure 27:
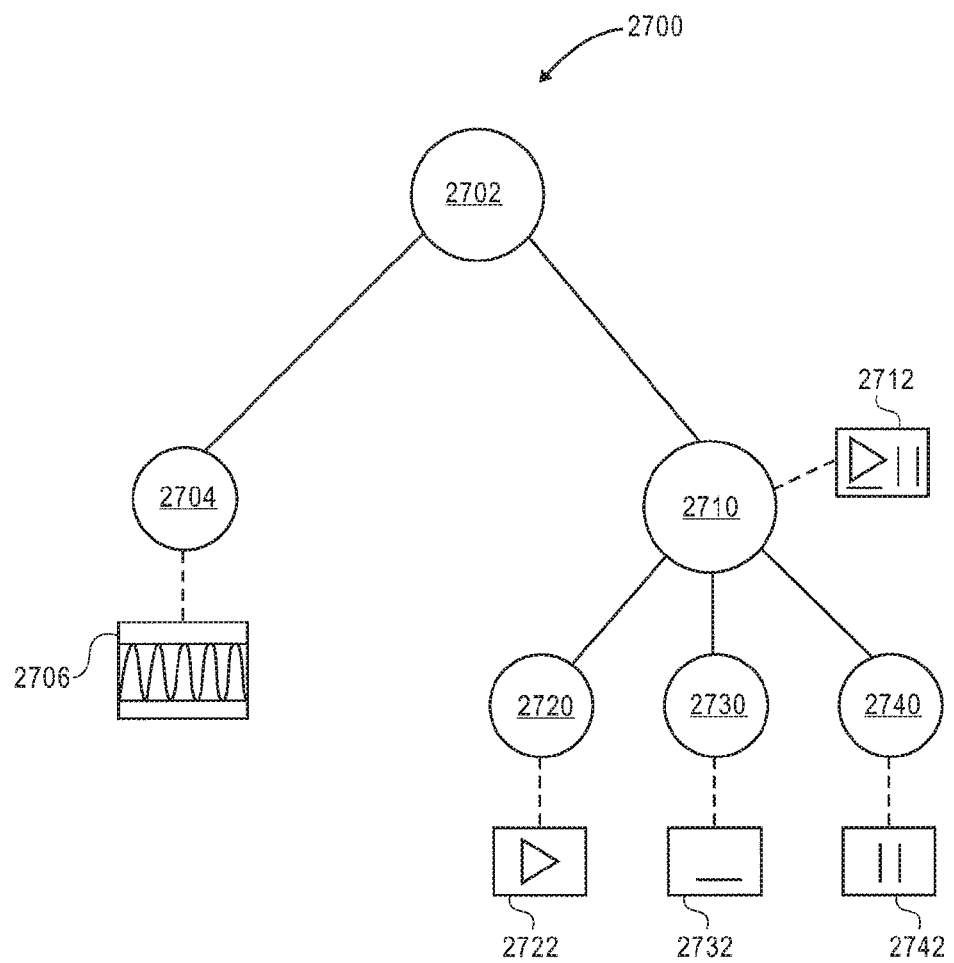
FIG. 27 illustrates a data structure or layer tree having a hierarchy of layers.

FIG. 27 illustrates a data structure or layer tree having a hierarchy of layers. The layers can be associated with media and non-media content. For example, layer 2704 is associated with media content 2706 such as a video. Layer 2710 is associated with non-media content 2712 which may be user interface view for the video. Layers 2720, 2730, and 2740 are associated with non-media content 2722, 2732, and 2742, respectively, that forms the components of the non-media content 2712. The method 2600 will determine whether each layer of the data structure is associated with media or non-content. Any layers associated with media content such as layer 2704 will be removed from the data structure and processed in a separate memory location.

In some embodiments, the methods, systems, and apparatuses of the present disclosure can be implemented in various devices including electronic devices, consumer devices, data processing devices, desktop computers, portable computers, wireless devices, cellular devices, tablet devices, handheld devices, multi touch devices, multi touch data processing devices, any combination of these devices, or other like devices. FIGS. 4-6 and 28-33 illustrate examples of a few of these devices.

Figure 28:
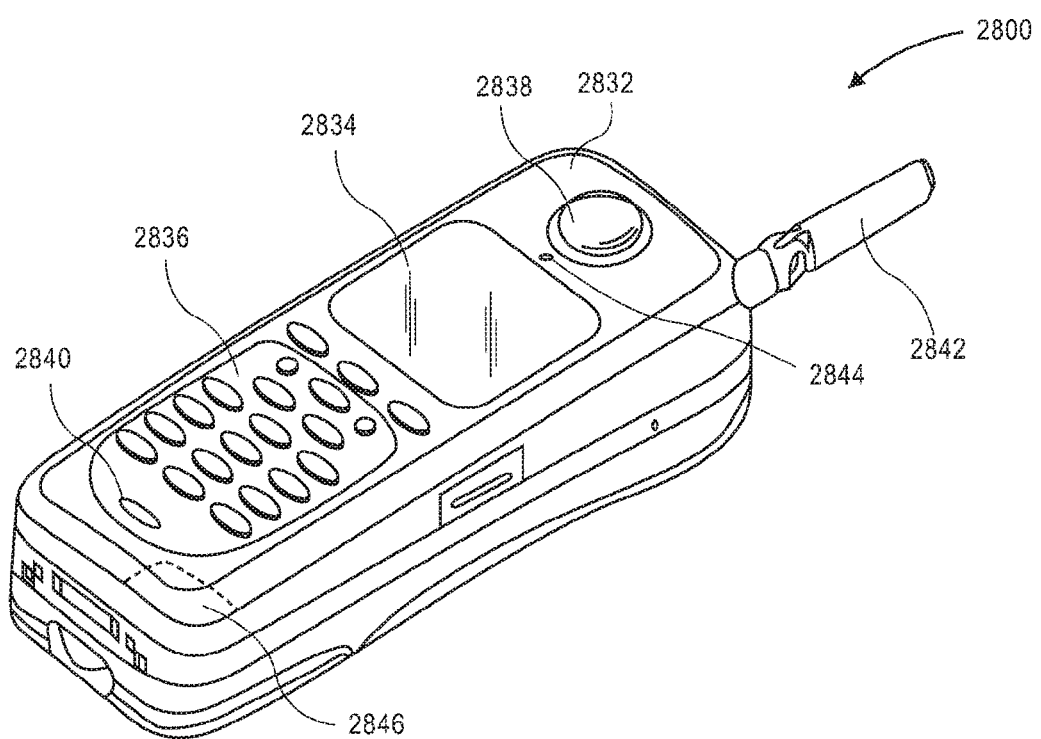
FIG. 28 is a perspective view of a device in accordance with one embodiment of the present disclosure.

FIG. 28 illustrates a device 2800 according to one embodiment of the disclosure. FIG. 28 shows a wireless device in a telephone configuration having a "candy-bar" style. In FIG. 28, the wireless device 2800 may include a housing 2832, a display device 2834, an input device 2836 which may be an alphanumeric keypad, a speaker 2838, a microphone 2840 and an antenna 2842. The wireless device 2800 also may include a proximity sensor 2844 and an accelerometer 2846. It will be appreciated that the embodiment of FIG. 28 may use more or fewer sensors and may have a different form factor from the form factor shown in FIG. 28.

The display device 2834 is shown positioned at an upper portion of the housing 2832, and the input device 2836 is shown positioned at a lower portion of the housing 2832.

The antenna 2842 is shown extending from the housing 2832 at an upper portion of the housing 2832. The speaker 2838 is also shown at an upper portion of the housing 2832 above the display device 2834. The microphone 2840 is shown at a lower portion of the housing 2832, below the input device 3286. It will be appreciated that the speaker 2838 and microphone 2840 can be positioned at any location on the housing, but are typically positioned in accordance with a user's ear and mouth, respectively.

The display device 2834 may be, for example, a liquid crystal display (LCD) which does not include the ability to accept inputs or a touch input screen which also includes an LCD. The input device 2836 may include, for example, buttons, switches, dials, sliders, keys or keypad, navigation pad, touch pad, touch screen, and the like. Any well-known speaker, microphone and antenna can be used for speaker 2838, microphone 2840 and antenna 2842, respectively.

The data acquired from the proximity sensor 2844 and the accelerometer 2846 can be combined together, or used alone, to gather information about the user's activities. The data from the proximity sensor 2844, the accelerometer 2846 or both can be used, for example, to activate/deactivate a display backlight, initiate commands, make selections, control scrolling, gesturing, animating or other movement in a display, control input device settings, or to make other changes to one or more settings of the device. In certain embodiments of the present disclosure, the device 2800 can be used to implement at least some of the methods discussed in the present disclosure.

Figure 29:
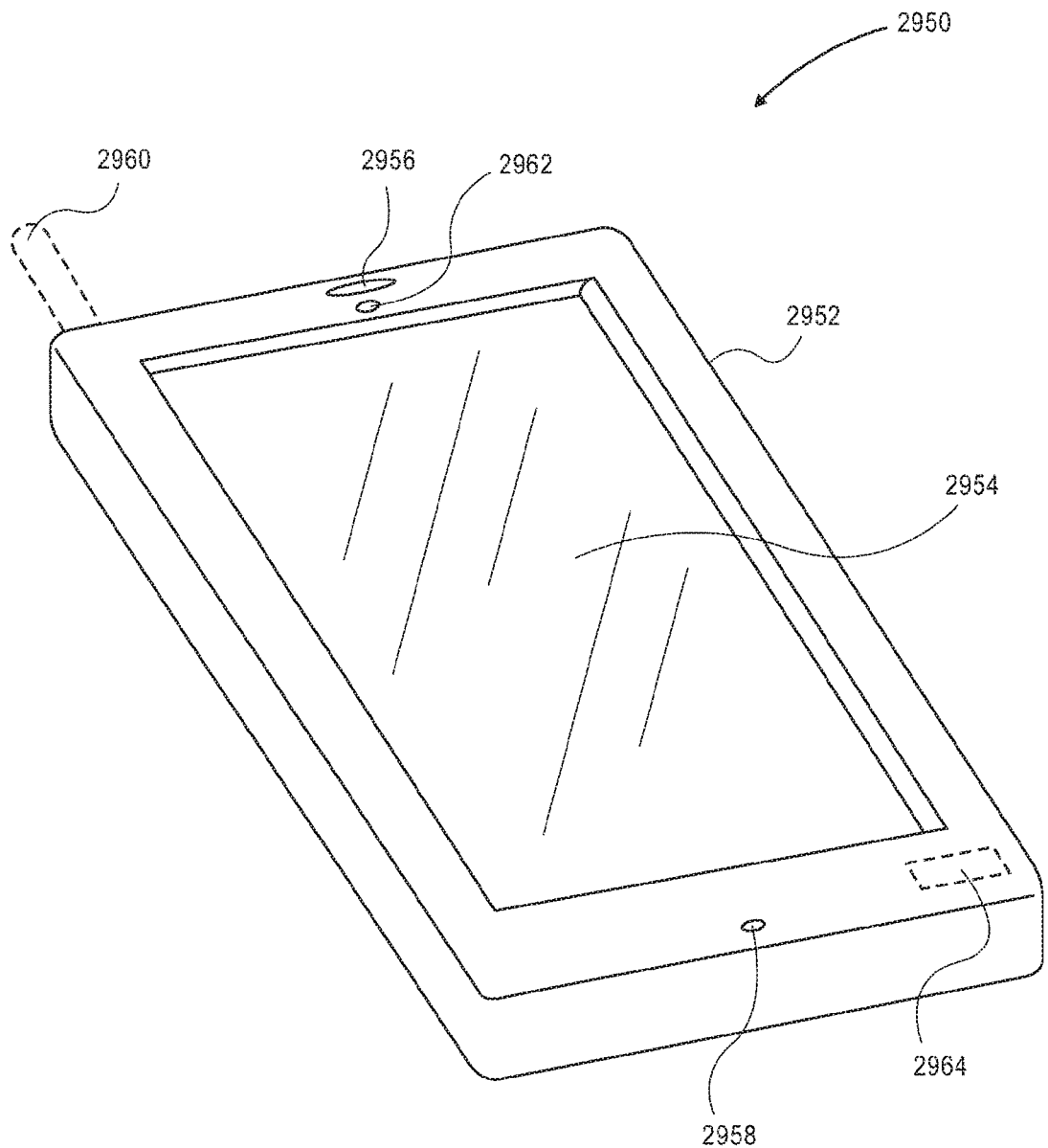
FIG. 29 is a perspective view of a device in accordance with one embodiment of the present disclosure.

FIG. 29 shows a device 2950 in accordance with one embodiment of the disclosure. The device 2950 may include a housing 2952, a display/input device 2954, a speaker 2956, a microphone 2958 and an optional antenna 2960 (which may be visible on the exterior of the housing or may be concealed within the housing). The device 2950 also may include a proximity sensor 2962 and an accelerometer 2964. The device 2950 may be a cellular telephone or a device which is an integrated PDA and a cellular telephone or a device which is an integrated media player and a cellular telephone or a device which is both an entertainment system (e.g. for playing games) and a cellular telephone, or the device 2950 may be other types of devices described herein. In one particular embodiment, the device 2950 may include a cellular telephone and a media player and a PDA, all contained within the housing 2952. The device 2950 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, the display/input device 2954 may include a multi-point touch input screen in addition to being a display, such as an LCD. In one embodiment, the multi-point touch screen is a capacitive sensing medium configured to detect multiple touches (e.g., blobs on the display from a user's face or multiple fingers concurrently touching or nearly touching the display) or near touches (e.g., blobs on the display) that occur at the same time and at distinct locations in the plane of the touch panel and to produce distinct signals representative of the location of the touches on the plane of the touch panel for each of the multiple touches.

In certain embodiments of the present disclosure, the device 2800 can be used to implement at least some of the methods discussed in the present disclosure.

Figure 30A:
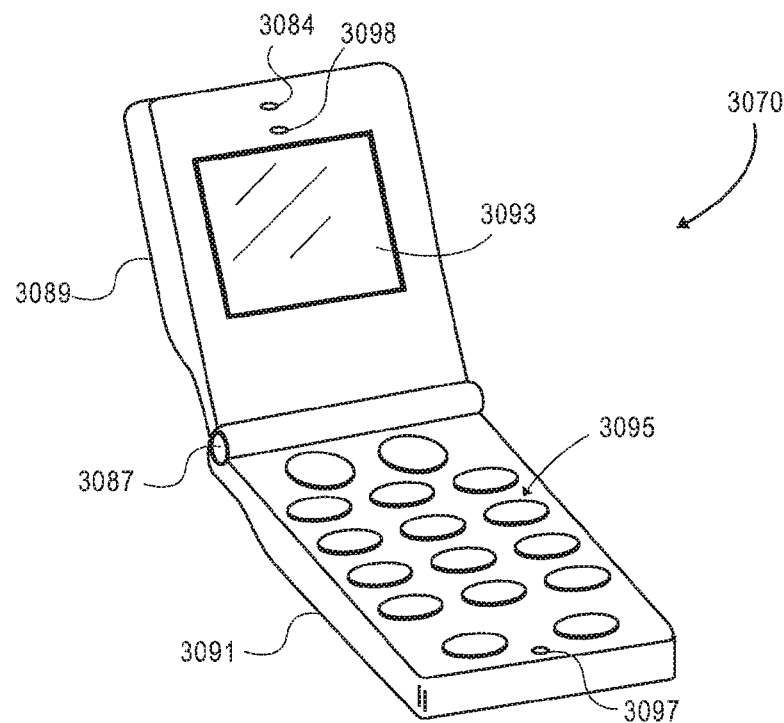
FIGS. 30A and 30B are perspective views of a wireless device in accordance with one embodiment of the present disclosure.
Figure 30B:
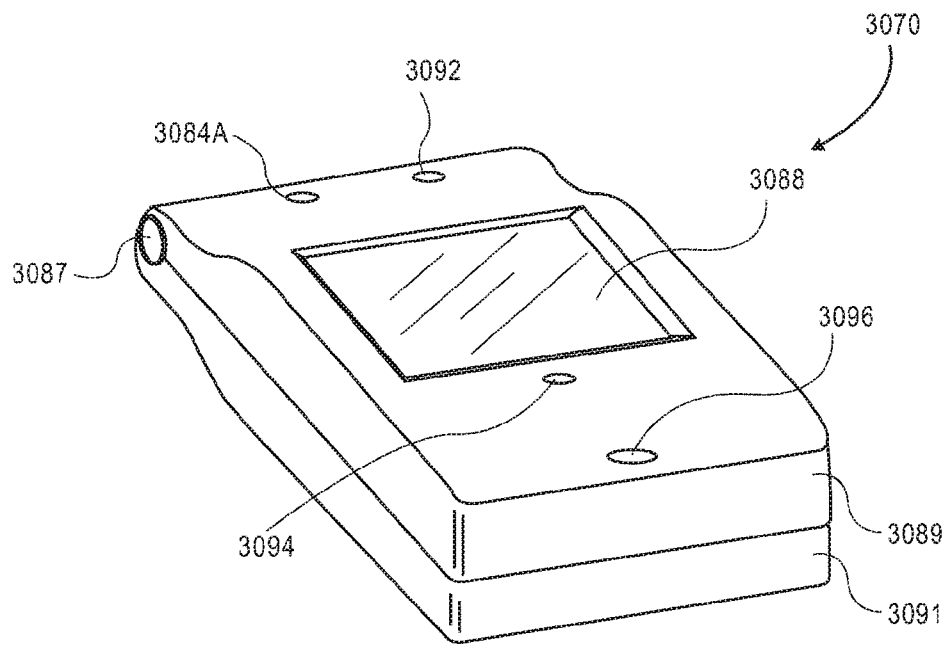

FIGS. 30A and 30B illustrate a device 3070 according to one embodiment of the disclosure. The device 3070 may be a cellular telephone which includes a hinge 3087 that couples a display housing 3089 to a keypad housing 3091. The hinge 3087 allows a user to open and close the cellular telephone so that it can be placed in at least one of two different configurations shown in FIGS. 30A and 30B. In one particular embodiment, the hinge 3087 may rotatably couple the display housing to the keypad housing. In particular, a user can open the cellular telephone to place it in the open configuration shown in FIG. 30A and can close the cellular telephone to place it in the closed configuration shown in FIG. 30B. The keypad housing 3091 may include a keypad 3095 which receives inputs (e.g. telephone number inputs or other alphanumeric inputs) from a user and a microphone 3097 which receives voice input from the user. The display housing 3089 may include, on its interior surface, a display 3093 (e.g. an LCD) and a speaker 3098 and a proximity sensor 3084; on its exterior surface, the display housing 3089 may include a speaker 3096, a temperature sensor 3094, a display 3088 (e.g. another LCD), an ambient light sensor 3092, and a proximity sensor 3084A. Hence, in this embodiment, the display housing 3089 may include a first proximity sensor on its interior surface and a second proximity sensor on its exterior surface.

In at least certain embodiments, the device 3070 may contain components which provide one or more of the functions of a wireless communication device such as a cellular telephone, a media player, an entertainment system, a PDA, or other types of devices described herein. In one implementation of an embodiment, the device 3070 may be a cellular telephone integrated with a media player which plays MP3 files, such as MP3 music files.

Figure 31:
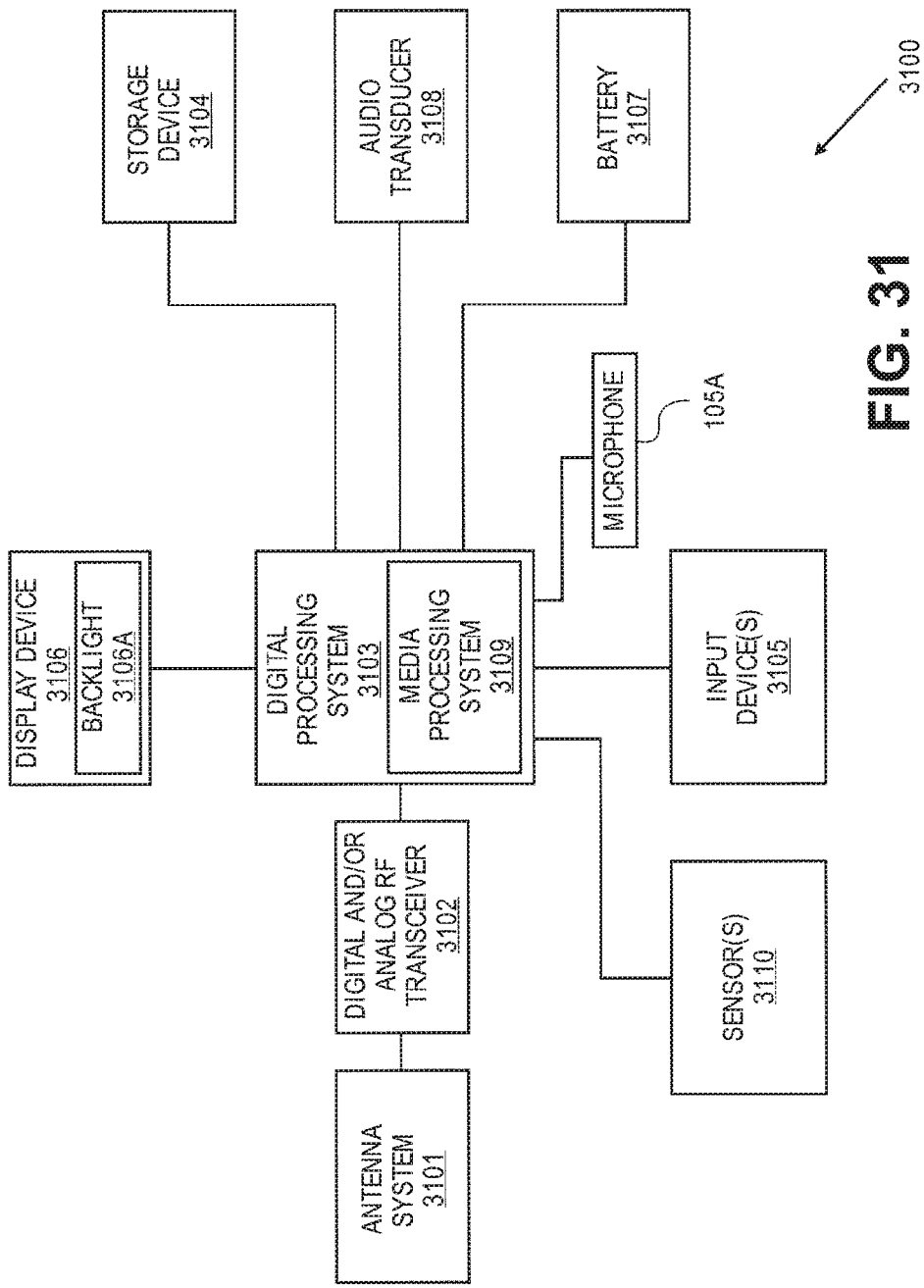
FIG. 31 is a block diagram of a system in which embodiments of the present disclosure can be implemented.

Each of the devices shown in FIGS. 4, 5A, 5B, 5C, 6A, 6B, 6C, 6D, 28, 29, 30A and 30B may be a wireless communication device, such as a cellular telephone, and may include a plurality of components which provide a capability for wireless communication. FIG. 31 shows an embodiment of a wireless device 3070 which includes the capability for wireless communication. The wireless device 3070 may be included in any one of the devices shown in FIGS. 4, 5A, 5B, 5C, 6A, 6B, 6C, 6D, 28, 29, 30A and 30B, although alternative embodiments of those devices of FIGS. 4, 5A, 5B, 5C, 6A, 6B, 6C, 6D, 28, 29, 30A and 30B may include more or fewer components than the Wireless device 3070.

Wireless device 3070 may include an antenna system 3101. Wireless device 3070 may also include a digital and/or analog radio frequency (RF) transceiver 3102, coupled to the antenna system 3101, to transmit and/or receive voice, digital data and/or media signals through antenna system 3101.

Wireless device 3070 may also include a digital processing system 3103 to control the digital RF transceiver and to manage the voice, digital data and/or media signals. Digital processing system 3103 may be a general purpose processing device, such as a microprocessor or controller for example. Digital processing system 3103 may also be a special purpose processing device, such as an ASIC (application specific integrated circuit), FPGA (field-programmable gate array) or DSP (digital signal processor). Digital processing system 3103 may also include other devices, as are known in the art, to interface with other components of wireless device 3070. For example, digital processing system 3103 may include analog-to-digital and digital-to-analog converters to interface with other components of wireless device 3070. Digital processing system 3103 may include a media processing system 3109, which may also include a general purpose or special purpose processing device to manage media, such as files of audio data.

Wireless device 3070 may also include a storage device 3104, coupled to the digital processing system, to store data and/or operating programs for the Wireless device 3070. Storage device 3104 may be, for example, any type of solid-state or magnetic memory device.

Wireless device 3070 may also include one or more input devices 3105, coupled to the digital processing system 3103, to accept user inputs (e.g., telephone numbers, names, addresses, media selections, etc.) Input device 3105 may be, for example, one or more of a keypad, a touchpad, a touch screen, a pointing device in combination with a display device or similar input device.

Wireless device 3070 may also include at least one display device 33106, coupled to the digital processing system 3103, to display information such as messages, telephone call information, contact information, pictures, movies and/or titles or other indicators of media being selected via the input device 3105. Display device 3106 may be, for example, an LCD display device. In one embodiment, display device 3106 and input device 3105 may be integrated together in the same device (e.g., a touch screen LCD such as a multi-touch input panel which is integrated with a display device, such as an LCD display device). The display device 3106 may include a backlight 3106A to illuminate the display device 3106 under certain circumstances. It will be appreciated that the Wireless device 3070 may include multiple displays.

Wireless device 3070 may also include a battery 3107 to supply operating power to components of the system including digital RF transceiver 3102, digital processing system 3103, storage device 3104, input device 3105, microphone 3105A, audio transducer 3108, media processing system 3109, sensor(s) 3110, and display device 3106. Battery 3107 may be, for example, a rechargeable or non-rechargeable lithium or nickel metal hydride battery. Wireless device 3070 may also include audio transducers 3108, which may include one or more speakers, and at least one microphone 3105A. In certain embodiments of the present disclosure, the wireless device 3070 can be used to implement at least some of the methods discussed in the present disclosure.

Figure 32:
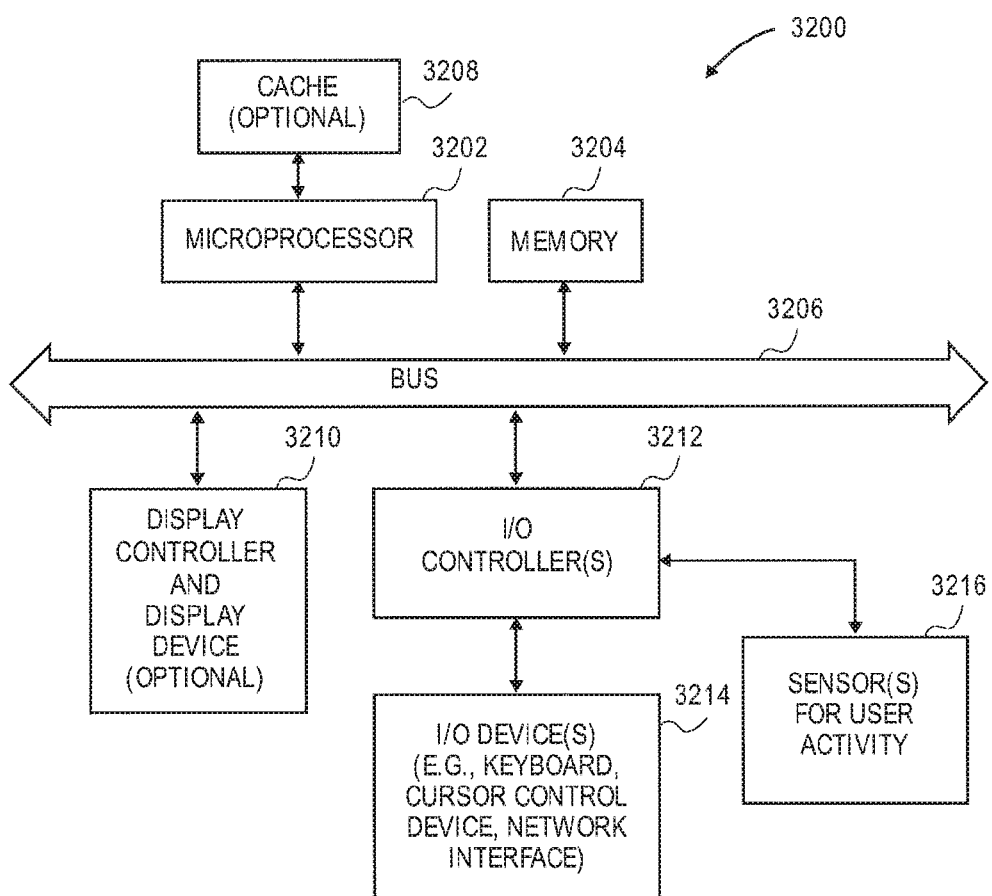
FIG. 32 shows another example of a device in accordance with one embodiment of the present disclosure.

FIG. 32 shows another example of a device according to an embodiment of the disclosure. This device 3200 may include a processor, such as microprocessor 3202, and a memory 3204, which are coupled to each other through a bus 3206. The device 3200 may optionally include a cache 3208 which is coupled to the microprocessor 3202. This device may also optionally include a display controller and display device 3210 which is coupled to the other components through the bus 3206. One or more input/output controllers 3212 are also coupled to the bus 3206 to provide an interface for input/output devices 3214 and to provide an interface for one or more sensors 3216 which are for sensing user activity. The bus 3206 may include one or more buses connected to each other through various bridges, controllers, and/or adapters as is well known in the art. The input/output devices 3214 may include a keypad or keyboard or a cursor control device such as a touch input panel. Furthermore, the input/output devices 3214 may include a network interface which is either for a wired network or a wireless network (e.g. an RF transceiver). The sensors 3216 may be any one of the sensors described herein including, for example, a proximity sensor or an ambient light sensor. In at least certain implementations of the device 3200, the microprocessor 3202 may receive data from one or more sensors 3216 and may perform the analysis of that data in the manner described herein. For example, the data may be analyzed through an artificial intelligence process or in the other ways described herein. As a result of that analysis, the microprocessor 3202 may then automatically cause an adjustment in one or more settings of the device.

In certain embodiments of the present disclosure, the device 3200 can be used to implement at least some of the methods discussed in the present disclosure.

Figure 33A:
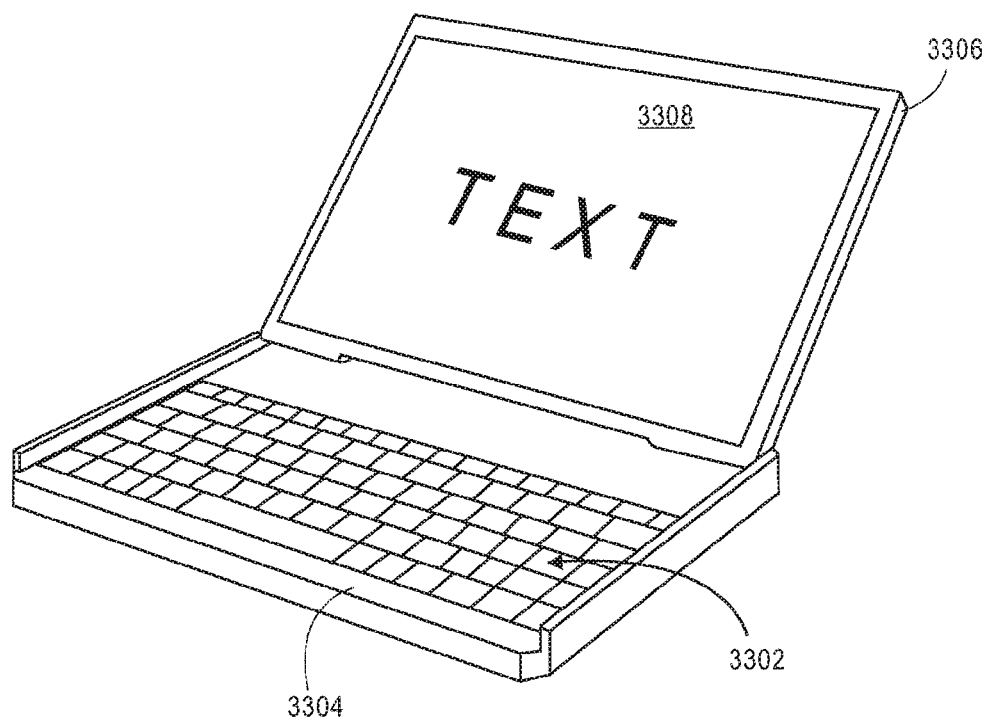
FIG. 33A is a perspective view of a device in a first configuration (e.g. in a laptop configuration) in accordance with one embodiment of the present disclosure.
Figure 33B:
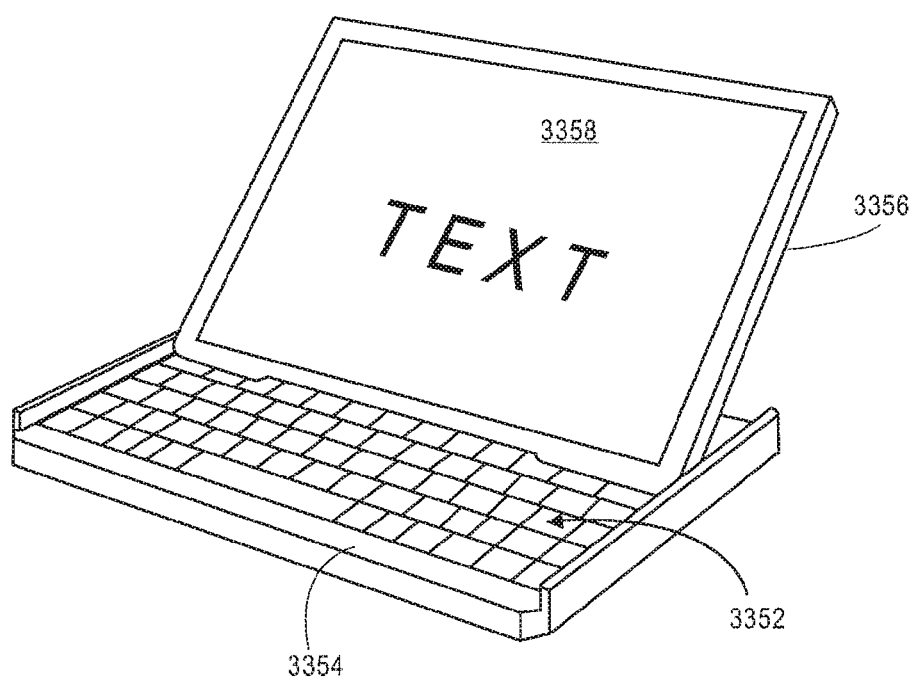
FIG. 33B is a perspective view of the device of FIG. 33A in a second configuration (e.g. a transition configuration) in accordance with one embodiment of the present disclosure.
Figure 33C:
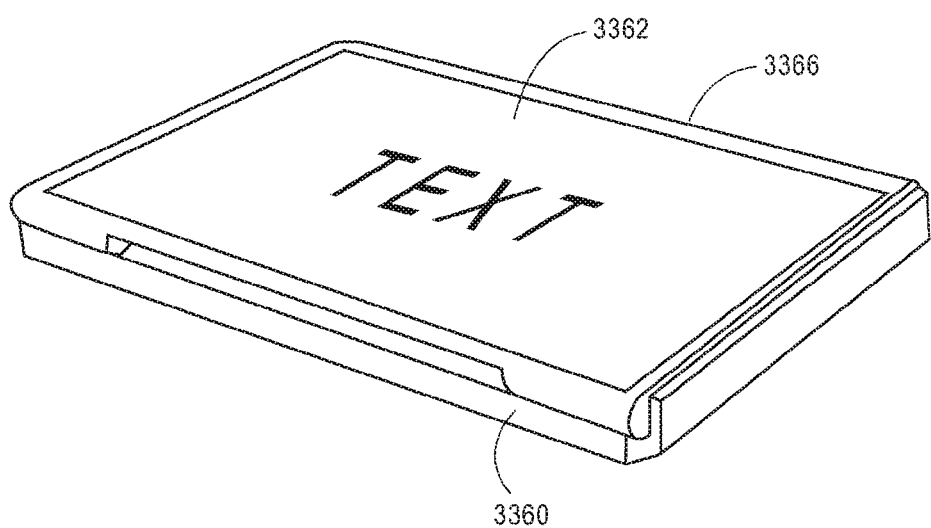
FIG. 33C is a perspective view of the device of FIG. 33A in a third configuration (e.g., a tablet configuration) in accordance with one embodiment of the present disclosure.

FIGS. 33A-C show another example of a device according to at least certain embodiments of the disclosure. FIG. 33A illustrates a laptop device 3300 with a keyboard 3302, a body 3304, a display frame 3306, and a display 3308. The laptop device 3300 can be converted into a tablet device as illustrated in FIG. 33B and FIG. 33C. FIG. 33B illustrates the conversion of the laptop device into a tablet device. An edge of a display frame 3356 containing a display 3358 is slide within the body 3354 across the top of a keyboard 3352 until forming a tablet device as illustrated in FIG. 33C. The tablet device with a display 2362 and a display frame 3366 rests on top of a body 3360.

In certain embodiments of the present disclosure, the laptop device 3300 can be used to implement at least some of the methods discussed in the present disclosure.

Figure 34:
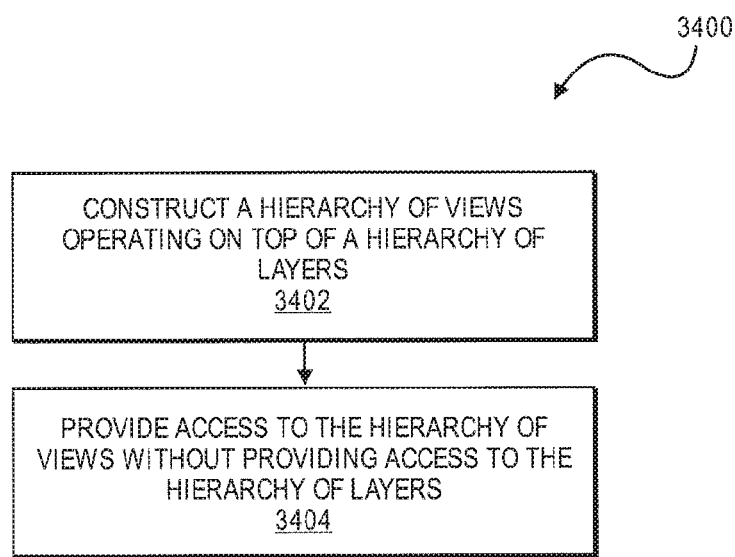
FIG. 34 illustrates details of an application programming interface in flow chart form according to certain teachings of the present disclosure.

FIG. 34 illustrates details of an application programming interface in flow chart form according to certain teachings of the present disclosure. The application programming interface operates in an environment with user interface software interacting with a software application. In some embodiments, a hierarchy of views operates on top of a hierarchy of layers within the user interface software. The API operates as illustrated in method 3400 that includes constructing a hierarchy of views operating on top of a hierarchy of layers at block 3402. The method 3400 further includes providing access to the hierarchy of views without providing access to the hierarchy of layers at block 3404. An application may interact with the hierarchy of views via the API without accessing the hierarchy of layers operating below the hierarchy of views.

In some embodiments, a platform provides various scrolling, gesturing, and animating operations. The platform includes hardware components and an operating system. The hardware components may include a processing unit coupled to an input panel and a memory coupled to the processor. The operating system includes one or more programs that are stored in the memory and configured to be executed by the processing unit. One or more programs include various instructions for transferring function calls or messages through an application programming interface in order to perform various scrolling, gesturing, and animating operations.

In an embodiment, the one or more programs include instructions for transferring a scaling transform call through an API to determine a scaling transform for a view associated with a user input having a plurality of input points. In an embodiment, the one or more programs include instructions for transferring a rubberband call through an API to determine a rotation transform for a view associated with a user input having a plurality of input points.

In some embodiments, the platform includes a framework containing a library of software code. The framework interacts with the programs of the platform to provide application programming interfaces for performing various scrolling, gesturing, and animating operations. The framework also includes associated resources (e.g., images, text, etc.) that are stored in a single directory.

In an embodiment, the library of the framework provides an API for specifying a scaling transform for a view associated with a user input having a plurality of input points. In an embodiment, the library of the framework provides an API for specifying a scaling transform for a view associated with a user input having a plurality of input points.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method, comprising:
   at an electronic device with a display and a touch-sensitive surface, wherein the electronic device includes a plurality of programs that are operating within a platform that includes platform code configured to provide the plurality of programs with a common framework for handling gesture events detected on the touch-sensitive surface:
   displaying, on the display, a user interface that includes a respective view that is associated with a respective program of the plurality of programs, wherein the respective view of the plurality of views is a region of the user interface that includes content displayed on the display and the content in the respective view is responsive to inputs within a region of the touch-sensitive surface that corresponds to the respective view;
   while displaying the respective view on the display, detecting, via the platform code, a user input;
   in response to detecting the user input, determining whether the user input corresponds to a gesture that is based on two or more concurrent touches detected on the touch-sensitive surface;
   in response to determining that the user input corresponds to a gesture that is based on two or more concurrent touches detected on the touch-sensitive surface, transferring from the platform code to the respective program associated with the respective view, via an application programming interface (API), a rotation transform function call that represents the detected gesture;
   after transferring, via the API, the rotation transform function call, detecting a change in the gesture that corresponds to a change in one or more touches detected on the touch-sensitive surface that correspond to the gesture;
   in response to detecting the change in the gesture, transferring, via the API, a gesture change function call that represents the change in the gesture, wherein the gesture change function call is transferred from the platform code configured to provide the plurality of programs with the common framework for handling gesture events detected on the touch-sensitive surface to the respective program that is associated with the respective view; and
   in response to transferring the rotation transform function call and transferring the gesture change function call, performing a rotation transform to rotate the respective view of the respective program.

2. The method of claim 1, including, in response to transferring the rotation transform function call, determining the rotation transform for rotating the respective view.

3. The method of claim 1, wherein the user input corresponds to a gesture that is based on rotation of two or more concurrent touches detected on the touch-sensitive surface.

4. The method of claim 1, including:
   in response to determining that the user input corresponds to a gesture that is based on two or more concurrent touches:
   transferring from the platform code to the respective program associated with the respective view, via the API, a start rotation gesture function call;
   after transferring the start rotation gesture function call, transferring from the platform code to the respective program associated with the respective view, via the API, a rotation gesture progress function call; and
   after transferring the rotation gesture progress function call, transferring from the platform code to the respective program associated with the respective view, via the API, a rotation gesture end function call.

5. The method of claim 1, wherein the rotation transform function call includes information indicating a minimum degree of rotation for the respective view and a maximum degree of rotation for the respective view.

6. The method of claim 1, wherein the user input causes the respective view to temporarily rotate past a maximum degree of rotation prior to the respective view snapping back to the maximum degree of rotation.

7. The method of claim 1, comprising:
   in response to transferring from the platform code to the respective program associated with the respective view, via the API, the rotation transform function call that represents the detected gesture, receiving, at the respective program associated with the respective view, the rotation transform function call transferred from the platform code via the API; and
   in response to transferring, via the API, the gesture change function call from the platform code to the respective program that is associated with the respective view, receiving, at the respective program associated with the respective view, the gesture change function call transferred from the platform code via the API;
   wherein the rotation transform to rotate the respective view of the respective program is performed in response to receiving, at the respective program associated with the respective view, the rotation transform function call and the gesture change function call transferred from the platform code via the API.

8. An electronic device, comprising:
   a display;
   a touch-sensitive surface;
   a processing unit; and
   memory storing a plurality of programs that are operating within a platform that includes platform code configured to provide the plurality of programs with a common framework for handling gesture events detected on the touch-sensitive surface, wherein the memory also includes instructions that, when executed by the processing unit, cause the electronic device to:
   display, on the display, a user interface that includes a respective view that is associated with a respective program of the plurality of programs, wherein the respective view of the plurality of views is a region of the user interface that includes content displayed on the display and the content in the respective view is responsive to inputs within a region of the touch-sensitive surface that corresponds to the respective view;

while displaying the respective view on the display, detect, via the platform code, a user input;

in response to detecting the user input, determine whether the user input corresponds to a gesture that is based on two or more concurrent touches detected on the touch-sensitive surface;

in response to determining that the user input corresponds to a gesture that is based on two or more concurrent touches detected on the touch-sensitive surface, transfer from the platform code to the respective program associated with the respective view, via an application programming interface (API), a rotation transform function call that represents the detected gesture;

after transferring, via the API, the rotation transform function call, detect a change in the gesture that corresponds to a change in one or more touches detected on the touch-sensitive surface that correspond to the gesture;

in response to detecting the change in the gesture, transfer, via the API, a gesture change function call that represents the change in the gesture, wherein the gesture change function call is transferred from the platform code configured to provide the plurality of programs with the common framework for handling gesture events detected on the touch-sensitive surface to the respective program that is associated with the respective view; and in response to transferring the rotation transform function call and transferring the gesture change function call, perform a rotation transform to rotate the respective view of the respective program.

9. The electronic device of claim 8, wherein the memory includes instructions that, when executed by the processing unit, cause the electronic device, in response to transferring the rotation transform function call, to determine the rotation transform for rotating the respective view.

10. The electronic device of claim 8, wherein the user input corresponds to a gesture that is based on rotation of two or more concurrent touches detected on the touch-sensitive surface.

11. The electronic device of claim 8, wherein the memory includes instructions that, when executed by the processing unit, cause the electronic device to:

in response to determining that the user input corresponds to a gesture that is based on two or more concurrent touches:
transfer from the platform code to the respective program associated with the respective view, via the API, a start rotation gesture function call;
after transferring the start rotation gesture function call, transfer from the platform code to the respective program associated with the respective view, via the API, a rotation gesture progress function call; and
after transferring the rotation gesture progress function call, transfer from the platform code to the respective program associated with the respective view, via the API, a rotation gesture end function call.

12. The electronic device of claim 8, wherein the rotation transform function call includes information indicating a minimum degree of rotation for the respective view and a maximum degree of rotation for the respective view.

13. The electronic device of claim 8, wherein the user input causes the respective view to temporarily rotate past a maximum degree of rotation prior to the respective view snapping back to the maximum degree of rotation.

14. The electronic device of claim 8, wherein the memory includes instructions that, when executed by the processing unit, cause the electronic device to:

in response to transferring from the platform code to the respective program associated with the respective view, via the API, the rotation transform function call that represents the detected gesture, receive, at the respective program associated with the respective view, the rotation transform function call transferred from the platform code via the API; and in response to transferring, via the API, the gesture change function call from the platform code to the respective program that is associated with the respective view, receive, at the respective program associated with the respective view, the gesture change function call transferred from the platform code via the API;

wherein the rotation transform to rotate the respective view of the respective program is performed in response to receiving, at the respective program associated with the respective view, the rotation transform function call and the gesture change function call transferred from the platform code via the API.

15. A non-transitory computer readable storage medium storing (i) a plurality of programs that are operating within a platform that includes platform code configured to provide the plurality of programs with a common framework for handling gesture events detected on a touch-sensitive surface; and (ii) instructions for execution by a processing unit of an electronic device with a display and a touch-sensitive surface, wherein the stored instructions include instructions for:

displaying, on the display, a user interface that includes a respective view that is associated with a respective program of the plurality of programs, wherein the respective view of the plurality of views is a region of the user interface that includes content displayed on the display and the content in the respective view is responsive to inputs within a region of the touch-sensitive surface that corresponds to the respective view;

while displaying the respective view on the display, detecting, via the platform code, a user input;

in response to detecting the user input, determining whether the user input corresponds to a gesture that is based on two or more concurrent touches detected on the touch-sensitive surface;

in response to determining that the user input corresponds to a gesture that is based on two or more concurrent touches detected on the touch-sensitive surface, transferring from the platform code to the respective program associated with the respective view, via an application programming interface (API), a rotation transform function call that represents the detected gesture;

after transferring, via the API, the rotation transform function call, detecting a change in the gesture that corresponds to a change in one or more touches detected on the touch-sensitive surface that correspond to the gesture;

in response to detecting the change in the gesture, transferring, via the API, a gesture change function call that represents the change in the gesture, wherein the gesture change function call is transferred from the platform code configured to provide the plurality of programs with the common framework for handling gesture events detected on the touch-sensitive surface to the respective program that is associated with the respective view; and in response to transferring the rotation transform function call and transferring the gesture change function call, performing a rotation transform to rotate the respective view of the respective program.

16. The non-transitory computer readable storage medium of claim 15, wherein the stored instructions include instructions for, in response to transferring the rotation transform function call, determining the rotation transform for rotating the respective view.

17. The non-transitory computer readable storage medium of claim 15, wherein the user input corresponds to a gesture that is based on rotation of two or more concurrent touches detected on the touch-sensitive surface.

18. The non-transitory computer readable storage medium of claim 15, wherein the stored instructions include instructions for:
   in response to determining that the user input corresponds to a gesture that is based on two or more concurrent touches:
      transferring from the platform code to the respective program associated with the respective view, via the API, a start rotation gesture function call;
      after transferring the start rotation gesture function call, transferring from the platform code to the respective program associated with the respective view, via the API, a rotation gesture progress function call; and
      after transferring the rotation gesture progress function call, transferring from the platform code to the respective program associated with the respective view, via the API, a rotation gesture end function call.

19. The non-transitory computer readable storage medium of claim 15, wherein the rotation transform function call includes information indicating a minimum degree of rotation for the respective view and a maximum degree of rotation for the respective view.

20. The non-transitory computer readable storage medium of claim 15, wherein the user input causes the respective view to temporarily rotate past a maximum degree of rotation prior to the respective view snapping back to the maximum degree of rotation.

21. The non-transitory computer readable storage medium of claim 15, wherein the stored instructions include instructions for:
   in response to transferring from the platform code to the respective program associated with the respective view, via the API, the rotation transform function call that represents the detected gesture, receiving, at the respective program associated with the respective view, the rotation transform function call transferred from the platform code via the API; and
   in response to transferring, via the API, the gesture change function call from the platform code to the respective program that is associated with the respective view, receiving, at the respective program associated with the respective view, the gesture change function call transferred from the platform code via the API;
   wherein the rotation transform to rotate the respective view of the respective program is performed in response to receiving, at the respective program associated with the respective view, the rotation transform function call and the gesture change function call transferred from the platform code via the API.

* * * * *